US010157352B1

(12) United States Patent
Chan et al.

(10) Patent No.: US 10,157,352 B1
(45) Date of Patent: Dec. 18, 2018

(54) ARTIFICIAL INTELLIGENCE MACHINE LEARNING, AND PREDICTIVE ANALYTIC FOR PATENT AND NON-PATENT DOCUMENTS

(71) Applicants: Alex H Chan, San Francisco, CA (US); Oleksandr Loginov, Dublin County (IE); Eric Dew, San Francisco, CA (US)

(72) Inventors: Alex H Chan, San Francisco, CA (US); Oleksandr Loginov, Dublin County (IE); Eric Dew, San Francisco, CA (US)

(73) Assignee: DataNovo, Inc., San Francisco, CA (US)

( * ) Notice: Subject to any disclaimer, the term of this patent is extended or adjusted under 35 U.S.C. 154(b) by 285 days.

(21) Appl. No.: 15/041,029

(22) Filed: Feb. 11, 2016

Related U.S. Application Data

(63) Continuation of application No. 14/848,125, filed on Sep. 8, 2015.

(60) Provisional application No. 62/047,059, filed on Sep. 7, 2014, provisional application No. 62/114,572, filed on Feb. 10, 2015.

(51) Int. Cl.
*G06F 17/30* (2006.01)
*G06N 99/00* (2010.01)
*G06N 5/04* (2006.01)

(52) U.S. Cl.
CPC ..... *G06N 99/005* (2013.01); *G06F 17/30011* (2013.01); *G06N 5/047* (2013.01)

(58) Field of Classification Search
CPC . G06N 5/047; G06N 99/005; G06F 17/30011

USPC .......................................................... 707/710
See application file for complete search history.

(56) References Cited

U.S. PATENT DOCUMENTS

| | | | |
|---|---|---|---|
| 6,865,573 B1 | 3/2005 | Hornick et al. | |
| 7,620,635 B2 | 11/2009 | Hornick | |
| 7,764,830 B1 * | 7/2010 | Wnek ................ | G06K 9/00469 |
| | | | 382/159 |
| 7,853,611 B2 | 12/2010 | Friedlander et al. | |
| 7,974,850 B2 | 7/2011 | Courson et al. | |
| 8,019,624 B2 | 9/2011 | Malone | |
| 8,135,740 B2 | 3/2012 | Friedlander et al. | |
| 8,538,988 B2 | 9/2013 | Lang et al. | |
| 2003/0233224 A1 | 12/2003 | Marchisio et al. | |
| 2004/0010505 A1 | 1/2004 | Vishnubhotla | |
| 2008/0077544 A1 | 3/2008 | Sureka | |
| 2008/0154814 A1 | 6/2008 | Chaudhury et al. | |
| 2009/0265313 A1 | 10/2009 | Wang | |
| 2012/0254161 A1 | 10/2012 | Zhang et al. | |

(Continued)

OTHER PUBLICATIONS http://www.lexmachina.com.
http://www.ravellaw.com.
http://www.docketnavigator.com.

*Primary Examiner* — Evan Aspinwall
(74) *Attorney, Agent, or Firm* — Alex H. Chan

(57) ABSTRACT

Systems, methods, and computer program methods for modifying a configuration of a document management system are described. In some implementation document data are received as machine learning inputs, where the document data represent one or more documents. Then, a pattern is recognized in the one or more documents using machine learning. Based on the recognized pattern, a configuration of a document management system is modified.

19 Claims, 31 Drawing Sheets

(56) References Cited

U.S. PATENT DOCUMENTS

2014/0025608 A1   1/2014  Miller et al.
2014/0114890 A1   4/2014  Fujimaki et al.
2015/0026225 A1*  1/2015  Bastide ............... G06F 17/3012
                                                            707/825

* cited by examiner

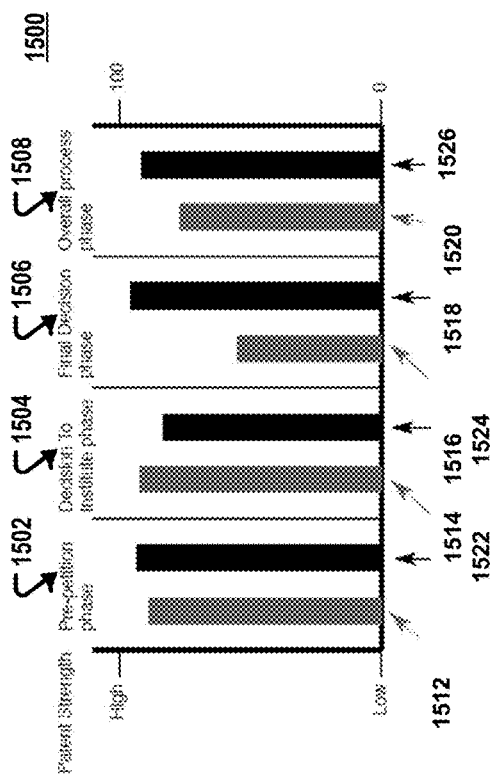

2300

Receiving, by a processor, a plurality of legal documents associated with a plurality of legal cases, where at least one of the plurality of legal cases is associated with a legal proceeding, the legal proceeding associated with a determination of a validity or invalidity of a patent, the patent containing at least one claim
2302

↓

Storing the plurality of legal documents in one or more databases
2304

↓

Applying, by the processor, one or more predetermined patterns to the plurality of legal documents to identify reference data
2306

↓

Analyzing the reference data to develop one or more analytical models, each statistical model pertaining to a different analytics parameter associated with a different attribute of the plurality of the legal documents
2308

↓

Assessing the validity or invalidity of the patent based on the one or more analytical models
2310

↓

Generating a validity strength rating based on the assessment, the validity strength rating indicative of a likelihood that at least one claim associated with the patent remains valid after subsequent litigation
2312

Receiving, by a processor, a plurality of documents including prior art documents
2502

↓

Storing the plurality of documents and the prior art documents in one or more databases
2504

↓

Applying, by the processor, one or more predetermined patterns to the plurality of documents and prior art documents to generate reference data
2506

↓

Receiving user data associated with a product
2508

↓

Evaluating the user data based on the reference data to identifying one or more of the plurality of documents including prior art documents relevant to the product, where the one or more identified documents provide descriptions of prior products or inventions that are similar to but predates the product
2510

FIG. 25

ARTIFICIAL INTELLIGENCE MACHINE LEARNING, AND PREDICTIVE ANALYTIC FOR PATENT AND NON-PATENT DOCUMENTS

CROSS-REFERENCE TO RELATED APPLICATIONS

This application claims the benefit of priority to U.S. Provisional Application Ser. No. 62/047,059 titled "Data Mining and Analysis System and Method for Legal Documents," filed on Sep. 7, 2014, U.S. Provisional Application Ser. No. 62/114,572 titled "Data Mining and Analysis System and Method for Legal Documents," filed on Feb. 10, 2015, and U.S. application Ser. No. 14/848,125 titled "Data Mining and Analysis System and Method for Legal Documents," filed on Sep. 8, 2015, the disclosure of each of which is incorporated herein by reference in its entirety.

TECHNICAL FIELD

The subject matter of this application is generally related to document management and more particularly relates to modifying a document management system using machine learning.

BACKGROUND

"Big data" generally refers to a collection of one or more data sets that are so large or complex that traditional database management tools and/or data processing applications (e.g., relational databases and desktop statistic packages) are not able to manage the data sets within a tolerable amount of time. Typically, applications that use big data are transactional and end-user directed or focused. For example, web search engines, social media applications, marketing applications and retail applications may use and manipulate big data. Big data may be supported by a distributed database which allows the parallel processing capability of modern multi-process, multi-core servers to be fully utilized.

SUMMARY

Systems, methods, and computer program methods for assessing a validity or invalidity of a patent are described.

The details of one or more implementations of the subject matter described herein are set forth in the accompanying drawings and the description below. Other features, objects, and advantages of the subject matter described herein will be apparent from the description and drawings, and from the claims.

DESCRIPTION OF DRAWINGS

FIG. 15 shows an example screenshot of a rating chart.

FIG. 16 is a matrix of an example list of validity strength ratings that can be determined by the data analysis system.

FIG. 23 shows an example of a process for assessing validity or invalidity of a patent based on one or more analytical models.

FIG. 25 is an example of a process of identifying prior inventions based on user input.

Like reference symbols in the various drawings indicate like elements.

DETAILED DESCRIPTION

System Overview

Figure 1:
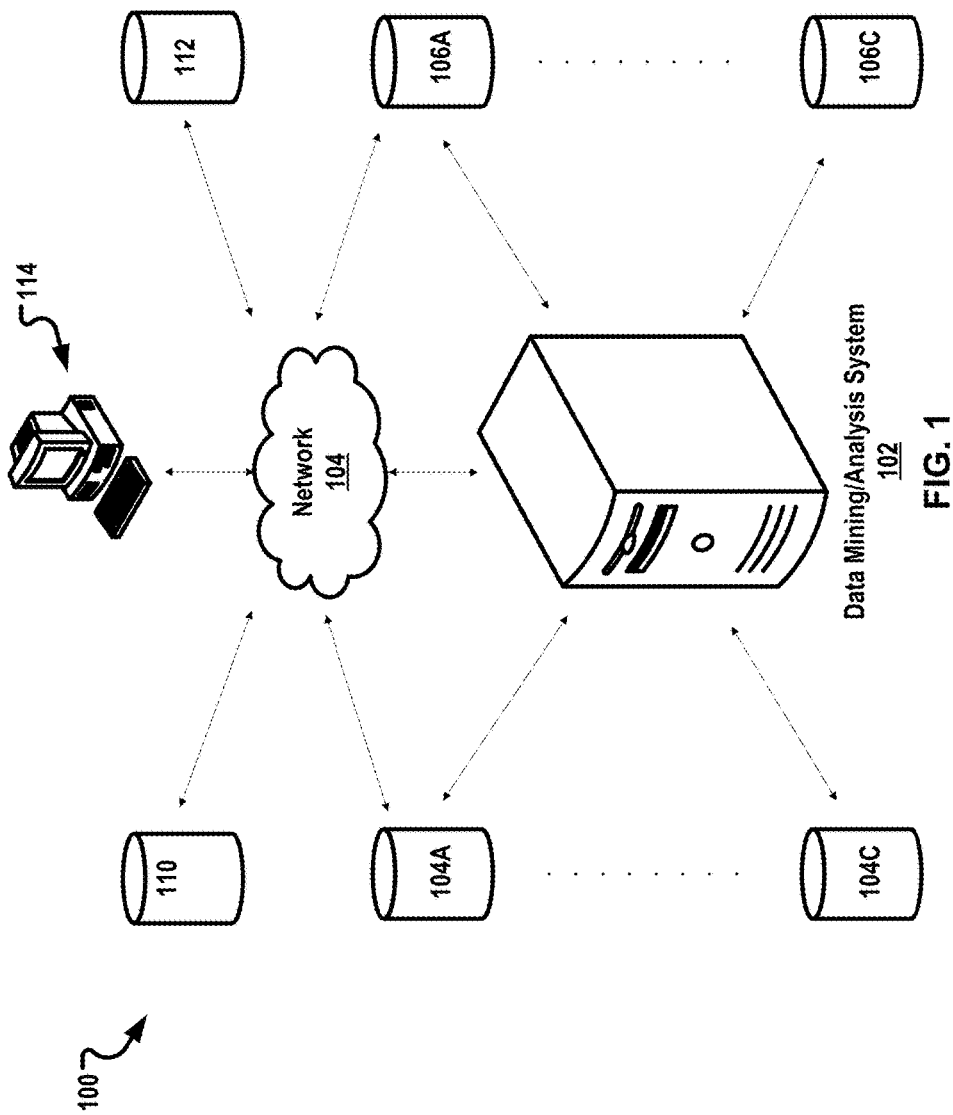
FIG. 1 shows an example of a data management system.

With the new institution of post-grant proceedings designed to allow accused infringers and third parties alike to challenge granted patents in a trial proceeding before the PTAB, legal counsel find themselves in a unique junction with more client opportunities but also with a new trial process and unpredictable patent judges.

The system and method as described herein enable law firms, practicing attorneys, and other legal entities to capitalize on this opportunity by providing actionable data intelligence via natural language processing, machine learning of incoming documents, and data mining of related assets. By continuously drawing on statistical insights using the system and method described herein, users (e.g., law firms, practicing attorneys, and other legal entities) are able to, among other things, conveniently review a judge's ruling trends, determine the potential case-dispositive impact of a motion or amendment, understand how the nuances of various rulings and procedures have boarder implications, and forecast with reasonable accuracy the probability that the Patent Trial and Appeal Board (hereinafter, the "PTAB" or "Board") of the U.S. Patent & Trademark Office (hereinafter, "USPTO" or "Patent Office") will ultimately grant review to a particular claim or affirm or cancel a particular claim of a patent.

At a high level, data analytical models can be generated based on one or more data analysis algorithms. Initially, the data analytical models can be "untrained", and subsequently "trained" by processing training and predictive data and generating information that defines the models. The data analytical models can then be deployed to provide predictions of future outcomes and actionable recommendations based on past rulings. In so doing, the system and method as described herein can give users full visibility to the case landscape, including rulings of other patents involved in similar technology, prior track records of designated judges, and case portfolios of competing law firms before the PTAB in determining how the Board will likely treat a particular patent that is or will be undergoing post-grant or inter partes review.

One or more problems can be addressed using the subject matter described herein. For example, for small and large businesses, innovation is priceless, and the ability to safeguard original ideas can determine the survival of a company. To protect and defend a patent holder's intellectual property (IP) from patent infringers and from costly trials, legal departments must find the most effective path to resolution and drive proactive settlement terms. For accused infringers, in-house counsel must identify potential validity weaknesses early on to help shift the settlement dynamic to their favor.

The system and method as described herein can help users such as in-house legal counsel guide their litigation strategy and institute cost-saving measures using the predictive analyses and actionable intelligence to avoid expensive legal proceedings. The system can offer these businesses calculated insights to maximize on the chance to win in every validity challenge. In sum, predictive analytic on patents helps these companies unlock the true value of business intelligence by making critical statistical information transparent, meaningful, and usable at much higher frequency.

For example, through the system and method described herein, small and large businesses can recruit the best outside counsel by searching through the system based on the firm's credentials, success rate in post-grant and inter partes review proceedings, and win statistics by attorney and judge pairings and other criteria, as will be discussed in greater detail below.

To help formulate the most rewarding strategy, the system and method as described herein also helps review any past or present proceedings for other cases to predict the likelihood that a current proceeding for a particular patent will be terminated with one or more claims canceled and/or affirmed to help you determine your offensive or defensive strategies, including whether to pursue patent infringement suits, ITC's § 337 enforcement, and declaratory judgments, as will be discussed in greater detail below.

Thus, the system and method as described herein can offer any small and large business the exceptional ability to settle on patent validity early on in a case's lifecycle which helps to streamline pre-suit preparation, reduce outside attorney and expert costs, and facilitate settlement among the parties long before commencement of trial. The cornerstone of success for many patent infringement suits is the intellectual, cognitive ability to make critical decisions quickly and accurately. The system as described enables any company do just that while reallocating cost savings to first-order priorities.

The advantages as described herein are not limited to businesses. Users such as IP stakeholders and collaborators (e.g., investors (venture capitalists, investment banks), auditors, advisors, innovators, public officials, and influencers) also can benefit from the use of the system and method described herein. For example, whether it's risk assessment, financial audit, or strategy consulting, IP stakeholders and contributors to the IP management process can utilize the system and method described herein to provide a holistic approach to discovering the in's and out's of patents undergoing post-grant or inter partes review proceedings.

As will be discussed in greater detail below, the system and method as described herein can employ legal analytics and business intelligence to help users become acquainted with the current patent landscape, understand the economic impact of granted patents, and identify rapid technological trends.

As an example, the system and method as described herein allows its users to quickly identify which technology is and remains the most active, how patent filing patterns have changed over time, and where important technology battles and business stakes are taking place. The system and method as described herein can also provide a visual representation of information in a way that is easy to understand, allowing for stakeholders and contributors to quickly capture information they need for their own due diligence research.

Data Mining Overview

A data mining tool is computer software that analyzes data and discovers relationships, patterns, knowledge, or information from the data. Data mining is also referred to as knowledge discovery. Data mining tools attempt to solve the problem of users being overwhelmed by the volume of data collected by computers operating business applications generally and including particularly those for e-commerce. Data mining tools attempt to shield users from the unwieldy body of data by analyzing it, summarizing it, or drawing conclusions from the data that the user can understand.

An analytic application is a software application that inputs historical data collected from a production system over time, analyzes this historical data, or samples of the historical data, and outputs the findings back to the production system to help improve its operation. The term "application" is used throughout this specification to mean "software application," referring to a category of software typically understood to be used directly by end users to solve practical problems in their work.

Data mining is an important technology to be integrated into analytic applications. Data mining can include data processing technology, combinations of hardware and software, that dynamically discover patterns in historical data records and applies properties associated with these records to production data records that exhibit similar patterns. Use of data mining can include identifying a business problem to be solved, selecting a mining algorithm useful to solve the business problem, defining data schema to be used as inputs and outputs to and from the mining algorithm, defining data mining models based upon the defined data schema, populating input data schema with historical data, training the data mining model based upon the historical data, and scoring historical data or production data by use of the model.

The term "model", as described herein, can refer to data mining models. The terms "model" and "mining model" can both refer to data mining models. In some implementations, a data mining model can include a data mining model definition. In some implementations, a production-trained data mining model can include a data mining model definition and a knowledge base.

"Data schema" can include data structures, defined aggregates of data elements. As described herein, the term "data schema" refers to schema and to data stores, files, or records fashioned in dependence upon the schema. The terms "field" and "data element" can be used as synonyms. Because of the convention of viewing records and fields in a file as though they were respectively rows and columns on a chart, fields and data elements can be sometimes referred to as "columns." The term "record" can be used to refer to specific instances of data schema. In this sense, as the terms typically are used, data stores or databases are comprised of data files which in turn are comprised of records which in turn are comprised of data elements or fields.

Analytic applications can function in a general cycle in which historical data is collected from a production system over time, historical data, or samples of historical data, can be analyzed, and findings can be output back to the production system to help improve its operation. The quantities of data to be analyzed can be large, and the computational demand can be intense. The whole cycle can often be executed at regular intervals, for example, once daily at night so that reports showing the analytic findings can be available for review the next morning. There is an increasing demand, however, to do the analysis faster and more frequently so that the results on business performance can be reported back within as little as a few hours, in some cases, as little as two or three hours, or even far less (e.g., within seconds). In fact, it appears that there is a trend in this area of technology to press for near real-time analytic reporting, which is now made possible by the advent of data mining technologies.

A data mining model can be defined to address a given business question based on a given data schema. Data mining tools can be generic applications that are operated independently with respect to specific applications. Because conventional data mining tools do not include set business questions, predefined data schema, or predefined data mining models, end users would need to analyze business questions, define data schema useful with respect to the questions, and define their own data mining models based upon the data schema. Developers of analytic applications incorporating conventional data mining tools do not supply predefined data mining models. Without predefined data mining models, the data mining analytic cycle could not be automated.

Accordingly, in analytic applications using data mining tools, there is significant benefit in predefining, developing, and training data mining models whenever possible, as this will enable analytic applications to develop analytic applications capable of automating data mining and analytical cycles so that end users can train and apply predefined data mining models with no need for specialized data mining expertise and with no need for end user intervention in data mining processes as such.

A useful key to simplifying the use of data mining in analytic applications is to make the analytic application domain-specific. "Domain" refers to a problem subject area, and "domain-specific" means that an analytic application is designed to operate on the basis of data related to a particular problem subject area, where the data has specific defined data elements with defined relations among the data elements. For example, legal industry is a specific domain, and a domain-specific analytic application for the legal industry would accept and analyze only legal related data. For illustration purposes in this specification, legal is chosen as the domain of interest. However, the subject matter described herein can be applied to other domains (e.g., patent prosecution in which patent applications are examined by patent examiners).

In general, for a specific domain, the system and methods as described herein can identify business problems that are applicable to such a specific domain. Once the business problems that need data mining are identified, the system and methods as described herein can be used to build an analytic application to solve these business problems so that the analytic application developer can embed in the analytic application all data mining related knowledge needed for the solution so that the end user of the application does not require data mining specific expertise.

The terms "input data," "input schema," "output data," and "output schema" refer to inputs and outputs to and from data mining algorithms in data mining models. Naturally there are processes having inputs and outputs other than data mining algorithms. Data output from historical data, for example can be input to data schema used for data mining. And data output from data mining can be input to production data. Nevertheless, by convention in the following discussion, "input data," "input schema," "output data," and "output schema" refer to inputs and outputs to and from data mining algorithms in data mining models.

Data Management System

Figure 8:
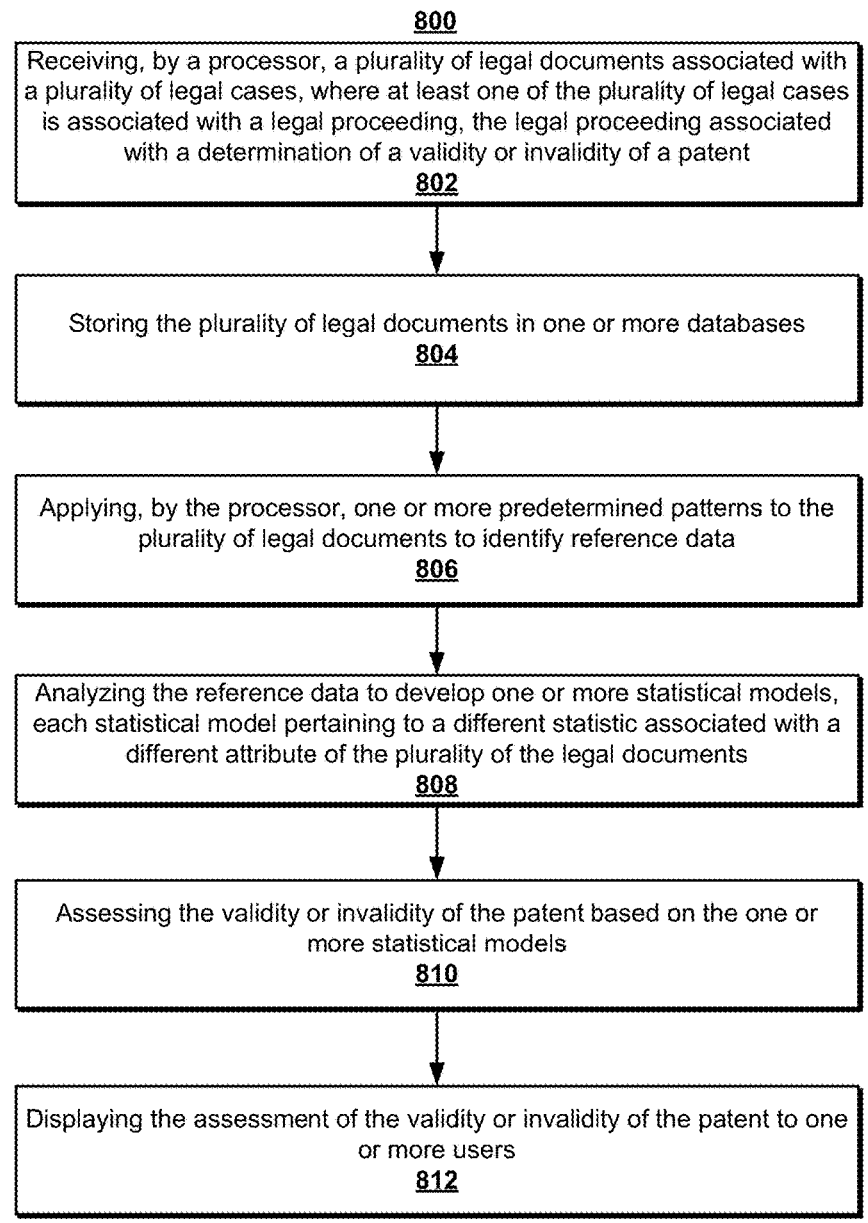
FIG. 8 shows an example of a process for assessing validity or invalidity of a patent based on one or more analytical or statistical models.

FIG. 1 illustrates an example of a system for mining data from documents. FIG. 8 shows an example of a process 800 for assessing validity or invalidity of a patent based on one or more analytical or statistical models. FIG. 8 will now be discussed in conjunction with FIG. 1, FIG. 2 and FIG. 3.

At 802, a plurality of legal documents associated with a plurality of legal cases can be received, where at least one of the plurality of legal cases can be associated with a legal proceeding, and the legal proceeding can be associated with a determination of a validity or invalidity of a patent (e.g., whether a claim of the patent will likely be granted review, canceled or affirmed by the Board).

Referring to FIG. 1, a database management system 100 can be configured to receive a plurality of legal documents. The database management system 100 can include a data mining/analysis system 102 connected to one or more databases or repositories 104A to 104C and 106A to 106C that store data such as documents or files. Examples of such data can include, but are not limited to, legal documents, product descriptions, technical manuals, published journals, white papers, or the like. Where the repositories 104/106 include legal documents, such documents can also include case decisions, orders, briefs, forms, treaties, academic journals, or other types of law-related documents.

The data mining/analysis system 102 can also be connected to a plurality of proprietary data sources 110 and 112 that are accessible over a network 104 such as the Internet or local area network. For example, the data sources 110/112 can be privately accessible using a secure connection technology, or they can be both publicly and privately accessible. As another example, data source 110 can be privately accessible over the network 104 using a secure connection, while data source 112 can be publicly accessible over the network 104.

In some implementations, the documents in the repositories 104/106 and data sources 110/112 can be fetched from a variety of public or private sources or domains. In some implementations, the documents can include legal documents fetched from the United States Patent and Trademark Office's database server. In some implementations, the legal documents can include those submitted through the inter partes/post-grant review proceeding.

Inter partes/post-grant review proceeding (hereinafter, the "review proceeding") is a trial proceeding conducted by the PTAB or Board to review the patentability of one or more claims in a patent on a ground that could be raised under 35 U.S.C. §§ 101, 112, 102 and/or 103, and on the basis of prior art consisting of patents or printed publications. The review proceeding generally begins with a third party (e.g., a petitioner who wants to challenge the validity of one or more claims of a patent) filing a petition after the later of either nine months after the grant of the patent or issuance of a reissue patent; or if a post grant review has been instituted, the termination of the post grant review. As part of the review proceeding, the patent owner can file a preliminary response to the petition.

The Board can then institute (or deny instituting) a post-grant or inter partes review proceeding upon a showing by the petitioner that there is a reasonable likelihood that the petitioner would prevail with respect to at least one claim challenged. Based on the evidence in the record, the Board can decide whether to institute the review proceeding, and if so, note the decision in its Decision (Not) to Institute Trial. The Board then allows the parties to perfect the record with exhibits, declarations, and evidence in support of their respective decision. An oral hearing, if requested by the parties, can then be held. A Final Decision order can then be issued by the Board within one year (which can be extendable for good cause by 6 months) from the date on which the Decision to Institute Trial is issued. The Final Decision summarizes the Board's order as to whether the subject patent is valid or invalid, and if so, which claims are affirmed or canceled by the Board.

In some implementations, the database management system 100 can communicate with the Board's electronic workflow system such as the Patent Review Processing System ("PRPS") for accessing documents submitted during the review proceeding in electronic format. These documents can be scanned into the Board's PRPS system and stored in electronic image format.

In some implementations, the database management system 100 can access, retrieve, and store copies of the image records or electronically filed documents that have been scanned into or stored inside the PRPS system, including documents in various formats such as PDF, MPEG, or WORD files.

In some implementations, the database management system 100 can fetch, analyze and extract (e.g., from the PRPS system) documents submitted throughout a review proceeding. For example, the database management system 100 can receive a plurality of legal documents associated with the review proceeding for each case such as, without limitation, petitions requesting trial, decisions to institute trial, requests for rehearing, scheduling orders, preliminary responses, motions to amend, motions to exclude, motions for additional discovery, motions to seal, requests to submit supplemental information, conduct of proceedings, oral hearing transcripts, final decisions, notices of appeal, and settlement documents.

As another example, the database management system 100 can fetch for documents submitted during discovery such as affidavits or declarations by experts or witnesses, documents submitted as part of a routine discovery or additional discovery, and documents that are otherwise necessary in the interest of justice.

As another example, the database management system 100 can fetch for documents submitted as part of a routine discovery including exhibits that are cited in filings or affidavits; cross examination of individuals submitting affidavit testimony; and relevant information that is inconsistent with a position being advanced by either the patent owner or the petitioner.

As another example, the database management system 100 can fetch for documents submitted as part of an additional discovery including documents submitted in any other discovery a party wishes to pursue. Although the subject matter of such requests is not explicitly restricted, if the parties cannot agree on the availability or scope of additional discovery, the Board can allow it only upon a showing that "such additional discovery is in the interests of justice."

Where a requesting party submits evidence tending to show that the requested discovery will lead to further evidence, such evidence can also be included as legal documents to be analyzed and extracted.

Referring back to FIG. 8, at 804, the plurality of legal documents can be stored in one or more databases. For example, the legal documents extracted from the PRPS system can be stored in the repositories 104/106 or data sources 110/112. In some implementations, the documents stored in the repositories 104/106 and data sources 110/112 can include structured documents. For example, structured documents can include a table of contents, indexes, or other format or forms of organization. Examples of these structured documents can include petitions, mandatory notices, and decisions (e.g., Decision (Not) to Institute Trial and Final Decisions).

In some implementations, the documents stored in the repositories 104/106 and data sources 110/112 can include non-structured documents. For example, non-structured documents can include exhibit lists, notices of stipulation of due dates, parties' demonstratives, parties' list of proposed motions, and other documents that do not have any particular format or form of organization.

In some implementations, the documents in the repositories 104/106 and data sources 110/112 can be stored in a portable document format (PDF) created by Adobe Systems Incorporated® of San Jose, Calif., and indexed for researching. In other implementations, the data stored in the repositories 104/106 can operate with other equivalent or similar document formats (e.g., WORD® or MPEG files).

In addition to extracting data and documents such as those discussed above, the database management system 100 can be used to index the data and documents stored in the repositories 104/106 and data sources 110/112 to facilitate search, retrieval, and/or other functions. For example, legal documents, such as court decisions, briefs, motions, etc., can be stored and indexed for users to access electronically by the database management system 100. As different legal documents can include different legal points or legal issues pertaining to different jurisdictions, those, the database management system 100 can index and organize such documents accordingly.

In some implementations, a search engine, though not shown, can be provided to facilitate searching and retrieval. For example, search terms can first be matched to terms appearing in the body of a document. Documents can then be ranked based on, for example, the distance between the matched words in the document, and results shown via a computer apparatus 114.

In some implementations, the data mining/analysis system 102 and the repositories 104/106 and data sources 110/112 can be in communication with a client system or device including but not limited to desktop systems, laptops, wireless personal digital assistants, smartphones, or the like such as the computer apparatus 114. Components of the computing apparatus 114 can include those shown in FIG. 9. For example, the client system can include one or more processors, and the processors can couple to one or more bus systems.

The client system can include one or more instances of computer-readable storage media, which couple to a bus systems. The bus systems can enable the client system's processors to read code and/or data to/from the computer-readable storage media. The computer-readable storage media can represent storage elements implemented using any suitable technology, including but not limited to semiconductors, magnetic materials, optics, or the like. The media can include memory components, whether classified as RAM, ROM, flash, or other types, and can also represent hard disk drives.

The computer-readable storage media can include one or more modules of instructions that, when loaded into the processor and executed, cause the client system to access data that was extracted from one or more documents. These modules can perform various algorithms and techniques that are described and illustrated as being performed by the client systems. For example, the computer-readable media can include one or more applications, which can represent word processing applications, spreadsheet applications, database applications, applications related to managing workflows, or the like.

The computer-readable media can include a repository interface that serves as an interface to the repositories 104/106 and data sources 110/112. For example, the repository interface can provide a set of methods or application program interfaces (APIs) for querying the repositories 104/106 in response to requests from the user. In addition, the repository interface can receive responses from the repositories 104/106 and data sources 110/112, and format them as appropriate for presentation to the requesting user. Requests and responses can be exchanged between the interface and the repositories 104/106 and data sources 110/112. More specifically, these requests and responses can include a number of queries passing from the repository interface to the repositories 104/106, as well as mined data returned by the repositories 104/106 and data sources 110/112 in response to these queries.

For a client system to access the data extracted from the one or more documents, a request or query can be sent to the repositories 104/106. For example, the repository interface can request any extracted data from the repositories 104/106 in response to requests received from one or more client applications.

At the repositories 104/106, upon receiving the query for extracted data, it can be determined whether the repositories 104/106 contain any extracted data that is responsive to the input query. If the repositories 104/106 contain data responsive to the query, then a response along with the requested data is returned to the requesting repository interface.

If the repositories 104/106 do not contain any extracted data responsive to the input query, the data management system 100 can then mine one or more documents in an effort to locate data responsive to the input query (e.g., as will be discussed in greater detail in FIG. 10C). For example, the data management system 100 can extract or mine any or all information from one or more of these documents, and subsequently update the repositories 104/106 with the results of such mining or extraction processes that can be then used by a data analysis system for developing models underlying the system's 100 predictions and recommendations.

The data management system 100, in some implementations, can return an error message or otherwise indicating that the repositories 104/106 do not contain data responsive to the input query.

At the repository interface, the extracted or mined data can be arranged or formatted for presentation (e.g., in the form of statistics) to one or more users via the applications on the client device. For example, the data management system 100 can arrange the extracted data in the form of graphs, charts, or the like for presentation.

In sum, the database management system 100 can include software that receives and processes queries, obtains data satisfying the queries, and generates and transmits responses to the queries, such as to and from the data mining/analysis system 102, or for display on the computing apparatus 114. The data mining/analysis system 102 can store the attributes or data as mined or extracted from the documents stored in the repositories 104/106. The information can be in the form of text, phrases, words, or keywords. Other related data elements or data items also can be included.

While FIG. 1 shows examples in which the repositories 104/106 reside outside the data mining/analysis system 102, it is noted that in some implementations, the repositories 104/106 can be housed inside the data mining/analysis system 102. In some implementations, the repositories 104/106 can reside on another server, and made accessible to the data mining/analysis system 102 over, for example, the network 104.

In some implementations, the data management system 100 can associate different sets, elements, and/or variables of the extracted data with one another, so as to indicate structure or relationships among different instances of such data in a visual manner for presentation to the user.

In some implementations, the data management system 100 can employ these relationships to formulate one or more analytical or statistical models (e.g., as trained model 310) that can be used to produce predictive analytics. As will be discussed in greater detail below, the data mining/analysis system 102 can develop trained models that can include analytical or statistical models focusing on correlations and relationships between various data (e.g., via the correlation module 222 and the model development module 228, as will be discussed below) based on, for example, the following sets, elements, and variables:

Name of the real party in interest for the petitioner (e.g., 23 out of 151 Final Decisions involve "Apple, Inc." as the real party in interest for the petitioner);

Name of the real party in interest for the patent owner (e.g., 42 out of 151 Final Decisions involve "Intellectual Ventures, Inc." as the real party in interest for the patent owner);

Name of the petitioner's legal counsel and associated law firm (e.g., 3 out of 151 Final Decisions involve "Fish & Richardson P. C." as the petitioner's legal counsel);

Name of the patent owner's legal counsel and associated law firm (e.g., 42 out of 151 Final Decisions involve "McKool Smith" as the patent owner's legal counsel);

Total number of patent claims in a patent being challenged (e.g., patents with at least one claim affirmed by the Board contain, on average, 20 claims with 2.3 independent claims and 17.7 dependent claims, and patents with at least one claim canceled by the Board contain, on average, 5 claims with 1.7 independent claims and 3.3 dependent claims);

Number of patent claims being challenged (e.g., patents with at least two claims canceled by the Board have, on average, 18.1 claims challenged by the petitioners, and patents with at least three claims affirmed by the Board have, on average, 35.2 claims challenged by the petitioners);

Number of prior art cited in the petition (e.g., patents with at least five claims affirmed by the Board have on average, 5.4 prior art references cited by the petitioner, where 3.2 prior art references have already been considered by the Patent Office, and 2.2 prior art references are new references cited by the petitioner, and patents with at least two claims canceled by the Board have on average, 2.1 prior art references cited by the petitioner, where 1.7 prior art references have already been considered by the Patent Office, and 0.4 prior art references are new references cited by the petitioner);

Number of grounds requested by the petitioner (e.g., patents with at least two claims canceled by the Board have on average 6.2 grounds requested by the petitioner of which 3.2 grounds are based on 35 U.S.C. § 102(a), 1.2 grounds are based on 35 U.S.C. § 102(b), 0.5 grounds are based on 35 U.S.C. § 102(e), and 1.3 grounds are based on 35 U.S.C. § 103); and patents with at least one claim affirmed by the Board have on average 3.3 grounds requested by the petitioner of which 0.5 grounds are based on 35 U.S.C. § 102(a), 1.4 grounds are based on 35 U.S.C. § 102(b), 0.8 grounds are based on 35 U.S.C. § 102(e), and 0.9 grounds are based on 35 U.S.C. § 103);

Number of expert declarations submitted by the petitioner (e.g., patents with at least one claim canceled by the Board have, on average, 3.2 declarations are submitted by the petitioner; and patents with at least one claim affirmed by the Board have, on average, 1.1 declarations are submitted by the petitioner);

Number of expert declarations submitted by the patent owner (e.g., patents with at least one claim affirmed by the Board have, on average, 2.3 declarations are submitted by the patent owner; and patents with at least one claim canceled by the Board have, on average, 0.5 declarations are submitted by the patent owner);

Names of the presiding judges in Decision (Not) to Institute Trial and Final Decision (e.g., judge "X" has a record of 95% in affirming at least one claim; judge "Y" has a record of 91% in canceling at least one claim, and judge "Z" has a record of 42% and 58% in affirming and canceling at least one claim, respectively);

Name of the authoring judge in Decision (Not) to Institute Trial and Final Decision (e.g., the authoring judge "W" has a record of 91% in ruling at least one claim construction in favor of the petitioner, 94% in canceling at least one claim, 52% in favor of the patent owner on the issue of assignee estoppel, and 32% in granting review on at least one claim based on 35 U.S.C. § 103 ground);

Number of grounds based on 35 U.S.C. § 102 granted or denied by the Board in Decision (Not) to Institute Trial (e.g., the Board grants, on average, 2.1 grounds based on 35 U.S.C. § 102(a), 1 ground based on 35 U.S.C. § 102(b), 0.3 ground based on 35 U.S.C. § 102(e));

Number of grounds based on 35 U.S.C. § 103 granted or denied by the Board in Decision (Not) to Institute Trial (e.g., the Board grants, on average, 4.2 grounds based on 35 U.S.C. § 103);

Total number of terms construed by the Board in Decision (Not) to Institute Trial and Final Decision (e.g., on average, the Board construes 4.2 terms in Decision to Institute Trial, 3.1 of which favor the petitioner, and 1.1 favor the patent owner; and 3.2 terms in Final Decision, 2.4 of which favor the petitioner, and 0.8 of which favor the patent owner);

Number of prior art already cited in the patent being challenged and re-considered by the Board in Decision (Not) to Institute Trial and Final Decision (e.g., patents with at least one claim canceled have, on average, two prior art already cited in the patent being challenged and re-considered by the Board);

Number of new prior art not already cited in the patent being challenged and now considered by the Board in Decision (Not) to Institute Trial and Final Decision (e.g., patents with at least one claim canceled have, on average, three prior art references newly cited by the petitioner and considered by the Board);

Number of terms construed by the Board in Decision (Not) to Institute Trial and Final Decision that favors the petitioner in related cases (e.g., patents with at least three claims canceled by the Board have, on average, four claim terms construed that favor the petitioner);

Number of terms construed by the Board in Decision (Not) to Institute Trial and Final Decision that favors the patent owner in related cases (e.g., patents with at least one claim canceled by the Board have, on average, four claim terms construed that favor the patent owner);

Number of claims canceled by the Board (e.g., on average, the Board cancels 17.4 claims for each patent petitioned to be reviewed by the petitioner);

Number of claims affirmed by the Board (e.g., on average, the Board affirms 6.5 claims for each patent petitioned to be reviewed by the petitioner);

Name of related cases (e.g., continuation, continuation-in-part, divisional) also involved in inter partes/post-grant review proceedings (e.g., cases with at least two related patents undergoing inter partes/post-grant review have a 84% of being canceled by the Board with respect to at least one claim); and Case Name of Parallel District Court or ITC (International Trade Commission) proceeding.

In some implementations, data associated with the foregoing attributes can be extracted from a current proceeding or a related proceeding (e.g., another inter partes/post-grant review proceeding involving a patent related to the one being challenged in the current proceeding) by the data mining/analysis system 102. In some implementations, attributes can be gathered from other third-party data sources (e.g., private or public domains).

As discussed above, the data mining/analysis system 102 can provide an objective evaluation of a patent being challenged via inter partes/post-grant review proceedings, and the likelihood that a patent will be ruled valid (e.g. where all claims will be affirmed by the Board), invalid (e.g. where all claims will be canceled by the Board), or partially valid/partially invalid (e.g., where some claims will be affirmed while others will be canceled by the Board). In some implementations, this evaluation can require access to pertinent historical data, such as in prior, related as well as unrelated proceedings involving other related or unrelated patents. As an example, the evaluation can take into the account of all prior winning records by a particular attorney before the Board in evaluating the likelihood that a patent being challenged by that attorney will likely to be granted review, or ruled valid or invalid.

As this pertinent data is acquired, it can be stored and compiled within the data mining/analysis system 102. The data mining/analysis system 102 can be implemented as a relational database management system (RDBMS) to facilitate the creation of data relationships/correlations and the application of sophisticated statistical analysis with an emphasis on predictive modeling.

Using a sophisticated statistical analysis, the data mining/analysis system 102 can generate objective reports that can be utilized by legal practitioners, law firms, consultants, investors, and IP stakeholders who might have an interest in patent validity based on the data relationships. These reports can help determine functional limitations and interrelationships and correlations between various attributes and variables (e.g., attributes and variables discussed above and below). Likewise this process can help users such as in-house legal counsel guide their litigation strategy and institute cost-saving measures to avoid expensive legal proceedings.

In compiling the data and predictive analytics, training data can be collected for analyzing the data populations used to generate predictions and recommendations, and ensure data integrity. The data mining/analysis system 102 can store data pertinent to each patent any and all historical data about the patent as well as domestic and foreign prosecution history. Data variables can be defined from within the collection of data (e.g., variables such as, without limitation, name of assignee/patent owner, number of claims, judges' names and the like), and mathematical constructs (e.g., beta, chi-square and gamma statistical models) can be applied in determining each variable's statistical significance in making variable associations, predicting data outcomes, and identifying actionable tasks in the form of recommendations.

For example, statistical analysis can be applied to determine how strongly the use of three expert declarations by the petitioner predicts that at least one claim in the disputed patent will likely be canceled or affirmed by the Board. Other correlations, such as those discussed below, also are contemplated.

While the foregoing implementations are described with respect to patents being challenged (e.g., patents where associated petitions have already been filed), these implementations also are applicable to patents that are not yet challenged (e.g., patents not yet petitioned or challenged by the petitioner). In some implementations, the data mining/analysis system 102 can generate analytical or statistical models similar to those discussed above for patents not yet challenged by extracting and analyzing patent data such as the name of the assignee, filing date, issue date, number of references cited, number of claims as issued, legal counsel representing the patent owner (e.g., the law firm or attorney on the record responsible for prosecution), related cases, field of search, classification, and the like. These data, in some implementations, can be compared to those patents under challenged to provide a comprehensive list of predictive analytics, as will be in greater detail discussed below.

Data Extraction

Figure 2:
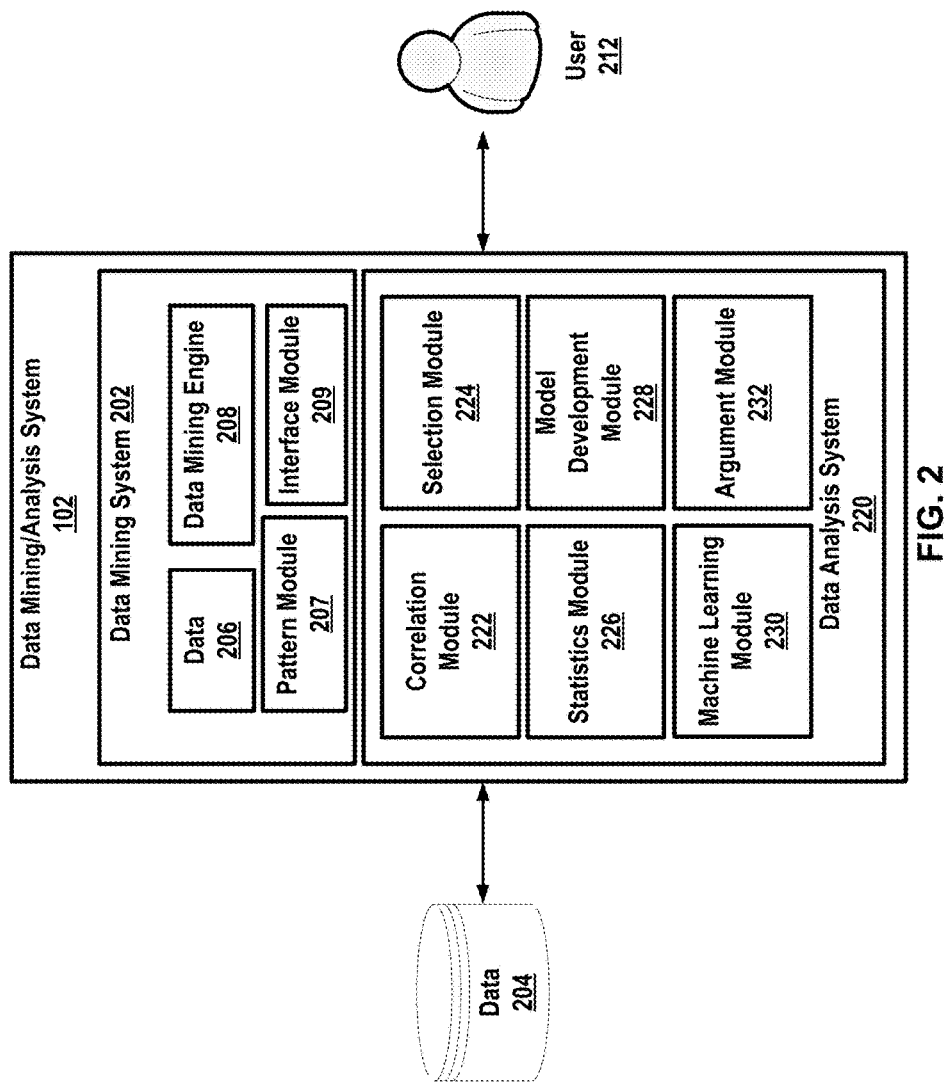
FIG. 2 shows an example structure of the data mining/analysis system.

As discussed above, the data mining/analysis system 102 can be in communication with a variety of data sources 110/112 and repositories 104/106. FIG. 2 shows an example structure of the data mining/analysis system 102.

Referring to FIG. 2, the data mining/analysis system 102 can include a data mining system (or module) 202 having an internally stored data 204, a data mining engine 208, and a pattern module 207. In some implementations, the data 206 can be arranged as a plurality of data tables, such as relational data tables, as well as indexes and other structures that facilitate access to the data. The data mining engine 208 can perform data mining processes, such as processing data to generate data mining models and responding to requests for data mining results from one or more users, such as user 212.

Though not shown, the data mining/analysis system 102 can include database management processing routines that provide database management functionality, such as database query processing, and data mining processing routines that implement the data mining processing. In some implementations, this data mining processing can be integrated with database management processing. For example, the data mining processing can be initiated by receipt of a database query, either in standard SQL or in the form of extended SQL statements.

Referring back to FIG. 8, at 806, one or more predetermined patterns can be applied to the plurality of legal documents to identify reference data. For example, data mining engine 208 can apply one or more predetermined patterns to the legal documents stored in the repositories 104/106 in performing one or more data mining processes, concurrently or sequentially.

For example, where the documents stored in the repositories 104/106 include one or more legal documents, the data mining system 202 can extract information that can include legal terms found within such documents and/or standardizations of such terms. Legal terms can include, but are not limited to, words or phrases that are associated with laws and statutes (e.g., "America Invents Act," "35 U.S.C. § 102," "35 U.S.C. § 103", "35 U.S.C. § 112" and the like), legal theories (e.g., "anticipation," "obviousness," "inherency", "long-felt need," and "secondary considerations"), case names (e.g., "Apple v. Samsung," "ContentGuard Holdings Inc. v. ZTE Corporations," and the like), or words commonly used in the legal field (e.g., "laches," "estoppel," "authentication", "hearsay" and the like).

In some implementations, depending on the information desired to be extracted, different patterns (e.g., managed by the pattern module 207) can be applied to the documents. For example, the data mining system 202 can apply a particular pattern recognition (e.g., "registration no.", "reg. no.", "registration number", "reg. number", and the like) to the legal documents to extract information associated with a legal counsel's registration number. As another example, the data mining system 202 can apply a different pattern recognition (e.g., "patent number", "pat. no.", "patent no.", "patent #", and the like) to the legal documents to extract information associated with the patent number of the subject patent.

As yet another example, the data mining system 202 can apply the following pattern code to receive a text in a document, split the text into one or more sentences, and parse each sentence separately to extract data associated with variables such as claim number, related statutes, decision by the Board:

```
String paragraph=Joiner.on(" ").join(chapter.getLines( ));
String[ ] sentences=NlpUtils.getInstance( ).sentenceSplit(paragraph);
for (String sentence:sentences) {
List<Claim>parsedClaims=extractor.parseSentence(sentence, status);
if (parsedClaims !=null && !paragraph.isEmpty( )) {
    result.addAll(parsedClaims);
}
}
return result;
```

Other more complex data can be extracted using a variety of pattern recognition techniques such as maximum-likelihood and Bayesian parameter estimation, nonparametric techniques, distance-based methods, linear discriminant functions, and cluster-based natural language processing, in addition to or conjunction with data mining algorithms such as C4.5 (e.g., classifiers expressed as decision trees), k-Means, SVM (Support Vector Machine), Apriori, EM (Expectation-Maximization), PageRank, AdaBoost, kNN (k-nearest neighbor classification), Naive Bayes, and CART.

Based on the foregoing pattern recognition techniques, the data mining system 202 can apply one or more predetermined patterns to extract information in a petition filed by third parties or petitioners challenging the validity of one or more claims in a patent, including attributes and variables such as, without limitation, those shown in TABLE A below:

TABLE A

1. The name of a petitioner (e.g., real party of interest of the petitioner including all licensor/licensee information);
2. The name of a patent owner (e.g., real party of interest of the patent owner including all licensor/licensee information);
3. The patent number of a patent for which the petition is filed;
4. The name of counsel and/or law firm representing the petitioner;
5. Any related matter (e.g., parallel district court, ITC, IPR (inter partes) or CBM (covered business method) case(s));
6. Related technology area (e.g., via class(es) and subclass(es) under which the subject patent is classified);
7. The number of claims challenged and the listing of such claims;
8. The total number of 102/103 grounds requested by the petitioner in the petition;
9. The name of any expert witness whose declaration is being relied upon in the petition;
10. The identification of all relevant prior art cited in the petition;
11. Identification of terms with the petitioner's claim construction;

TABLE A-continued

12. Legal authority or case law cited by the petitioner; and
13. Legal arguments advanced by the petitioner.

As another example, the data mining system 202 can apply one or more predetermined patterns to extract information in the patent owner's preliminary responses that can include attributes and variables such as, without limitation, those shown in TABLE B below:

TABLE B

1. The date on which a preliminary response is waived, if any;
2. The filing date of the preliminary response;
3. The name of a petitioner (e.g., real party of interest of the petitioner including all licensor/licensee information);
4. The name of a patent owner (e.g., real party of interest of the patent owner including all licensor/licensee information);
5. The name of counsel and/or law firm representing the patent owner;
6. The name of any expert witness whose declaration is being relied upon in the preliminary response;
7. The identification of all relevant prior art discussed in the preliminary responses;
8. Identification of terms being disputed by the patent owner;
9. Any related matter (e.g., parallel district court, ITC, IPR (inter partes) or CBM (covered business method) case(s));
10. Legal authority or case law cited by the patent owner; and
11. Legal arguments advanced by the patent owner.

As another example, the data mining system 202 can apply one or more predetermined patterns to extract information in the Board's Decisions to Institute Trial that can include attributes and variables such as, without limitation, those shown in TABLE C below:

TABLE C

1. The names of the presiding judges;
2. The name of the authoring judge;
3. The date of the Decision (Not) to Institute Trial;
4. The total number of claims granted for review by the Board and listing of such claims;
5. The total number of claims denied review by the Board and listing of such claims:
6. The total number of 102/103 grounds granted by the Board in instituting trials;
7. The identification of claims granted and denied under 102 and/or 103 grounds,
8. The number of prior art references used in 103 grounds granted by the Board;
9. The date of the initial conference call between the presiding judges and the parties;
10. Claim terms and their respective claim constructions;
11. Identification of claim term(s) constructed by the petitioner and adopted by the Board;
12. Identification of claim term(s) constructed by the patent owner and adopted by the Board;
13. Identification of claim terms construed by the Board on its own;
14. Identification of claim terms given plain meaning by the Board;
15. Identification of claim terms involving 35 U.S.C. §112, $6^{th}$ paragraph;
16. Any related matter (e.g., parallel district court, ITC, IPR (inter partes) or CBM (covered business method) proceeding(s));
17. Legal arguments addressed by the Board in granting or denying the petition; and
18. Legal authority or case law cited by the Board in granting or denying the petition.

As another example, the data mining system 202 can apply one or more predetermined patterns to extract information in the Board's Final Decision that can include attributes and variables such as, without limitation, those shown in TABLE D below:

TABLE D

1. The names of the presiding judges for the Final Decision;
2. The name of the judge authoring the Final Decision;
3. The date of the written Final Decision;
4. Any related matter (e.g., IPR or CBM case(s) that have been consolidated in the proceeding;
5. The date of oral hearing;
6. Identification of prior art relied upon by the petitioner and the Board;
7. Claim terms and their respective claim constructions;
8. Identification of claim term(s) constructed by the petitioner and adopted by the Board;
9. Identification of claim term(s) constructed by the patent owner and adopted by the Board;
10. Identification of claim terms construed by the Board on its own;
11. Identification of claim terms given plain meaning by the Board;
12. Identification of claim terms involving 35 U.S.C. §112, 6$^{th}$ paragraph;
13. Legal arguments addressed by the Board in affirming or canceling one or more claims; and
14. Legal authority or case law cited by the Board in affirming or canceling one or more claims.

As discussed above, the pattern module 207 can apply one or more predetermined patterns to identify reference data from each of the plurality of legal documents. In some implementations, the reference data can be analyzed by aggregating the reference data from each legal document to develop the one or more analytical or statistical models. For example, reference data from documents "A", "B" and "C" can be aggregated to develop the one or more analytical or statistical models. In some implementations, these reference data can be extracted from legal documents associated with a same proceeding. In other implementations, these reference data can be extracted from legal documents associated with a different proceeding.

In some implementations, as part of the data mining process, the data mining system 202 can build and score data mining models, and generate predictive analytics in the form of predictions and recommendations. For example, the data mining system 202 can mine the legal documents in the repositories 104/106, build a data analytic model based on the mined or extracted data (e.g., correlation between the total number of prior art references and having at least one claim affirmed or canceled), and generate predictions such as the likelihood that at least one claim of a particular patent will be granted review, canceled or affirmed by the Board.

The data mining system 202 can be used to extract data as well as legal data from a variety of data sources. The data sources can include the Patent Office, third parties' blogs, statistics provided by legal practitioners and law firms, and financial documents including auditing materials.

In brief, the data mining/analysis system 102 can be implemented to provide an objective evaluation of a patent being challenged (or to be challenged) via inter partes/post-grant review proceedings, and the likelihood that the patent will be ruled valid, invalid, or partially valid/partially invalid based on historical data and predictive analytics.

In some implementations, the data mining engine 208 can be created using a data mining application programming interface (DMAPI). The DMAPI can define a set of classes and operations to create and manipulate data mining objects.

The DMAPI can be implemented as a two tiered architecture consisting of a thin client-side API layer, which provides a direct interface with an application program. The API layer can be a client-side layer, and can be executed in a client computer system. The DMAPI, also can include a thick server-side implementation layer, and can be executed in a server computer system. The interface can be implemented using the JAVA® (Java) programming language.

Java is a high-level programming language developed by SUN MICROSYSTEMS®. Java is an object-oriented language similar to C++, but simplified to eliminate language features that cause common programming errors. Java source code files (files with a java extension) are compiled into a format called bytecode (files with a class extension), which can then be executed by a Java interpreter. Compiled Java code can run on most computers because Java interpreters and runtime environments, known as Java Viral Machines (VMs), exist for most operating system, including UNIX®, Apple's Mac IOS®, and Microsoft Windows®. Bytecode can also be converted directly into machine language instructions by a just-in-time compiler (JIT). Java is a general purpose programming language with a number of features that make the language well suited for use on the World Wide Web. Small Java applications are called Java applets and can be downloaded from a Web server and run on your computer by a Java-compatible Web browser, such as Google's Chrome® or Microsoft's Internet Explorer®.

Scripting of data mining operation sequences can be accomplished through a combination of the DMAPI calls and standard Java code. This allows the DMAPI to provide a fully supported and flexible interface for providing data mining functionality to application programs. Implementation layer can be provided as a Java core implementation with a PL/SQL wrapper, which is automatically generated, making it accessible to the Java DMAPI client-side API layer via Java Database Connectivity (JDBC). JDBC is a Java API that enables Java programs to execute SQL statements. This allows Java programs to interact with any SQL-compliant database. Since nearly all relational database management systems (DBMSs) support SQL, and because Java itself runs on most platforms, JDBC makes it possible to write a single database application that can run on different platforms and interact with different DBMSs.

The DMAPI can provide a Java-based API that enables scripting within Java programs. Java has become the programming language of choice for many advanced applications, including web-based applications and servers. This makes the API more accessible and usable by a broader range of customers. This also avoids having to develop a proprietary scripting syntax with associated programming control constructs.

In some implementations, the DMAPI can be in communication with a Mining Object Repository (MOR) to maintain mining metadata defined by the data mining schema and serves as the focus for logging into the data mining system, logging off, and validating users to use MOR and data mining functionality.

In some implementations, the DMAPI can be in communication with one or more mining projects that serves as containers for the data mining objects used and created by a user. Each user can have one or more projects, and each project can maintain a separate name space within which to name mining objects. Users can choose to mark a project as shared such that all other users of the system have read-only and copy privileges. Multiple users can log in using the same user ID if they wish to work in the same project since a project can be owned by a single user ID. A mining sessions also can be included in the data management system 100 to serve as containers for the data mining processing performed on behalf of a user during each login session.

In some implementations, the DMAPI can be in communication with one or more mining tables that map to a table or a view. Each table can include a set of columns of data mining data and associated metadata. Mining table instances can exist within the MOR.

In some implementations, the DMAPI can be in communication with one or more data transformations that include computations or manipulations performed on a data mining table, a data column in a data mining table, a data row in a data mining table, or a value in a data row or a data column in a data mining table to support data exploration or preparation leading to providing a table's data for data mining. Transformations can utilize mining table and column metadata, including statistics, as maintained in MOR, to effect the transformation.

In some implementations, the DMAPI can be in communication with one or more mining settings that specify the parameters for building a particular type of data mining model. Settings can include both general and algorithm-specific data. Instances can be reused to build multiple models on different datasets.

In some implementations, the DMAPI can be in communication with one or more mining models that represent the result of mining algorithm build operations. Each mining model includes a set of rules that implement the conditions and decisions that make up the model. These conditions and decisions can be represented as metadata and extensible markup language (XML) strings. Each XML string contains specific model statistics and results that can be of interest to end users. The mining results can include prediction/recommendation information produced as a result of the model scoring process, which yields several kinds of result objects: lift, evaluation (e.g., confusion matrix), apply, etc. Instances of the mining results and subclasses maintain the model that created the result and the mining input data.

In some implementations, the DMAPI can be in communication with one or more schema views that can be formed as part of the DMAPI that exposes certain tables in MOR schema as views to allow unrestricted read-only access for end users. These views can be one-to-one mappings to the source MOR table, or derivatives of one or more MOR tables as deemed appropriate. This avoids having the DMAPI become too verbose to anticipate developer needs and provides flexible querying by users.

The DMAPI can support remote invocation of data mining functionality and supporting Java and PL/SQL packages, as well as database-internal usage. The DMAPI can provide progress feedback to users for long running operations. As such, the DMAPI functionality can be categorized as direct, synchronous manipulation of MOR tables involving fast operations, longer running operations requiring status reporting, asynchronous operations, workflow-supported database operations, and enqueuing requests for the data mining processing.

Some DMAPI operations take less than one second to execute. These can or can not access the MOR database. Such operations occur synchronously and provide no feedback to the user on progress, indicative of their fast execution. Other DMAPI operations that are also synchronous can take considerably longer to execute, on the order of minutes or hours, e.g., the execution of a sophisticated query over a very large mining table. These operations accept a status request and return status information. Asynchronous operations can be supported by workflow processing or can enqueue their requests for processing. Once the DMAPI turns over control to an asynchronous handler, it is up to the handler to provide status notifications.

Data Analysis

Referring back to FIG. 8, at 808, the reference data can be analyzed to develop one or more analytical or statistical models, each analytical or statistical model pertaining to a different statistic associated with a different attribute of the plurality of legal documents.

For example, in addition to the data mining system 202, the data mining/analysis system 102 can also include a data analysis system (or module) 220 in communication with the data mining system 202 to perform such an analysis. As shown in FIG. 2, the data analysis system 220 can include a correlation module 222, a selection module 224, a statistics module 226, a model development module 228, a machine learning module 230, and an argument module 232.

At the outset, information required for developing one or more analytical or statistical models can be input to the data analysis system 220 (e.g., data extracted by the data mining system 202). The information can include a plurality of modeling variables, dependent variables, and/or a dataset for the plurality of modeling variables.

For example, the modeling variables can include any of the attributes extracted from the petition such as, without limitation, the real party of interest of the petitioner, the real party of interest of the patent owner, name of counsel and/or law firm representing the petitioner and/or patent owner, the number of claims challenged and the listing of such claims.

As another example, the modeling variables can include any of the attributes extracted from the Board's Decision (Not) to Institute Trial such as, without limitation, the names of the presiding judges, and the name of the authoring judge.

In some implementations, the dependent variables can include the number of claims granted review, or the number of claims affirmed or canceled by the Board.

To prepare the reference data for analysis, the plurality of modeling variables can be associated by the correlation module 222. The association can be performed to obtain a linear (or non-linear) relationship of each of the plurality of modeling variables, in relation to the dependent variable(s). In some implementations, a plurality of associations can be generated for each modeling variable.

An association can be selected for each modeling variable, from the plurality of associations, based on one or more association rules. In some implementations, the one or more association rules can be based on a correlation between the modeling variable(s) and the dependent variable(s). The association rule can also be based on a proportion of a range of the modeling variable utilized, and a proportion of a range of the dependent variable(s) that is(are) explained by the modeling variable.

Optionally, a set of variables can be selected from the associated modeling variables by the selection module 224. In some implementations, a clustering of the associated modeling variables can be performed to create variable clusters. The set of variables can be selected from the variable clusters based on one or more selection rules. In some implementations, at least one variable can be selected from each variable cluster.

In some implementations, the one or more selection rules can be based on a correlation between an independent variable and the dependent variable.

In some implementations, the one or more selection rules can be based on a log-likelihood difference. The log-likelihood difference is the difference between two model-fit statistics, one being derived by utilizing an intercept model, and the other being derived by utilizing an intercept-plus-covariate model.

Next, a regression of the set of variables (or other suitable analytical or statistical methods) can be performed by the statistics module 226. The regression can be performed for determining one or more prediction variables. In some implementations, a stepwise regression can be performed. In some implementations, a logistic regression can be performed. In some implementations, an Ordinary Least Squares (OLS) regression can be performed.

Subsequently, the model development module 228 can prepare a predictive model by utilizing the one or more prediction variables obtained from the statistics module 226. In some implementations, the preparation of the predictive model can include reviewing the associations of the plurality of modeling variables and validating the predictive model. In some implementations, the preparation of the predictive models can further include a modification or continuous refinement of the predictive model.

In sum, the model development module 228 can prepare the predictive model based on the prediction variables. The model development module 228 can also enable a user to perform modification of the predictive model, review of the plurality of associations of the plurality of modeling variables, and validation of the predictive model.

In some implementations, in lieu of or in addition to conducting regression analysis, the statistics module 226 can also apply other suitable data analysis algorithms to the dataset including, for example, Multiple Additive Regression Tree, Stepwise Logistic Regression, or Random Forest Analysis that can be used by the model development module 228 in creating the predictive model.

The Stepwise Logistic Regression is a statistical model that predicts the probability of occurrence of an event by fitting the data input to a logistic curve. In the logistic model, a predefined set of explanatory variables can affect the probability through a logistic link function. To determine the optimum set of explanatory variables selected from a number of candidate variables, a large number of logistic regression models can be built from an initial model in a stepwise fashion and compared through the evaluation of Akaike Information Criteria (AIC) in order to determine the most accurate model.

As another example, the Random Forest algorithm, which is an ensemble learning method, can be used to classify objects based on the outputs from a large number of decision trees. Each decision tree can be trained on a bootstrap sample of the available data, and each node in the decision tree can be split by the best explanatory variables. Random Forest can both provide automatic variable selection and describe non-linear interactions between the selected variables.

Using an algorithm such as the Random Forest algorithm that attempts to make large numbers of predictions from relatively small sample data sets, the data analysis system 220 can generate a massive prediction grid of, among other things, all patents in dispute and all claims that will likely be granted review, canceled, or affirmed by the Board.

For example, data associated with one or more modeling variables and dependent variables as well as dataset can be extracted from one set of test cases. Then, a predictive model can be developed and trained based on such test data using Random Forest algorithm to predict the number of claims of a particular patent that might be granted review by the Board. The trained model can then be applied to a second set of test cases to predict the number of claims that will likely be granted review, canceled or reviewed by the Board. Because information associated with the number of claims granted review, canceled, or reviewed among the second set of test cases are readily known a priori, the accuracy of the predicted results output by the trained model can readily be assessed and fine-tuned. Any discrepancy of the trained model can be remedied by fine tuning the algorithm until the error rate falls below a particular threshold (e.g., +/−1 claim).

In general, depending on the size of the initial training data set, the Random Forest algorithm can be trained to produce highly accurate classifications; handle large number of input variables; estimate the importance of variables for classification; estimate missing data; maintain accuracy when a large portion of data is missing; facilitate computing proximity of data classes for detecting outliers and for visualizing the data; and facilitate experimental detection of interaction of variables.

The Random Forest algorithm can also utilize homogeneous tree algorithms that achieve diversity through randomization, and heterogeneous combinations of multiple tree algorithms, such as mean margins decision tree learning algorithms, standard entropy-reducing decision tree learning algorithms, multivariate decision trees, oblique decision trees, perceptron decision trees, and the like to enhance the accuracy of the prediction models.

Alternative to learning decision tree type algorithms can include multiclass support vector machines, and algorithms that facilitate predictive analysis of current and historical facts to make predictions, such as classification tree algorithms, regression tree algorithms, Classification And Regression Tree (CART) algorithms, Chi-squared Automatic Interaction Detector (CHAD) algorithms, QUEST algorithms, C5 algorithms, and boosted trees algorithms.

Data and attributes from various inter partes/post-grant review proceedings can then be used to determine the odds that at least one claim of a patent with overlapping attributes and data will be granted review, canceled or affirmed by the Board. This can produce an odds ratio in the form of a probability representative of the likelihood that a patent will be ruled valid or invalid by the Board.

Over time, more data from new incoming cases and associated histories and rulings can be factored into the results and the odds can be recalculated. Because the data management system 100 includes feedback based on ongoing case data and result, the algorithm that was initially fit to then-existing data can be automatically updated, adjusted and continuously refined as new data is provided.

Figure 3:
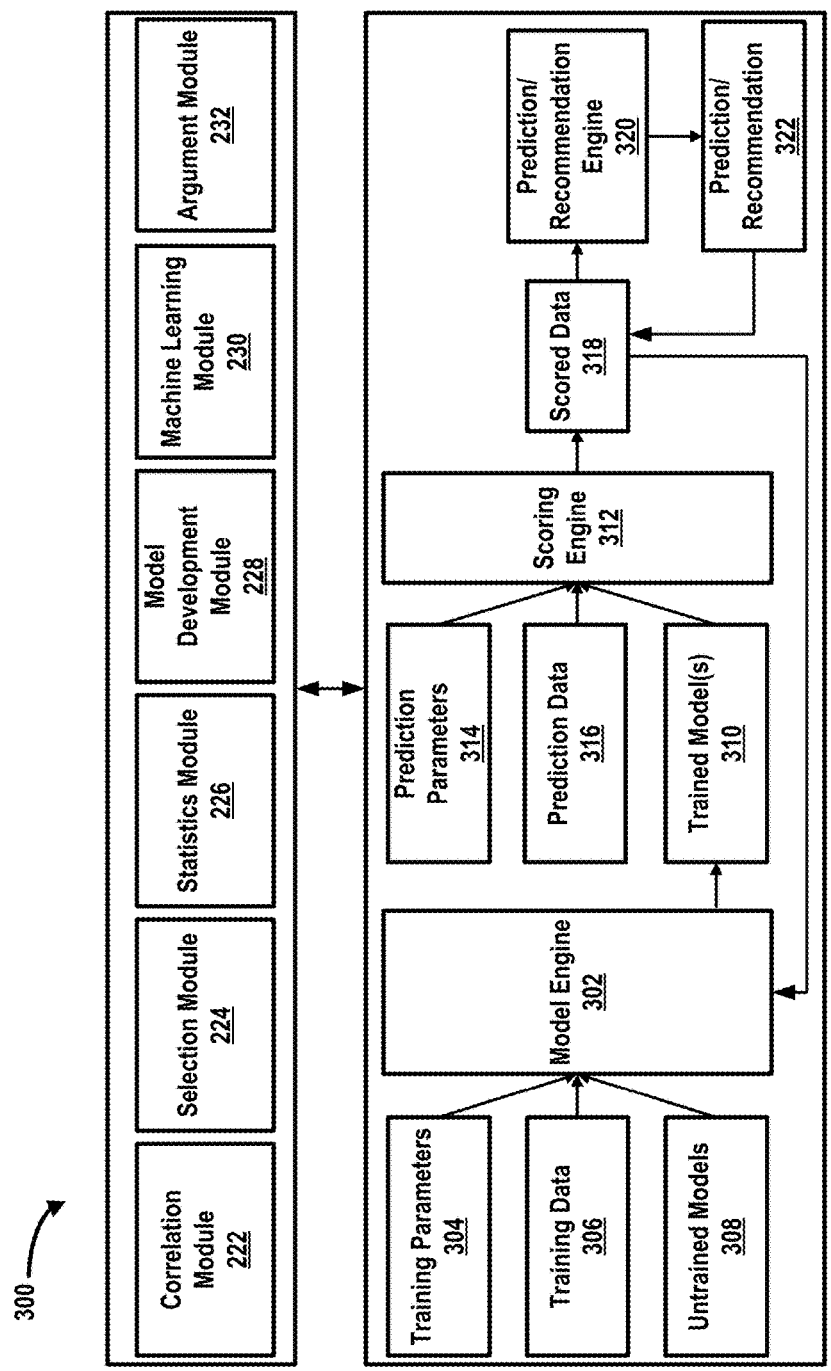
FIG. 3 shows an example of additional components of a data analysis system.

FIG. 3 shows an example of components of a data analysis system 300 in addition to those shown in FIG. 2. Referring to FIG. 3, the data analysis system 300 can train and develop one or more analytical or statistical models using a model engine 302 (e.g., which can be controlled by the model development module 228) that can be used to perform recommendation/prediction, clustering, association rule generation, and the like. The inputs to the model engine 302 can include training parameters 304, training data 306, and untrained models 308, all of which can be gathered using the information and data extracted by the data mining system 202.

Model building can include developing the analytical or statistical models for evaluating legal documents, which can be used to perform predictions and recommendations for an actionable strategy.

The training parameters 304 can include a configuration that defines the default system settings that affect data mining system operation and algorithm model building behavior, such as maximum allowed parallelism for a given model build. The training parameters 304 also can include schemas to define the data used in the data mining process by providing metadata on the attributes used by the data mining algorithms. Optionally, the training parameters 304 and/or the training data 306 can include a client input containing information that allows the user to control the building, training, and development of data analytical or statistical models.

For example, the client input can take the role of settings that prescribe model selection and data statistical algorithm behavior. The configuration, the schema, and the client input can all form as part of the training parameters that can be input to the model engine 302 that sets up the models for training.

In some implementations, the training parameters 304 can include variables associated with data specifying a number of parameters to be used in a data analytical or statistical model such as, without limitation, names of presiding and authoring judges, total number of claims being challenged, total patent claims in the subject patent, claim numbers for claims being granted on review, legal counsel representing the petitioner, legal counsel representing the patent owner, and the like, and a type of model to be built, such as a prediction model, a self-organizing map, a k-means model, a competitive learning model, and other parameters that are specific to the type of model selected.

In some implementations, the training data 306 can include data that is input to the algorithms and which can be used to actually build the models. Model building can also partition "build data" into training, evaluation, and test datasets. The evaluation dataset can be used by the model building algorithm to avoid overtraining, while the test dataset can be used to provide error estimates of the model.

In some implementations, the training data 306 can include a subset of data for a plurality of cases whose data have previously been extracted by the data mining engine 208. The subset of data can include data for a plurality of variables extracted from a plurality of legal cases and proceedings. For example, the variables can include the total number of claims being challenged and the names of the presiding judges assigned to case "X", and the data can include "5" as the total number of claims being challenged, and "SALLY C. MEDLEY, KARL D. EASTHOM, and JUSTIN T. ARBES" as the presiding judges and "SALLY C MEDLEY" as the authoring judge (e.g., the judge authoring the Decision (Not) to Institute Trial or Final Decision).

In some implementations, the training data 306 can include actual data or parameters that can be generated and entered into the representation at the time when the data analysis system 220 develops or trains the model using its model building algorithms. In some implementations, the training data also can include manually extracted data (e.g., which can be manually entered by the user).

In some implementations, the input can also include untrained models 308 such as initialized or untrained representations of the models in addition to algorithms that process the training data 306 in order to furnish a complete data mining model. Such a representation can include a structural representation of the model that either does not actually contain data that makes up the model, or contains only default or sample data or parameters.

In some implementations, the untrained models 308 need not include untrained representations of the models, but only include the algorithms that process the training data 306 in order to actually build the models. The training parameters 304 can include parameters that can be input to the analytical or statistical model building algorithms to control how the algorithms build the models.

When training and developing an analytical or statistical model, the model engine 302 can invoke analytical or statistical model building algorithms associated with the untrained models 308, initialize the algorithms using the training parameters 304, process training data 306 using the algorithms to build the model, and generate one or more trained models 310.

In some implementations, the model engine 302 can initially develop at least one of a first trained model associated with an identity of a petitioner challenging the validity of the patent, a second trained model associated with an identity of a patent owner of the patent, a third trained model associated with a total number of claims in the patent, and a fourth trained model associated with an identity of one or more presiding judges assigned to the legal proceeding associated with the determination of the validity or invalidity of the patent upon which other trained or analytical or statistical models can be built to fine tune or improve the overall probability that the subject patent will be ruled valid or invalid, or at least one claim will be granted review, canceled, or affirmed by the Board.

In some implementations, the trained model 310 can include rules that implement the conditions and decisions that make up the operational model. As part of the process of building and refining the trained model 310, the trained model 310 can be evaluated. For example, rules that decrease or do not contribute to the overall quality or prediction accuracy of the model can be eliminated from the model. The remaining rules of trained model 310 can be encoded in an appropriate format and deployed for use in making predictions or recommendations.

In some implementations, the trained model 310 can include one or more analytical or statistical models modeling statistics and/or correlations between various data. For example, the trained model 310 can include analytical or statistical models identifying a correlation between a particular legal argument or doctrine (e.g., assignor estoppel) and having at least one patent claim affirmed or canceled by the Board (e.g., a dependent variable where 80% of cases with at least one claim canceled involve the legal issue of assignee estoppel).

Other exemplary trained models can include models that cover one or more correlations between variables in the context of granting review, canceling or affirming at least one claim.

For example, trained models can include models that cover one or more correlations between variables in the context of granting review of at least one claim of the subject patent such as, but are not limited to:

TABLE E

1. The correlation between the total number of grounds (e.g., 35 U.S.C. §102 or 103) relied upon by the petitioner and having at least one claim granted review by the Board (e.g., 56.3% of cases with at least one claim granted review by the Board involve a petition seeking, on average, three grounds of rejection two of which are based on 35 U.S.C. §102 and one of which is based on 35 U.S.C. §103);
2. The correlation between the filing of a preliminary response and having at least one claim granted review by the Board (e.g., 12.2% of the cases with at least one claim granted review by the Board involve a Patent Owner filing a preliminary response to the Petitioner's petition);

TABLE E-continued

3. The correlation between a particular petitioner's counsel and having at least one claim granted review by the Board (e.g., 97.2% of the cases handled by Attorney "Alex Chan" on behalf of the petitioner have at least one claim granted review by the Board);
4. The correlation between the patent owner's counsel and having at least one claim granted review by the Board (e.g.; 62.2% of the cases handled by Attorney "Alex Chan" on behalf of the patent owner have at least one claim granted review by the Board);
5. The correlation between the number of the Board's Order of the Proceedings and having at least one claim granted review by the Board;
6. The correlation between the total number of experts and having at least one claim granted review by the Board (e.g., 93.3% of the cases with at least one claim granted review by the Board have engaged one expert in support of the petitioner);
7. The correlation between the total number of prior art references submitted by the petitioner and having at least one claim granted review by the Board (e.g., 92.2% of the cases with at least one claim granted review by the Board involve the consideration of seven prior art references submitted by the petitioner, three of which are newly cited and four are in the existing record);
8. The correlation between the number of newly cited prior art references submitted by the petitioner and having at least one claim granted review by the Board (e.g.. 82.3% of the cases with at least one claim granted review by the Board involve the submission of 3.2 newly cited prior art references by the petitioner);
9. The correlation between the number of prior art references cited during prosecution and relied upon by the petitioner and having at least one claim granted review by the Board (e.g., 82.3% of the cases with at least one claim granted review by the Board involve the reliance on 4.2 prior art references cited during prosecution);
10. The correlation between the total number of terms requested for construction by the Petitioner and having at least one claim granted review by the Board (e.g., 96.3% of the cases with at least one claim granted review by the Board have on average four claim terms requested for construction by the Petitioner);
11. The correlation between a particular presiding judge and having at least one claim granted review by the Board;
12. The correlation between a particular legal argument/doctrine (or a combination of legal arguments/doctrines) and having at least one claim granted review by the Board;
13. The correlation between a filing of a motion for additional discovery and having at least one claim granted review by the Board;
14. The correlation between a filing of a request for rehearing and having at least one claim granted review by the Board; and
15. The correlation between the technology underlying a patentin dispute and having at least one claim granted review by the Board.

As another example, trained models can include models that cover one or more correlations between variables in the context of canceling at least one claim of the subject patent such as, but are not limited to:

TABLE F

1. The correlation between the total number of grounds (e.g., 35 U.S.C. §102 or 103) relied upon by the petitioner and having at least one claim canceled by the Board (e.g., 90% of cases with at least one claim canceled by the Board involve a petition seeking, on average, nine grounds of rejection five of which are based on 35 U.S.C. §102 and four of which are based on 35 U.S.C. §103);
2. The correlation between the total number of grounds (e.g., 35 U.S.C. §102 or 103) granted for review by the Board and having at least one claim canceled by the Board (e.g., 90% of cases with at least one claim canceled by the Board involve a Decision to Institute by the Board where the Board grants on average three grounds based on 35 U.S.C. §102 and two grounds based on 35 U.S.C. §103);
3. The correlation between the number of days before the date on which an oral hearing takes place and having at least one claim canceled by the Board (e.g., 56.2% of the cases with at least one claim canceled by the Board took no more than 252.2 days before the oral hearing took place);
4. The correlation between the filing of a preliminary response and having at least one claim canceled by the Board (e.g., 84.2% of the cases with at least one claim canceled by the Board involve a Patent Owner filing a preliminary response to the Petitioner's petition);
5. The correlation between the filing of a patent owner response and having at least one claim canceled by the Board (e.g., 12.2% of the cases with at least one claim canceled by the Board involve a Patent Owner filing a patent owner response to the Petitioner's petition);
6. The correlation between the filing of a Petitioner's reply to the Patent Owner's patent owner response and having at least one claim canceled by the Board (e.g., 78.8% of the cases with at least one claim canceled by the Board involve a Petitioner's reply to the Patent Owner's patent owner response);
7. The correlation between the filing of an opposition to the Petitioner's reply to the Patent Owner's patent owner response and having at least one claim canceled by the Board (e.g., 85.2% of the cases with at least one claim canceled by the Board involve the filing of an opposition to the Petitioner's reply to the Patent Owner's patent owner response);
8. The correlation between the filing of a motion for observation regarding cross-examination of a petitioner's witness and having at least one claim canceled by the Board (e.g., 95.2% of the cases with at least one claim canceled by the Board involve the filing of a motion for observation regarding cross-examination of a petitioner's expert witness);

TABLE F-continued

9. The correlation between the filing of a response to a motion for observation regarding cross-examination of a petitioner's witness and having at least one claim canceled by the Board (e.g., 97.8% of the cases with at least one claim canceled by the Board involve the filing of a response to a motion for observation regarding cross-examination of a petitioner's expert witness);
10. The correlation between the filing of a motion for observation regarding cross-examination of a patent owner's witness and having at least one claim canceled by the Board (e.g.; 85.2% of the cases with at least one claim canceled by the Board involve the filing of a motion for observation regarding cross-examination of a patent owner's expert witness);
11. The correlation between the filing of response to a motion for observation regarding cross-examination of a patent owner's witness and having at least one claim canceled by the Board (e.g., 85.7% of the cases with at least one claim canceled by the Board involve the filing of a response to a motion for observation regarding cross-examination of a patent owner's expert witness);
12. The correlation between the petitioner's counsel and having at least one claim canceled by the Board (e.g., 92.2% of the cases handled by Attorney "Alex Chan" on behalf of the petitioner have at least one claim canceled by the Board);
13. The correlation between the patent owner's counsel and having at least one claim canceled by the Board (e.g., 52.3% of the cases handled by Attorney "Alex Chan" on behalf of the patent owner have at least one claim canceled by the Board);
14. The correlation between the number of the Board's Order of the Proceedings and having at least one claim canceled by the Board;
15. The correlation between the total number of experts and having at least one claim canceled by the Board (e.g., 84.2% of the cases with at least one claim canceled by the Board have engaged 3 experts in support of the petitioner);
16. The correlation between the total number of depositions and having at least one claim canceled by the Board (e.g., 92.2% of the cases with at least one claim canceled by the Board involve the petitioner's counsel taking two depositions of the patent owner's expert witness(es));
17. The correlation between the total number of claims petitioned for review, total number of claims granted for review, and total number of claims canceled by the Board (e.g., 92.1% of the cases with at least one claim canceled by the Board have a Decision to Institute that grants on average 20 claims for review, and a Petition that seeks review on 30 claims);
18. The correlation between the total number of prior art references submitted by the petitioner and having at least one claim canceled by the Board (e.g., 80% of the cases with at least one claim canceled by the Board involve the consideration of five prior art references submitted by the petitioner, four of which are newly cited and one is in the existing record);
19. The correlation between the number of newly cited prior art references submitted by the petitioner and having at least one claim canceled by the Board (e.g., 95.3% of the cases with at least one claim canceled by the Board involve the submission of 2.1 newly cited prior art references by the petitioner);
20. The correlation between the number of prior art references cited during prosecution and relied upon by the petitioner and having at least one claim canceled by the Board (e.g., 98.1% of the cases with at least one claim canceled by the Board involve the reliance on 3.2 prior art references cited during prosecution);
21. The correlation between the total number of terms construed by the Board that favors Petitioner or Patent Owner and having at least one claim canceled by the Board (e.g., 90.1% of the cases with at least one claim canceled by the Board involve the Board favoring the Petitioner 3.2 out of 5 terms on claim construction);
22. The correlation between a filing of a motion to exclude and having at least one claim canceled by the Board (e.g., 94.5% of the cases with at least one claim canceled by the Board involve a filing of a motion to exclude by the Patent Owner, and the Board dismissing Patent Owner's motion to exclude 80.3% of the time);
23. The correlation between a filing of an opposition to a motion to exclude and having at least one claim canceled by the Board (e.g., 92.2% of the cases with at least one claim canceled by the Board involve a filing of an opposition to a motion to exclude);
24. The correlation between a filing of a reply to an opposition to a motion to exclude and having at least one claim canceled by the Board (e.g., 92.4% of the cases with at least one claim canceled by the Board involve a filing of a reply to an opposition to a motion to exclude);
25. The correlation between the filing of a motion to amend and having at least one claim canceled by the Board (e.g., 90.6% of the cases with at least one claim canceled by the Board do not have any filing of a motion to amend by the patent owner);
26. The correlation between a filing of an opposition to a motion to amend and having at least one claim canceled by the Board (e.g., 12.2% of the cases with at least one claim canceled by the Board involve a filing of an opposition to a motion to amend);
27. The correlation between a filing of a reply to an opposition to a motion to amend and having at least one claim canceled by the Board (e.g., 12.2% of the cases with at least one claim canceled by the Board involve a filing of a reply to an opposition to a motion to amend);
28. The correlation between a particular presiding judge and having at least one claim canceled by the Board;
29. The correlation between a particular legal argument/doctrine (or a combination of legal arguments/doctrines) and having at least one claim canceled by the Board;
30. The correlation between a filing of a request for rehearing and having at least one claim canceled by the Board;
31. The correlation between a filing of a request for rehearing and having at least one claim canceled by the Board;
32. The correlation between a filing of a request for oral hearing and having at least one claim canceled by the Board;
33. The correlation between a filing of a joinder to join two or more review proceedings and having at least one claim canceled by the Board; and TABLE F-continued

| | |
|---|---|
| 34. | The correlation between the technology underlying a patent in dispute and having at least one claim canceled by the Board. |

As another example, trained models can include models that cover one or more correlations between variables in the context of affirming at least one claim of the subject patent such as, but are not limited to:

TABLE G

| | |
|---|---|
| 1. | The correlation between the total number of grounds (e.g., 35 U.S.C. §102 or 103) relied upon by the petitioner and having at least one claim affirmed by the Board (e.g., 23.2% of cases with at least one claim affirmed by the Board involve a petition seeking, on average, six grounds of rejection four of which are based on 35 U.S.C. §102 and two of which are based on 35 U.S.C. §103); |
| 2. | The correlation between the total number of grounds e.g., 35 U.S.C. §102 or 103) granted for review by the Board and having at least one claim affirmed by the Board (e.g., 90% of cases with at least one claim canceled by the Board involve a Decision to Institute by the Board where the Board grants on average three grounds based on 35 U.S.C. §102 and two grounds based on 35 U.S.C. §103); |
| 3. | The correlation between the number of days before the date on which an oral hearing takes place and having at least one claim affirmed by the Board (e.g., 99.2% of the cases with at least one claim affirmed by the Board took no more than 121.4 days before the oral hearing took place); |
| 4. | The correlation between the filing of a preliminary response and having at least one claim affirmed by the Board (e.g., 95.2% of the cases with at least one claim affirmed by the Board do not have a Patent Owner filing a preliminary response to the Petitioner's petition); |
| 5. | The correlation between the filing of a patent owner response and having at least one claim affirmed by the Board (e.g., 98.9% of the cases with at least one claim affirmed by the Board do not have a Patent Owner filing a patent owner response to the Petitioner's petition); |
| 6. | The correlation between the filing of a Petitioner's reply to the Patent Owner's patent owner response and having at least one claim affirmed by the Board (e.g., 82.9% of the cases with at least one claim affirmed by the Board do not have any Petitioner's reply to the Patent Owner's patent owner response); |
| 7. | The correlation between the filing of an opposition to the Petitioner's reply to the Patent Owner's patent owner response and having at least one claim affirmed by the Board (e.g., 96.8% of the cases with at least one claim affirmed by the Board do not have any filing of an opposition to the Petitioner's reply to the Patent Owner's patent owner response); |
| 8. | The correlation between the filing of a motion for observation regarding cross-examination of a petitioner's witness and having at least one claim affirmed by the Board (e.g., 95.8% of the cases with at least one claim affirmed by the Board do not have any filing of a motion for observation regarding cross-examination of a petitioner's expert witness); |
| 9. | The correlation between the filing of a response to a motion for observation regarding cross-examination of a petitioner's witness and having at least one claim affirmed by the Board (e.g., 91.1% of the cases with at least one claim affirmed by the Board do not have any filing of a response to a motion for observation regarding cross-examination of a petitioner's expert witness); |
| 10. | The correlation between the filing of a motion for observation regarding cross-examination of a patent owner's witness and having at least one claim affirmed by the Board (e.g., 99.2% of the cases with at least one claim affirmed by the Board do not have any filing of a motion for observation regarding cross-examination of a patent owner's expert witness); |
| 11. | The correlation between the filing of response to a motion for observation regarding cross-examination of a patent owner's witness and having at least one claim affirmed by the Board (e.g., 94.7% of the cases with at least one claim affirmed by the Board do not have any filing of a response to a motion for observation regarding cross-examination of a patent owner's expert witness); |
| 12. | The correlation between the petitioner's counsel and having at least one claim affirmed by the Board (e.g., 7.8% of the cases handled by Attorney "Alex Chan" on behalf of the petitioner have at least one claim affirmed by the Board); |
| 13. | The correlation between the patent owner's counsel and having at least one claim affirmed by the Board (e.g., 85.2% of the cases handled by Attorney "Alex Chan" on behalf of the patent owner have at least one claim affirmed by the Board); |
| 14. | The correlation between the number of the Board's Order of the Proceedings and having at least one claim affirmed by the Board; |
| 15. | The correlation between the total number of experts and having at least one claim affirmed by the Board (e.g., 78.1% of the cases with at least one claim affirmed by the Board have engaged 2 experts in support of the patent owner); |
| 16. | The correlation between the total number of depositions and having at least one claim affirmed by the Board (e.g., 80% of the cases with at least one claim affirmed by the Board involve the patent owner's counsel taking three depositions of the petitioner's expert witness(es)); |
| 17. | The correlation between the total number of claims petitioned for review by the petitioner, total number of claims granted for review, and total number of claims affirmed by the Board (e.g., 80.3% of the cases with at least one claim affirmed by the Board have a Decision to Institute that grants on average 20 claims for review, and a Petition that seeks review on 30 claims); |
| 18. | The correlation between the total number of prior art references submitted by the petitioner and having at least one claim affirmed by the Board (e.g., 90.6% of the cases with at least one claim affirmed by the Board involve the consideration of four prior art references |

TABLE G-continued submitted by the petitioner, one of which are newly cited and three are in the existing record);
19. The correlation between the number of newly cited prior art references submitted by the petitioner and having at least one claim affirmed by the Board (e.g., 96.3% of the cases with at least one claim granted review by the Board involve the submission of 0.9 newly cited prior art references by the petitioner);
20. The correlation between the number of prior art references cited during prosecution and relied upon by the petitioner and having at least one claim affirmed by the Board (e.g., 99.6% of the cases with at least one claim granted review by the Board involve the reliance on 1.2 prior art references cited during prosecution);
21. The correlation between the total number of terms construed by the Board that favors Petitioner or Patent Owner and having at least one claim affirmed by the Board (e.g., 76.1% of the cases with at least one claim affirmed by the Board involve the Board favoring the Patent Owner 4.3 out of 5 terms on claim construction);
22. The correlation between a filing of a motion to exclude and having at least one claim affirmed by the Board (e.g., 98.2% of the cases with at least one claim affirmed by the Board do not have any filing of a motion to exclude by the Patent Owner, and the Board dismissing Patent Owner's motion to exclude 99.2% of the time);
23. The correlation between a filing of an opposition to a motion to exclude and having at least one claim affirmed by the Board (e.g., 96.3% of the cases with at least one claim affirmed by the Board do not have any filing of an opposition to a motion to exclude);
24. The correlation between a filing of a reply to an opposition to a motion to exclude and having at least one claim affirmed by the Board (e.g., 95.3% of the cases with at least one claim affirmed by the Board do not have any filing of a reply to an opposition to a motion to exclude);
25. The correlation between the filing of a motion to amend and having at least one claim affirmed by the Board (e.g., 98.2% of the cases with at least one claim affirmed by the Board involve a filing of a motion to amend by the patent owner);
26. The correlation between a filing of an opposition to a motion to amend and having at least one claim affirmed by the Board (e.g., 52.2% of the cases with at least one claim affirmed by the Board do not have a filing of an opposition to a motion to amend);
27. The correlation between a filing of a reply to an opposition to a motion to amend and having at least one claim affirmed by the Board (e.g.. 98.3% of the cases with at least one claim affirmed by the Board do not have any filing of a reply to an opposition to a motion to amend);
28. The correlation between a particular presiding judge and having at least one claim affirmed by the Board;
29. The correlation between a particular legal argument/doctrine or a combination of legal arguments/doctrines) and having at least one claim affirmed by the Board;
30. The correlation between a filing of a request for rehearing and having at least one claim affirmed by the Board;
31. The correlation between a filing of a request for rehearing and having at least one claim affirmed by the Board;
32. The correlation between a filing of a request for oral hearing and having at least one claim affirmed by the Board;
33. The correlation between a filing of a joinder to join two or more review proceedings and having at least one claim affirmed by the Board; and
34. The correlation between the technology underlying a patent in dispute and having at least one claim affirmed by the Board.

In some implementations, each trained model can consider and be associated with one analytical or statistical model (e.g., the correlation between the total number of grounds relied upon by the petitioner and having at least one claim affirmed or canceled by the Board). In other implementations, each trained model can consider and be associated with multiple analytical or statistical models (e.g., the correlation between the total number of grounds relied upon by the petitioner and having at least one claim affirmed or canceled and the correlation between the total number of prior art references relied upon by the petitioner and having at least one claim affirmed or canceled by the Board).

In some implementations, the data analysis system 300 can include a scoring engine 312 to perform scoring. Scoring can include the use of the trained analytical or statistical model 310 to provide predictions and recommendations. For example, the trained analytical or statistical model 310, the prediction parameters 314, and the prediction data 316 can be input to the scoring engine 312. The trained analytical or statistical model 310 also can include one or more sets of deployed rules that were generated by the model engine 302.

The prediction parameters 314 can include parameters that can be input to the scoring engine 312 to control the scoring of the trained analytical or statistical model 310 against prediction data 316. In some implementations, the prediction parameters 314 can include a subset of data for a plurality of cases whose data have previously been extracted by the data mining engine 208. This subset of data can be the same or different from those used for the training parameters 304. For example, the prediction parameters 314 can employ the same (e.g., the total number of claims being challenged and the names of the presiding judges assigned to review proceeding "X") or different (e.g., the total number of claims in the subject patent, and the names of the legal counsel representing the petitioner and patent owner) variables than those used to train and develop the initial model created by the model engine 302.

In some implementations, the prediction parameters 314 and the prediction data 316 can include data extracted from a different set of legal documents (e.g., different from those used to provide the training parameters 304 and training data 306) having been applied with one or more predetermined patterns (e.g., by the pattern module 207) to identify a second set of reference data. In some implementations, the one or more predetermined patterns can be the same or different as those applied to the initial set of legal documents used to provide the training parameters 304 and training data 306. The one or more analytical or statistical models associated with the trained model 310 can then be adjusted based on the second set of reference data via the feedback process via the scored data 318 to the model engine 302.

In some implementations, the prediction parameters 314 and the prediction data 316 can function as test data for fine-tuning the trained models 310. For example, the prediction parameters 314 and the prediction data 316 can be used to refine or fine-tune the trained model 310 via, for example, Random Forest analysis as previously discussed (e.g., by the statistics module 226) to improve the accuracy of the trained models (e.g., at least one claim will be granted review, canceled, or affirmed by the Board).

In some implementations, the scoring engine 312 can select a subset (e.g., as opposed to the entire set) of the prediction parameters 314 and/or prediction data 312 in generating the scored data 318, and filter out parameters and data that do not meet certain criteria (e.g., insufficient data for a particular variable).

In some implementations, the scored data 318 generated by the scoring engine 312 can be used by the prediction/recommendation engine 320 to indicate a probability that a patent will be ruled valid or invalid, or that at least one claim of the patent will be affirmed or canceled by the Board. In some implementations, the scored data 318 can also be used to indicate a score assigned by the scoring engine 312 to a trained model 310 to indicate a reliability of the trained model or analytical or statistical information associated with the trained model to the prediction/recommendation engine 320. Specifically, these information can be used by the prediction/recommendation engine 320 in determining what, if any, prediction or recommendation 322 in the form of actionable tasks (to be discussed in greater detail below) can be proposed to a user. For example, if the trained model 310 fails to meet a particular threshold of reliability (e.g., based on the scored data), the prediction/recommendation engine 320 can give little to no consideration to that trained model in proposing one or more actionable tasks (e.g., while relying upon other trained models that meet such criteria in generating such tasks).

In some implementations, the scoring engine 312 can identify a predetermined threshold that sets the baseline for the trained model 310, the prediction data 316, and the prediction parameters 314 in order to determine whether these data are reliable for use by the prediction/recommendation engine 320. Where the data are reliable, the scored data 318 including the overall probability indicating the likelihood that the subject patent will be ruled invalid or valid, or that one or more claims will be canceled or affirmed by the Board can be forwarded to the prediction/recommendation engine 320 for further processing.

The trained model 310 can fail to meet a predetermined threshold for a variety of reasons. For example, the trained model 310 might fail a predetermined threshold where there's insufficient data in establishing the trained model 310, or insufficient prediction data in establishing the reliability of the trained model 310. The trained model 310 can also fail because its underlying statistics fail to satisfy the prediction data 316 (e.g., where the output of the trained model 310 does not match the prediction data 316).

To improve reliability of the trained model 310, in some implementations, the scoring engine 312 can also remove or filter out one or more analytical or statistical models from the trained model 310 if a score assigned to the trained model is below a particular threshold or does not meet certain criteria. For example, where one of the trained models 310 is associated with an analytical or statistical model and this analytical or statistical model is unreliable because the amount of trained data 306 used to build the model is insufficient (e.g., as determined by the scoring engine 312), the analytical or statistical model can be removed from the data analysis system 220 (e.g., without reaching the prediction/recommendation engine 320).

As another example, where the trained model 310 is associated with three analytical or statistical models and the scoring engine 312 determines that one of them does not meet the criteria, the analytical or statistical model that does not meet the criteria can be removed by the data analysis system 220 while the other two analytical or statistical models that do meet the system criteria can further be processed by the prediction/recommendation engine 320.

In some implementations, the prediction parameters 314 and/or prediction data 316 also can include another client input. This client input can include user data and desired results data. User data can include data relating to the type of predictions and recommendations requested by the user, data relating to constraints on the generated predictions/recommendations desired by the user, or relating to specific actions the user is currently taking that define the context in which the analytical or statistical model is occurring, as will be discussed in FIGS. 10A-10D. The desired results data can include definitions of the types of predictions and recommendations and constraints on the predictions and recommendations desired by the data mining/analysis system 102.

Using the example given above, user data can include information relating to a particular case proceeding, and the desired results data can indicate that the desired result is a recommendation for a legal counsel or filing of a particular brief or motion that would enhance the winning percentage of a particular party (e.g., percentage that a party can successfully seek the Board to affirm or cancel at least one patent claim).

As already discussed above, the trained model 310 can be defined in terms of a function of input variables producing predictions and recommendations (e.g., dependent variable(s)) based on the input variables. The function can be evaluated using the input prediction data 316 and scores can be generated. In some implementations, the scores can indicate how closely the function defined by the analytical or statistical model matches the prediction data, how much confidence can be placed in the predictions and recommendations, how likely the output predictions and recommendations from the model contain false positives, and other analytical or statistical indicators (e.g., via the statistics module 226).

In some implementations, the scored data 318 can be fed back to the model engine 302 to further refine the trained models 310. This feedback process can allow the trained model 310 to be adjusted and refined so that the trained models 310 can be improved.

In some implementations, where more than one model is developed and trained, the scoring engine 312 or the model engine 302 also can assign different weights to each trained model. For example, more weights can be given to a trained model associated with the correlation between the total number of prior art references and having at least one claim affirmed or canceled by the Board than a trained model associated with the correlation between the total number of depositions and having at least one claim affirmed or canceled by the Board. In so doing, this weighting approach allows the trained models 310 to closely match the prediction data and yields higher confidence in the predicted results.

Referring back to FIG. 8, at 810, the validity or invalidity of the patent can be assessed based on the one or more analytical or statistical models, and at 812, the assessment of the validity or invalidity of the patent can be displayed to one or more users. As discussed above, the prediction/recommendation engine 320, in assessing the validity or invalidity of the patent, can use the scored data 318 to determine a probability that the patent will be ruled valid, invalid, partially valid, or partially invalid. For example, the prediction/recommendation engine 320 can evaluate the scored data 318, and determine that there is 67.7% chance that all claims will be canceled, 89.4% chance that at least one claim will be canceled, and 10.6% chance that at least one claim will be affirmed by the Board. These probabilities can then be displayed to the user via a dashboard.

In some implementations, the prediction/recommendation engine 320, in assessing the validity or invalidity of the patent can identify, based on the one or more trained models 310, predictions and recommendations 322 in the form of one or more actionable tasks that the one or more users can perform to increase or decrease the probability that the patent will be ruled valid, invalid, partially valid, or partially invalid (or at least one claim will be affirmed or canceled) by the Board.

As an example, based on the trained models 310 and scored data 318, the prediction/recommendation engine 320 can assess that "The current probability of having at least one claim canceled by the Board is at 20.2%. Lawyer 'A' has a 85.2% of likelihood of convincing the Board to cancel at least one patent claim." Based on this assessment, the prediction/recommendation engine 320 can identify a proposed action or actionable task that "Our system recommends that Lawyer 'A' from law firm 'B' be retained as counsel in order to increase the likelihood of having the Board cancel at least one patent claim (e.g., from the initial 20.2% to 85.2%)." The prediction/recommendation engine 320 also can make alternative suggestion that Lawyer 'C' from law firm 'D' be retained if Lawyer A is unavailable (e.g., due to conflicts of interest).

In some implementations, historical data associated with a plurality of legal documents associated with the plurality of legal cases can be retrieved. Each legal document can include a plurality of corresponding attributes (e.g., independent and dependent variables). The historical data can indicate one or more historical trends associated with the plurality of corresponding attributes. The validity or invalidity of the patent can be assessed based on the one or more analytical or statistical models and the one or more historical trends.

For example, historical data from other legal documents associated with other legal cases such as the name of a petitioner (e.g., real party of interest of the petitioner including all licensor/licensee information), the name of a patent owner (e.g., real party of interest of the patent owner including all licensor/licensee information), the name of counsel and/or law firm representing the petitioner and/or patent owner, the total number of 102/103 grounds requested by the petitioner in a petition, the name of any expert witness whose declaration is being relied upon in the petition, the identification of all relevant prior art cited in the petition, identification of terms with the petitioner's claim construction, legal authority or case law cited by the petitioner, and legal arguments advanced by the petitioner can be retrieved from the data sources 110/112 and repositories 104/106. These legal cases can include review proceedings that are related or unrelated to the subject patent. Trained models associated with these historical data can be analyzed to identify one or more historical trends.

For example, the data analysis system 220 can determine that patents relating to semiconductor technology (or more specifically, SRAM memory) examined through the review proceeding in the past fifteen (15) months have a 72.2% cancellation rate of at least one claim by the Board (e.g., based on statistics gathered from these other legal cases). These trends (72.2% and past fifteen (15) months) can be considered and factored into the assessment (e.g., prediction and recommendation) of the validity or invalidity of the subject patent in addition to the one or more models being developed and trained by the model engine 302 (e.g., the model engine 302 can use these historical trends as part of the training parameters 304 and training data 306 in training and developing the trained models 310).

As discussed above, in some implementations, the actionable tasks can be identified based on the existing correlations between the existing variables as discussed above. For example, where a trained model indicates a direct correlation between the number of expert declaration submitted by the petitioner and the number of claims ultimately canceled by the Board (e.g., where 98% of the review proceedings involving at least one claim canceled have at least one expert declaration submitted by the petitioner), this trained model can be considered and associated with other trained models in generating the overall probability that at least one claim will be canceled or affirmed by the Board.

In some implementations, this identification can be based on the trained model associated with the correlation between the identities of the legal counsel and the winning record of the legal counsel. The trained model, as discussed above, can employ historical analysis (e.g. via the training parameters 304, training data 306, prediction parameters 314, and prediction data 316) to determine this correlation (e.g., legal counsel "X" has represented a petitioner ten times of which nine involve a patent that have at least one claim canceled by the Board).

As another example, the prediction/recommendation engine 320 can assess, based on the trained model 310 and scored data 310, that"Lawyer 'X' has a 14.4% of likelihood of convincing Judge Smith to affirm at least one claim." The prediction/recommendation engine 320 also might gather from the trained model 310 that there is a strong correlation between filing a motion to exclude evidence (e.g., the opposing party's expert declaration) and the likelihood that at least one claim will be canceled by the Board. Based on these assessments, the prediction/recommendation engine 320 can identify a proposed action or actionable task that "Lawyer X should file a motion to exclude the opposing party's expert declaration, and if Lawyer X wins the motion to exclude, the predicted probability that the petition successfully seeks the Board to cancel at least one claim can increase by 76.6% to 91%."

Figure 10A:
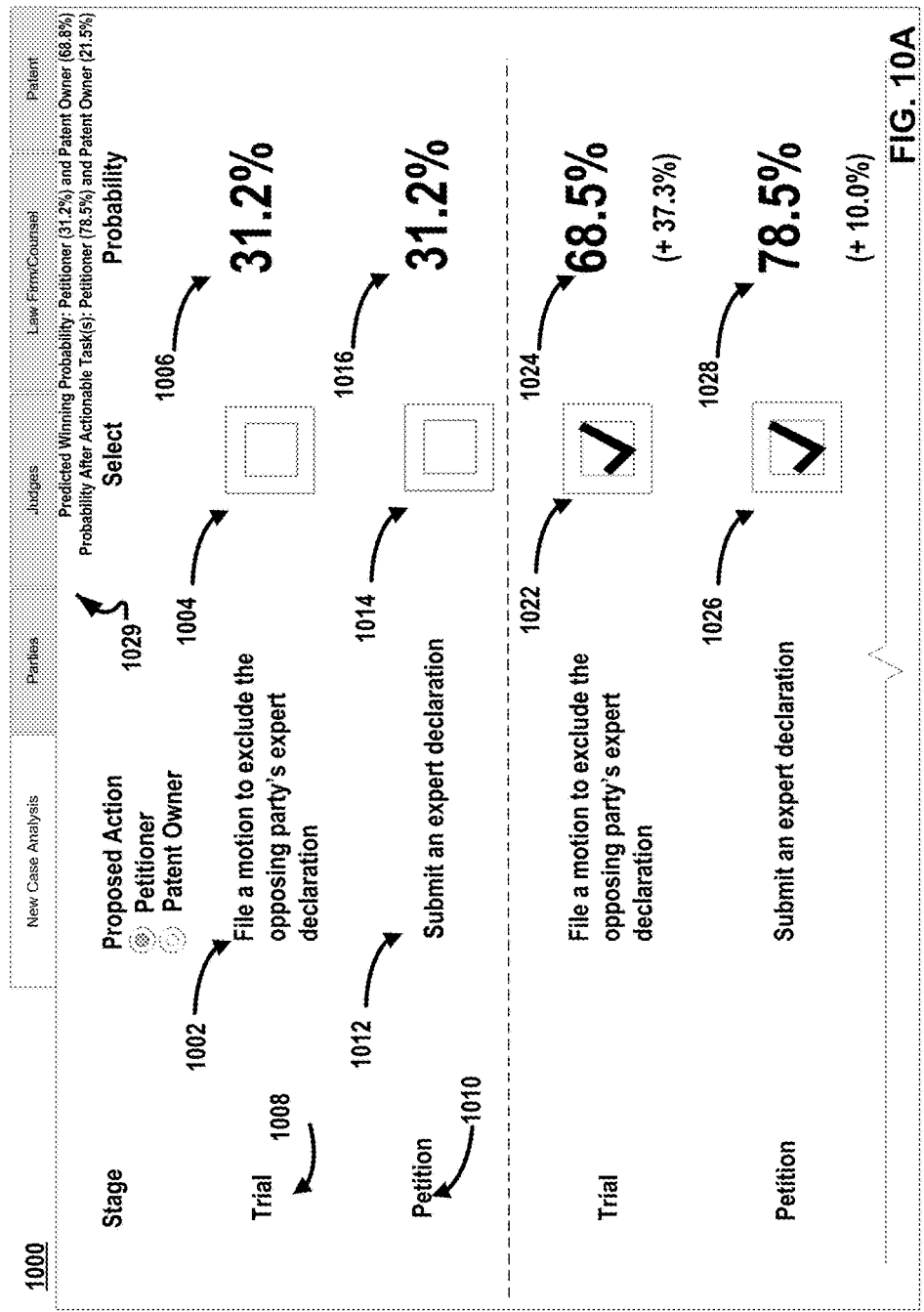
FIG. 10A shows an example dashboard displaying a listing of proposed actionable tasks for a petitioner.

In some implementations, the proposed actionable tasks identified by the prediction/recommendation engine 320 can be displayed to the user of the data management system 100 via a dashboard. For example, as shown in FIG. 10A, the user can be presented with one or more proposed actionable tasks 1002 for a petitioner. The proposed actionable task 1002 can be shown via a dashboard 1000 when the user logs onto the data management system 100.

Here, the actionable task 1002 proposed by the prediction/recommendation engine 320 indicates "File a motion to exclude the opposing party's expert declaration." The proposed actionable task 1002 can specify a particular stage for which the actionable task 1002 is proposed. In the example shown, the proposed actionable task 102 refers to a "Trial" stage 1008, meaning that if the proposed actionable task 1002 were performed by the petitioner during the trial phase (e.g., after the Board has decided to institute trial on the subject patent), then the predicted probability 1006 of "31.2%" can be affected.

In some implementations, the predicted probability 1006 can be initially determined by an analytical or statistical model (e.g., trained model 310). In some implementations, the predicted probability 1006 can be a refined probability that has been refined based on the scored data 318. As discussed above, the data analysis system 220 can continuously update the training parameters 304, training data 306, prediction parameters 314, and prediction data 316 as more legal documents are received and extracted. This continuous process can be formed as part of a machine learning technique (e.g., as performed by the machine learning module 230) that allows the data analysis system 220 to analyze and refine the trained model 310. In general, machine learning allows the use of a set of documents as a training set that yields a particular analytical or statistical model. Applying this analytical or statistical model to a new set of legal documents can allow the model to be retrained to get improved results.

In some implementations, a selectable input can be received from a user selecting a corresponding actionable task. When the selectable input is received, the validity or invalidity of the patent can be reassessed, and a new probability displayed to the user based on the reassessment.

For example, each proposed actionable task can be associated with a selectable input 1004. The selectable input 1004, when selected, can trigger an update to the corresponding predicted probability 1006. For example, when the selectable input 1004 is selected (e.g., selected input 1022), the first predicted probability 1006 is reassessed and changed from "31.2%" to a first new predicted probability 1024 of "68.5%." This means that if a motion to exclude the opposing party's expert declaration were filed, the predicted probability that at least one claim will be canceled will increase to 68.5%, as indicated by the first new predicted probability 1024. The first new predicted probability 1024 can also indicate the amount changed (e.g., "37.3%") to allow users to immediately realize the significance of the proposed actionable task.

As another example, a second proposed actionable task can be shown in addition to the first proposed actionable task 1002; namely, a second proposed actionable task 1012 to "Submit an expert declaration." The second proposed actionable task 1012, as shown, refers to a "Petition" stage 1010, meaning that the proposed actionable task 1012 is proposed for execution during the petition phase (e.g., prior to the Board issuing a Decision (Not) to Institute Trial).

Similar to the first proposed actionable task 1002, the second proposed actionable task 1012 is also associated with a selectable input 1014. To immediately realize how the second proposed actionable task 1012 can impact the overall predicted probability, the selectable input 1014 can be selected (e.g., as selected input 1026) to initiate the reassessment.

When the selectable input 1014 is selected, the corresponding second predicted probability 1016 is reassessed and changed from "31.2%" to a second new predicted probability 1028 of "78.5%." This means that if an expert declaration were submitted by the petitioner, the predicted probability that at least one claim will be canceled by the Board will increase to 8.5%, as indicated by the second new predicted probability 1028. Like the first new predicted probability 1024, the second new predicted probability 1028 can also indicate the amount changed (e.g., "10.0%") to allow users to immediately realize the magnitude of the proposed actionable task.

In sum, a user selecting a proposed actionable task can allow the prediction/recommendation engine 320 to re-analyze the trained models 310 and the scored data 318, update its predictions and recommendations, and output a new predicted probability. A selected recommendation 322 in the form of a selected actionable task can be fed back to the scored data 318 to be forwarded back to the prediction/recommendation engine 320 to perform the new analysis.

In some implementations, each actionable task proposed to the user and corresponding effect on the new predicted probability can both be determined in advance. When the user selects a proposed actionable task, its corresponding outcome can then be retrieved and integrated with the current predicted probability to provide an updated predicted probability for user presentation. In so doing, this technique can remove any system delay that can be caused by the feedback process to thereby improve the system's robustness.

In some implementations, where multiple selectable inputs are selected (e.g., where the first proposed actionable task 1002 and the second proposed actionable task 1012 are both selected), the overall probability reflected on the dashboard 1000 can be shown as an accumulated sum. In the example shown, the second new predicted probability 1028 is shown as an accumulated sum based on the first new predicted probability 1024 (e.g., the increase of "10.0%" associated with the second proposed actionable task 1012 is stacked onto the first new predicted probability 1024 and shown as an accumulated predicted probability of "78.5%").

If desired, the selectable inputs 1004 and 1014 can also separately selected to realize individual probability. For example, the second new predicted probability can be shown as "41.2%" instead of "78.5%" when the selectable input 1014 is selected separately from the first selectable input 1004.

In some implementations, the predicted probability as determined by one or more trained models can be displayed to the user. For example, the dashboard 1000 can display, at section 1029, the predicted winning probability for the Petitioner (e.g., 31.2%) and the Patent Owner (e.g., 68.8%). In some implementations, the predicted winning probability can be dynamically changed in real time as new documents are received (e.g., those associated with the current proceeding, or those associated with other proceedings related or unrelated to the subject patent) and models refined based on updated training parameters and data (e.g., training parameters and data 304/306), updated prediction parameters and data (e.g., prediction parameters and data 314/316), or the scored data (e.g., scored data 318).

In addition to the predicted winning probability, the probability after one or more proposed actionable tasks are selected by the user (e.g., selected input 1022 and selected input 1026) can also be displayed. In the example shown, with the selected input 1022 and selected input 1026, the updated probability can be reflected as "78.5%" for the Petitioner, and "21.5%" for the Patent Owner.

In some implementations, at section 1029, the predicted winning probability can be separated by stages. For example, the predicted winning probability associated with the petition stage and that associated with the trial stage can be shown separately. Similarly, the predicted probability associated with the petition stage and that associated with the trial stage after the one or more proposed actionable tasks are selected can be shown separately.

Figure 10B:
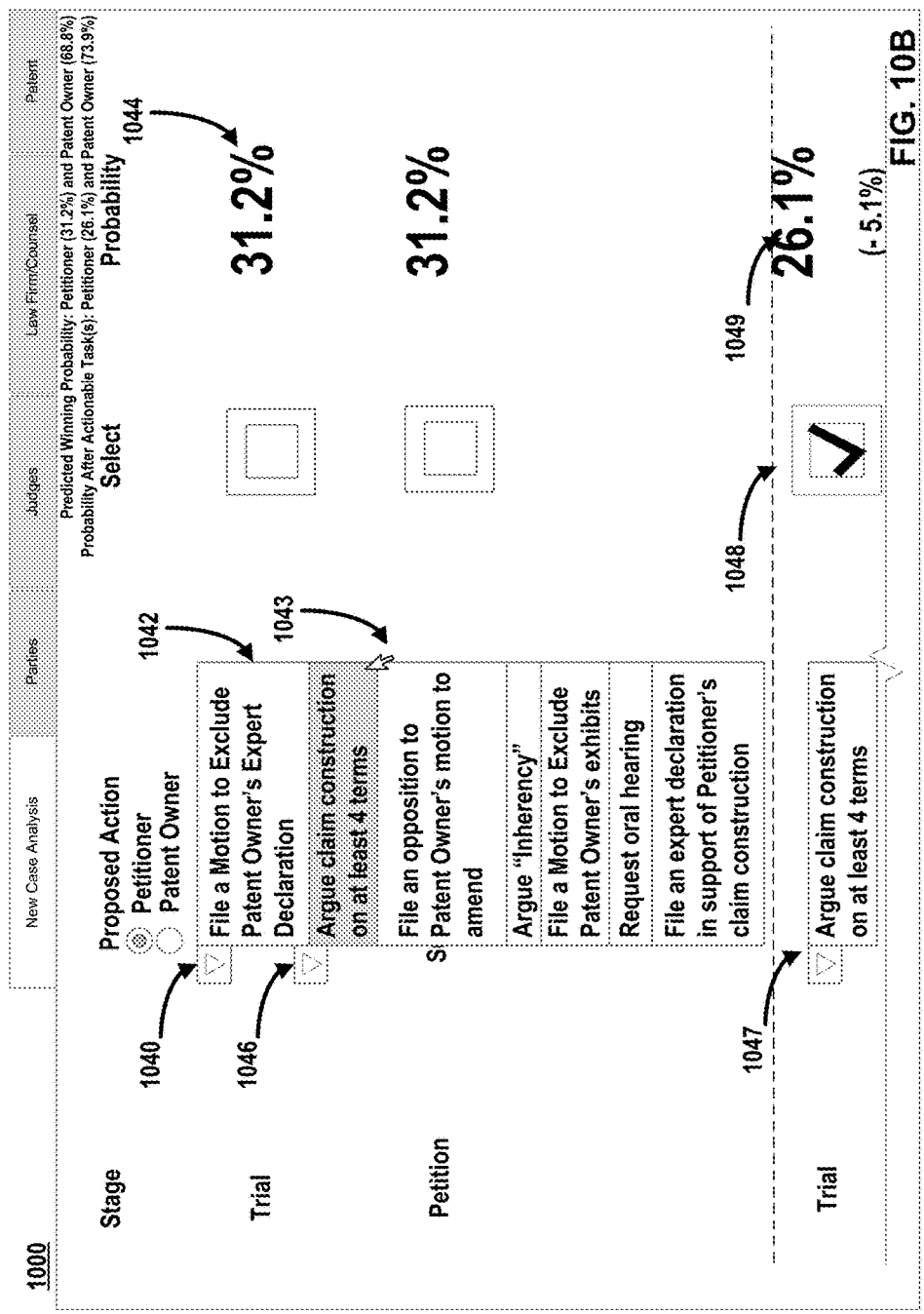
FIG. 10B shows a dropdown menu containing a listing of proposed actionable tasks in the dashboard shown in FIG. 10A.
Figure 10C:
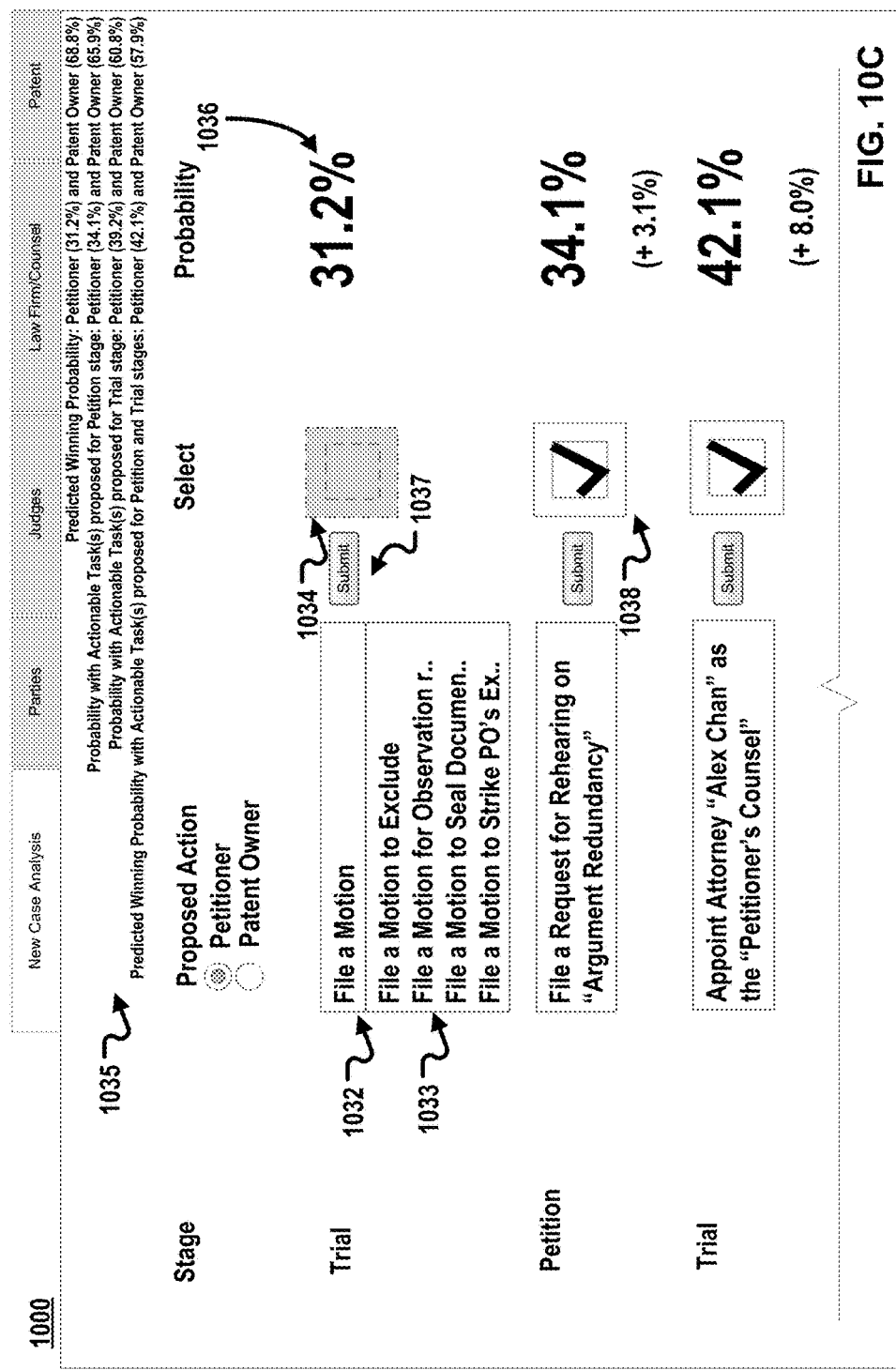
FIG. 10C shows a user input field populating a listing of proposed actionable tasks in the dashboard shown in FIG. 10A.

For example, temporarily referring to FIG. 10C, at section 1035, the predicted winning probability for each of the Petitioner and Patent Owner can be separated from the probability that takes into consideration of one or more actionable tasks proposed for the petition stage, and the probability that takes into consideration of one or more actionable tasks proposed for the trial stage. A predicted winning probability that takes into consideration of one or more actionable tasks proposed for both the petition stage and the trial stage can also be displayed at section 1035.

Referring back to FIG. 10A, each proposed actionable task can be displayed to the user on the dashboard 1000. In some implementations, a dropdown menu can be displayed to the user. The dropdown menu can include some or all of proposed actionable tasks from which the user can select to visualize the impact of the selected actionable task on the overall predicted probability.

For example, as shown in FIG. 10B, a dropdown menu 1040 can be provided by the prediction/recommendation engine 320. The dropdown menu 1040 can include a list of proposed actionable tasks 1040. In the example show, the dropdown menu 1040 can include "File a motion to exclude Patent Owner's expert declaration," "Argue claim construction on at least 4 terms," "File an opposition to Patent Owner's motion to amend," "Argue inherency," "File a Motion to Exclude Patent Owner's exhibits," "Request oral hearing," and "File an expert declaration in support of the Petitioner's claim construction."

As discussed above, each of the proposed actionable tasks 1042 can be associated with an individual or combined trained model (e.g., trained model 310). In some implementations, a selected or entire set of actionable tasks 1042 can be proposed based on, for example, the strength or sufficiency of their corresponding model (e.g., using scored data 318). In some implementations, a selected or entire set of actionable tasks 1042 also can be randomly proposed (e.g., where the models are all equally satisfactory as indicated by the scored data 318).

While the foregoing implementations are described with respect to increasing the overall predicted probability (e.g., when the first proposed actionable task 1002 and/or the second proposed actionable task 1012 is/are selected), it should be noted that the predicted probability can be result-dependent. More specifically, depending on the actionable task proposed by the prediction/recommendation engine 320 and selected by the user, the new predicted probability also can be decreased where the prediction/recommendation 320 predicts that the selected proposed actionable task can have an adverse impact to the user's litigation strategy.

For example, where the analytical or statistical model associated with arguing claim construction on more than four terms indicates that the presiding judges have a statistical tendency to affirm three or more claims where the petitioner argues claim construction on four or more terms, the prediction/recommendation engine 320 can determine that such an actionable task 1047, if taken by the petitioner, can adversely lower the petitioner's chance of success in canceling more than three claims.

In this example, when the user has selected (via cursor 1043) the actionable task "Argue claim construction on at least 4 terms" and the selectable input 1048, the prediction/recommendation engine 320 can analyze the trained model associated with this selected task and the corresponding scored data to predict the substantive effect that this actionable task could impact the overall probability negatively (e.g., "−5.1%"). This impact can be shown along with the predicted probability 1049 (e.g., "26.1%") to the user to provide a complete predictive analysis of the selected actionable task.

If desired, multiple dropdown menus (e.g., a second dropdown menu 1046) can also be presented to the user to allow the user to select more than one proposed actionable task. In so doing, the data analysis system 220 can help guide the user's litigation strategy and institute cost-saving measures to avoid expensive and unnecessary legal work product that does not have any meaningful impact to the user's case proceeding while helping the user maximize on the chance to have at least one claim affirmed or canceled by the Board. Such predictive analytic helps users unlock the true value of business intelligence by making critical statistical information transparent, meaningful, usable and actionable at any phase of the review proceeding.

In some implementations, a dropdown menu can also be implemented for the "Stage" section so that the user can toggle between varying stages (e.g., trial or petition) and choose corresponding actionable tasks tailored for the selected stage. For example, where the user has selected the "Petition" stage, the data analysis system 220 can display one or more proposed actionable tasks specific for the selected "Petition" stage. Similarly, where the user has selected the "Trial" stage, the data analysis system 220 can display one or more proposed actionable tasks specific for the selected "Trial" stage.

It should be noted that the implementations shown in FIG. 10B can also be applied to other implementations shown in other figures (e.g., those shown in FIG. 10A or FIG. 10D discussed below). In sum, implementations described in various figures can be applied in whole or in part to other figures, and should not be construed as limiting to only those figures in which the implementations are described.

In some implementations, the data management system 100 can receive a user input associated with an actionable task. Based on the user input, it can be determined whether the user input associated with the actionable task relates to the one or more existing analytical or statistical or trained models. A separate analytical or statistical model can be developed by the model engine 302 based on the user input associated with the actionable task if it is determined that the user input associated with the actionable task is unrelated to the one or more developed trained models. The validity or invalidity of the patent can be reassessed based on the one or more developed trained models and the separate trained model.

For example, the data analysis system 220 can provide an input field through which a user can manually enter a particular actionable task, and seek the data analysis system 220 to evaluate the impact of this actionable task on the predicted winning probability. As an example, referring to FIG. 10C, an input field 1032 can be displayed on the dashboard 1000. The input field 1032 allows a user to enter a document, exhibit, particular type of evidence, or actionable task. Once the user enters a user input and clicks on the "Submit" button 1037, the data analysis system 220 can parse and analyze the user input to determine whether one or more already-developed trained models associated with the user input exist. To do so, the data analysis system 220 can parse the user input using a variety of techniques, such as natural language processing, machine learning, sentiment analysis, relational extraction, or computational linguistics models.

For example, if the user has entered "Motion to Exclude," the data analysis system 220 can parse and analyze the user input to determine that the user is seeking to assess how a "Motion to Exclude" to exclude certain types of evidence submitted by the opposing party, if filed, could affect the predicted winning probability 1036. In this example, the data analysis system 220 can determine that a trained model associated with "Motion to Exclude" already exists (e.g., a correlation between a motion to amend and having at least one claim affirmed by the Board) and has already been developed by the model engine 302.

If one or more train models related to the user input exist, the data analysis system 220 can process the user input based on the existing trained model(s) (e.g., by integrating the identified trained model with the trained models used to determine the initial predicted winning probability 1036).

In some implementations, if the data analysis system 220 determines that no trained model related to the user input exists, the data analysis system 220 can, in real time, request the data analysis system 220 to immediately analyze the new mined data to develop a trained model associated with the document, exhibit, or actionable task specified in the user input.

As an example, assuming the user has entered "filing of an expert declaration as a petitioner" in the input field 1032 but no trained model has been developed that models the correlation between the expert declaration and the petitioner's predicted winning probability (e.g., at least one claim that will be canceled by the Board), the data mining system 202 can mine the documents in the data sources 110/112 and repositories 104/106 for documents relating to "expert declaration". Data mined from these documents can then be sent to the data analysis system 220 for analysis in a manner similar to those described with respect to FIG. 3 (e.g., one or more trained models can be created via the model engine 302, scored by the scoring engine 312, and prediction/recommendation 322 provided by the prediction/recommendation engine 320). Resulting predictions and recommendations can then be provided back to the user in real-time (e.g., Where a trained model associated with the data requested via the user input does not exist, the selectable input 1034 can remain deactivated (e.g., graphically grayed out) so that the probability 1036 as originally predicted by the data analysis system 220 remains unchanged. Where an associated trained model exists, the selectable input 1034 can be activated (e.g., similar to selectable input 1038) to allow for user selection. When the selectable input 1034 is selected, the probability 1036 can then be correspondingly updated based on the associated trained model.

In some implementations, the data analysis system 220 can intelligently provide an autocomplete option that includes one or more recommendations in the form of one or more proposed actionable tasks 1033. As the user enters the user input, the data analysis system 220 can propose one or more relevant actionable tasks to the user before the user completes entering the user input. The autocomplete option can be used to help a user recognize all the relevant actionable tasks that can be selected for predictive analysis. For example, when the user manually enters "File A Motion", the autocomplete option running in the background can trigger a display of one or more relevant actionable tasks that match the user input (e.g., "File a Motion to Exclude", "File a Motion for Observation regarding cross examination", "File a Motion to Seal Document filed by the Patent Owner", and "File a Motion to Strike Patent Owner's Expert Declaration").

In some implementations, the one or more relevant actionable tasks 1033 can be associated with one or more trained models that have previously been created by the data analysis system 220 but not yet taken into consideration in generating the predicted probability 1036.

For example, the probability 1036 can be generated based on a subset (e.g., trained models associated with "A", "B", "C" and "D") of a group (e.g., trained models associated with "A" through "F") of trained models developed by the model engine 302. In this example, each of the other trained models not yet utilized (e.g., trained models associated with "E" and "F") then can be provided as an individual option in the form of a recommendation (e.g., "File a Motion to Exclude", "File a Motion for Observation regarding cross examination", "File a Motion to Seal Document filed by the Patent Owner", and "File a Motion to Strike Patent Owner's Expert Declaration"). In so doing, this option allows the user to realize the individualized impact of each individual actionable task on the overall predicted winning probability 1036 (e.g., as opposed to one that is generated based on all trained models without any possible way to realize how each of these trained models affects the overall predicted winning probability 1036).

In some implementations, the one or more relevant actionable tasks 1033 can also include those that do not yet have a corresponding trained model, but which, if selected, can request the data mining system 202 and the data analysis system 220 to mine the existing documents and develop the corresponding trained model in the manner discussed above.

Figure 10D:
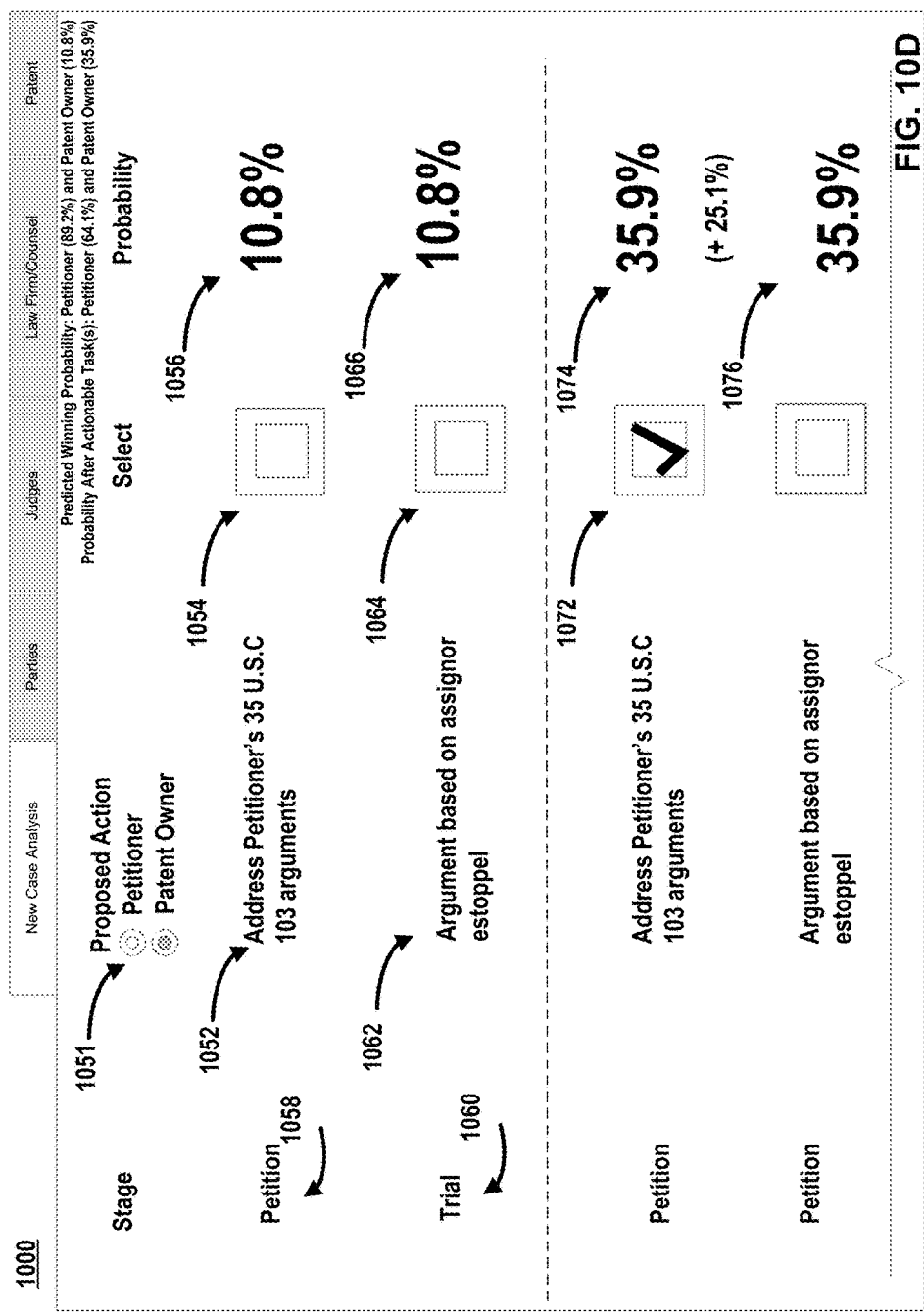
FIG. 10D shows an example dashboard displaying a listing of proposed actionable tasks for a patent owner.

FIG. 10D shows an example dashboard associated with proposed actionable tasks for a patent owner. As shown in FIG. 10D, the dashboard 1000 can also display proposed actionable tasks for a patent owner. In some implementations, the dashboard 1000 can display proposed actionable tasks for both a petitioner and a patent owner concurrently. In other implementations, the proposed actionable tasks for both a petitioner and a patent owner can be shown separately or sequentially.

In some implementations, the dashboard 1000 can prompt the user to identify the user's viewing interest (e.g., as a petitioner or a patent owner) via a selectable input. Based on the user's selection, the dashboard 1000 can display the proposed actionable tasks accordingly. For example, the dashboard 1000 can provide a selectable button 1051 to allow the user to manually toggle and identify the corresponding sets of proposed actionable tasks to be displayed. In the example shown, the user can select to view proposed actionable tasks for a patent owner via the selectable button 1051.

When the selectable button 1051 for the patent owner is selected, proposed actionable tasks 1052 and 1062 for the patent owner can be displayed on the dashboard 1000. Similar to those shown in FIG. 10A, each proposed actionable task 1052/1062 can be associated with a selectable input 1054/1064, respectively. The selectable input(s) 1054/1064, when selected, can trigger an update to the predicted probability 1056/1066.

For example, when the selectable input 1054 is selected (e.g., selected input 1072), the first predicted probability 1056 changes from "10.8%" to a first new predicted probability 1074 of "35.9%." This means that if the petition addresses the petitioner's obviousness arguments under 35 U.S.C. 103, the probability that at least one claim will be canceled by the Board will increase to 35.9%, as indicated by the first new predicted probability 1074. The first new predicted probability 1074 can also indicate the amount changed (e.g., "25.1%") to allow users to immediately realize the impact of such an argument when made.

As discussed above, where multiple selectable inputs are selected (e.g., where the first proposed actionable task 1002 and the second proposed actionable task 1012 are both selected), the overall predicted probability reflected on the dashboard 1000 can be shown as an accumulated sum. In the example shown, because the second selectable input 1064 is not selected, the second new predicted probability 1076 remains unchanged and is shown as an accumulated sum based on the first new predicted probability 1074 (e.g., that does not consider any change in difference when the second selectable input 1064 is selected).

Other proposed actionable tasks such as a service, submission or filing of any document stored in the repositories 104/106 as well as those discussed above, such as without limitation, a preliminary response by a patent owner of the patent, a motion to amend at least one claim of the patent, a motion to exclude evidence, a request to change lead or backup counsel, a predetermined number of prior art references, a predetermined number of terms requested for claim construction, and an observation on cross examination also are contemplated.

It should be noted that while the implementations with respect to proposed actionable tasks for a petitioner and a patent owner are separately described, features and implementations described in either the petitioner or the patent owner are equally applicable to the other one of the petitioner or the patent owner. For example, the dropdown menus 1040/1046 described in FIG. 10B are equally applicable in FIG. 10D.

As discussed previously, argument-based actionable tasks also can be included as proposed actionable tasks. For example, as shown in FIG. 10B, the list of proposed actionable tasks 1042 can include the argument-based actionable task "Argue 'Inherency.'" In some implementations, the argument module 232 can be used to extract one or more such legal arguments from the documents residing in the repositories 104/106, which can then be used by the model development module 228 to develop a trained model for use in the predictive analysis process by the prediction/recommendation engine 320.

In some implementations, one or more patterns containing argument-based words (e.g., "Petitioner argues" or "Patent Owner contends") can be applied by the pattern module 207 to the documents residing in the repositories 104/106 in order to extract words, phrases, and paragraphs and associated text relating to legal doctrines or arguments (e.g., legal doctrines or arguments pertaining to "inherency", "teaching away," "commercial success", "long-felt need", "inadmissible evidence", "hearsay," "untimely objection to evidence", "reliance on licensing activities as evidence of non-obviousness") by the data mining engine 208.

In some implementations, the argument module 232 can analyze these argument-based text, and employ an argument score indicative of the relevancy of these argument-based text. For example, an argument score can be generated using term weight values that provide a relative measure of the importance of a legal term appearing within a particular paragraph. For example, a legal term that is infrequently used in the English language (e.g., estoppel, assignee, petitioner) that appears multiple times within a given paragraph can be given a high term weight (e.g., as it can indicate that a particular legal argument can relate to a particular legal doctrine).

As another example, a legal term that is frequently used in the English language but appears only a few times within a given legal document can be given a low term weight. The argument module 232 can use the terms weights to generate an arguments score for one or more of the sections of the documents stored in the repositories 104/106. The argument score can then be used to ascertain the likelihood that a particular section, paragraph, or document relates to a particular legal argument.

The argument module 232 can utilize the argument score in compiling a trained statistic model for legal arguments. For example, where there are ten petitions (e.g., one petition for each separate case) in the repository 104 and six of them have an argument score of "9" (e.g., out of "10" with "10" being the most relevant and "1" being the least relevant) with respect to a legal argument pertaining to "inherency," the argument module 232 can determine that 60% of the petitions argue on the issue of "inherency." A trained model can then be developed (e.g., by the training/model development engine 102) based on a correlation between these statistics and the outcomes of those cases.

For example, if those six cases all result in the Board ruling in favor of the petitioner in canceling at least one claim of the patent in dispute, a trained model can be developed based on the correlation between the cancellation of at least one claim and the legal argument of inherency (e.g., where the petitioners have a 60% chance of having at least one claim canceled and the patent owners have a 40% chance of having at least one claim affirmed when the legal argument of inherency is involved).

In some implementations, the argument module 232 can determine a threshold for the argument score above which a document can be discounted from being used in developing the trained model. For example, the argument module 232 can determine that any argument score above "5" would be used for developing the trained model. Using the example given above, where there are ten petitions in the repository and three of which have an argument score of "9" and four have an argument score of "4" with respect to a legal argument pertaining to inherency, the argument module 232 can determine that 30% of the petitions relate to the issue of inherency (e.g., because the other four documents have an argument score of "4" that is below the threshold of "5").

In some implementations, the argument module 232 can generate multiple argument scores for a particular document where the document might have multiple sections or paragraphs discussing a particular legal argument. In some implementations, these argument scores can then be summed and weighted in determining a final argument score for the entire document. By summing and weighting the multiple argument scores, the argument module 232 can determine the likelihood that the particular document pertains to a particular legal argument. This determination can then be used by the correlation module 222 and the statistics module 226 in creating relevant analytical or statistical information (e.g., correlations between a particular legal argument and at least one claim that will be canceled or affirmed by the Board) and by the model engine 302 in developing and training models for use by the prediction/recommendation engine 320 in generating appropriate predictions (e.g., predicted probability) and recommendations (e.g., proposed actionable tasks).

For example, where a document has three separate paragraphs discussing the legal issue of assignee estoppel, and the three separate paragraphs have an individual argument score of "7", "10", and "4", the argument module 232 can determine an average argument score of "7" for the entire document in the context of assignee estoppel. In this example, because at least two paragraphs have an argument score higher than a predetermined threshold of "5," the summing and weighting approaches allows the argument engine 232 to view the argument score of "7" as likely reliable and reduce the likely occurrence of false positives.

However, a false positive can occur, for example, where a paragraph mentions a legal authority that substantively focuses on legal privity and remotely discusses "assignee estoppel" as part of a supporting authority when in fact the document or underlying argument does not involve "assignee estoppel." For example, where there are two paragraphs in a document discussing a legal argument in the context of assignee estoppel, the ten paragraphs each have an individual argument score of "1", "1", "1", "1", "9", "9", "9", "1", "1", and "1". The summing and weighting approach, if used, would then yield an average argument score of "3.3". However, this approach might not be optimal in this instance because the result suggests that the document is likely not relevant to assignee estoppel, despite three consecutive paragraphs having an argument score of "9", which is well above the predetermined threshold.

Accordingly, in some implementations, the number of occurrence as well as the place of occurrence also can be considered in order to allow the argument module 232 to accurately assess and avoid any potential misread (and erroneous data extraction). Using the example above, the argument module 232 can consider the fact that there are three paragraphs with an argument score of "9", and that these paragraphs are consecutive in nature, suggesting that the author might have been elaborating on the legal argument at issue.

In some implementations, the argument module 232 can assign a weight to the number of occurrence and the place of occurrence different from that given by the summing and weighting approach. In these implementations, the weight might be in multiples (e.g., twice as important, or three times as important) when the place of occurrence or number of occurrence exceeds a predetermined threshold (e.g., where the number of occurrence exceeds "3" in a document with more than ten paragraphs discussing assignee estoppel, or where the place of occurrence exceeds four consecutive paragraphs in said document).

As discussed above, term weights can be used to provide a measure of the importance of an associated term within a particular paragraph or section. Terms weights can also be provided as a predetermined set of term weights or can be generated by one or more local services. For example, the argument module 232 can also be configured to generate term weights. Term weights can be generated using any known term weighting technique. For example, a term-frequency inverse document frequency term weight can be calculated for any particular terms. However, any known technique for generating term weights can be used (e.g., using relative term frequencies across all of documents, a subset thereof, among the paragraphs of a particular document, and the like).

Figure 4:
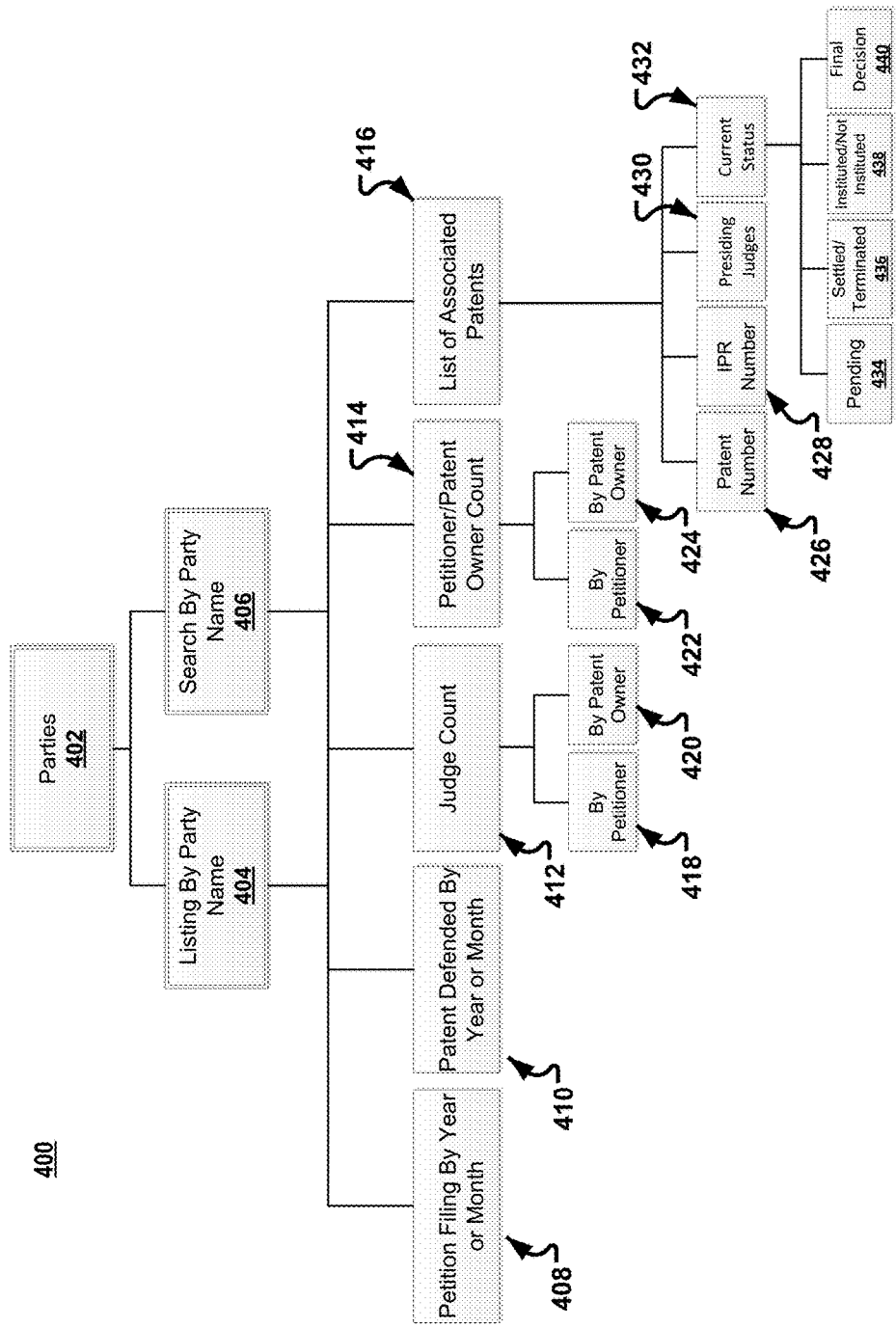
FIG. 4 show an example site map for displaying the assessment of the validity or invalidity of a patent to one or more users via a "Parties" category.

As discussed above, predictions and recommendations generated by the prediction/recommendation engine 320 can be displayed to the users via a dashboard. In some implementations, in addition to the predictions and recommendations 322, data gathered and processed by the statistics module 226, the correlation module 222, and the argument module 232 also can be displayed to the user. FIG. 4 show an example site map 400 for displaying the assessment of the validity or invalidity of the patent to one or more users via a "Parties" category.

Referring to FIG. 4, the data analysis system 220 can display the prediction/recommendation 322 output by the prediction/recommendation engine 320. For example, the data analysis system 220 can display a "Parties" category 402 on a dashboard (e.g., dashboard 1000). When the "Parties" category 402 is selected, the user can be presented with one or more options such as a listing of party name 404 or searching by party name 406.

The listing by party name option 404 can include a listing of the most active party (petitioner or patent owner), or the party with the most recent submission or filing. The searching by party name option 406 can allow the user to search for and locate a particular party based on the party's name (e.g., Google). When either option is executed, indicating that the user has chosen to view further information regarding a particular party, the user can be presented with multiple additional options for further selection such as, without limitation, "Petition Filing by Year or Month" 408, "Patent Defended By Year or Month" 410, "Judge Count" 412, "Petition/Patent Owner Count" 414, and "List of Associated Patents" 416.

The "Petition Filing By Year or Month" option 408, when selected, can request the data analysis system 220 to display a listing of petitions filed by the party selected by the user. The selection can also include a selection to display the listing of petitions by year (e.g., all petitions filed in 2013 and all petitions filed in 2014), or by month (e.g., all petitions filed in January of 2013, and all petitions filed in December of 2014).

Similarly, the user can request the data analysis system 220 to display all patents defended by the selected party as a patent owner. For example, the "Patent Defended By Year or Month" option 410, when selected, can request the data analysis system 220 to display a listing of patents defended by the selected party as a patent owner. The selection can also include a selection to display the listing of patents defended by that party by year (e.g., all patents defended in 2013 and all patents filed in 2014), or by month (e.g., all patents defended in January of 2013, and all patents filed in December of 2014).

The "Judge Count" option 412, when selected, allows the user to identify a listing of judges presiding over any proceeding in which the selected party was the patentee and/or the patent owner. For example, the "Judge Count" option 412, when selected, can request the data analysis system 220 to display a listing of judges (e.g., Judge Kevin F. Turner, Judge Joni Y. Chang, and Judge Michael R. Zecher for inter partes review "IPR2013-XXXXXX" in which the selected party is the "Patent Owner"). In addition to displaying a listing of judges, the "Judge Count" option 412 can also display a total count of proceedings for a particular judge. For example, the data analysis system 220 can display a count of "13" for "Judge Joni Y. Chang" followed by another count of "6" for "Judge Kevin F. Turner." The count can be used to indicate the total number of proceedings involving a petition filed or a patent defended by the selected party and in which the proceedings are/were presided (e.g., in part or in whole) by the corresponding judge.

Optionally, the count number can be hyperlinked so that when the count number is selected by the user, the data analysis system 220 can further display the judge count for a particular judge where the selected party is/was a petitioner 418, and where the selected party is/was a patent owner 420. For example, the data analysis system 220 can display each individual judge with an associated count number involving a proceeding where the selected party is/was a petitioner, or a proceeding in which the selected party is/was a patent owner 420 (e.g., Judge "X" is/was a judge in a "17" proceedings where the selected party is/was a petitioner and is/was a judge in a "11" proceedings where the selected party is/was patent owner for a total count of "28").

Similarly, the "Petition/Patent Owner Count" option 414 allows the user to identify a listing of proceedings in which the selected party is/was a petitioner and a patent owner. For example, the "Petition/Patent Owner Count" option 414, when selected, can request the data analysis system 220 to display all proceedings involving the selected party as a petitioner or a patent owner. In this example, the content presented can include a count of "5" where the selected party is/was a petitioner, and a count of "2" where the selected party is/was a patent owner. The count can also be hyperlinked such that when the count number is selected, the data analysis system 220 can further display a first count where the selected party is/was a petitioner, and a second count where the selected party is/was a patent owner. For example, the data analysis system 220 can display that the selected party has a count of "11" where the selected party is/was a petitioner, or a count of "13" where the selected party is/was a patent owner 420, for a total count of "24" as both the petitioner and the patent owner.

The "List of Associated Patents" option 416, when selected, allows the user to view a listing of patents that have been the subject of a review proceeding in which the selected party is either a petitioner or a patent owner. For example, assuming the selected party has involved in a proceeding in which Patent "X" was owned and defended by the selected party, and Patent "Y" was owned by a third party and challenged by the selected party, the "List of Associated Patents" option 416 can display both Patent "X" and Patent "Y" to the user.

In some implementations, each patent can be hyperlinked so that information about a particular patent can be shown to the user. The information can include, but is not limited to, patent number 426, IPR number 428 (e.g., case number assigned by the Board), names of associated presiding judges 430 (e.g., Judge Kevin F. Turner, Judge Joni Y. Chang, and Judge Michael R. Zecher), and the current status 432 of the proceeding (e.g., "Pending" 434, "Settled/Terminated" 436, "Instituted/Not Instituted" 438, and "Final Decision" 440).

Figure 5:
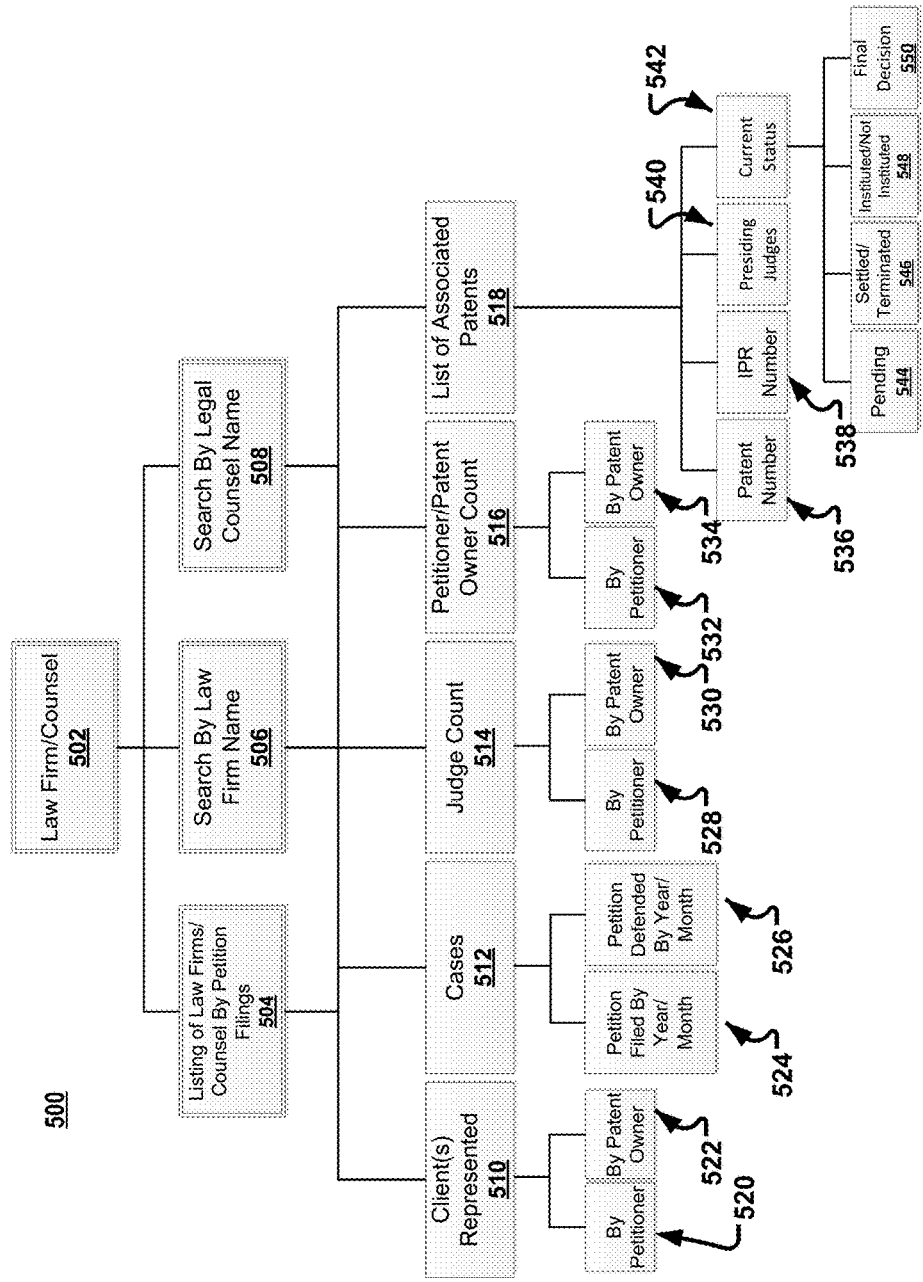
FIG. 5 show an example site map for displaying the assessment of the validity or invalidity of a patent to one or more users via a "Law Firm/Counsel" category.

FIG. 5 show an example site map 500 for displaying the assessment of the validity or invalidity of the patent to one or more users via a "Law Firm/Counsel" category. Referring to FIG. 5, the data analysis system 220 can display a "Law Firm/Counsel" category 502 on a dashboard (e.g., dashboard 1000). When the "Law Firm/Counsel" category 502 is selected, the user can be presented with one or more options such as a listing of law firms/counsel by petition filings 504, searching by law firm name 506 (e.g., "Fish & Richardson P. C."), or searching by legal counsel name 508 (e.g., "Alex Chan").

The listing by law firms/counsel by petition filings option 504 can include a listing of the most active law firm(s) or legal counsel(s) (representing on behalf of a petitioner or patent owner), or the law firm(s) or counsel(s) by petition filings with the most recent submission or filing. The searching by law firm name option 506 can allow the user to search for and locate a particular law firm (e.g., "Fish & Richardson P. C."), and the searching by legal counsel name option 508 can allow the user to search for and locate a particular patent practitioner. When either of these options is selected, indicating that the user has chosen to view further information regarding a particular law firm or legal counsel, the user can be presented with multiple additional options for further selection such as, without limitation, "Client(s) represented" 510, "Cases" 512, "Judge Count" 514, "Petition/Patent Owner Count" 516, and "List of Associated Patents" 518.

The "Client(s) represented" option 510, when selected, can request the data analysis system 220 to display a listing of companies or businesses represented by the law firm or legal counsel selected by the user. The selection can also include a selection to display the listing of client(s) represented by year (e.g., all clients represented in 2013 and all clients represented in 2014), or by month (e.g., all clients represented in January of 2013, and all clients represented in December of 2014).

Similarly, the user can request the data analysis system 220 to display all cases or proceedings handled by the selected law firm or legal counsel. For example, the "Cases" option 512, when selected, can request the data analysis system 220 to display a listing of proceedings handled by the selected law firm or legal counsel (e.g., IPR2013-XXXXXX, IPR2012-XXXXXX, IPR 2014-XXXXXX). The selection can also include a selection to display the listing of cases in which that selected law firm or legal counsel is named as a legal counsel or backup counsel by year (e.g., all petitions filed in 2013 and all petitions defended in 2014), or by month (e.g., all petitions filed in January of 2013, and all petitions filed in December of 2014).

The "Judge Count" option 514, when selected, allows the user to identify a listing of judges presiding over any proceeding in which the selected law firm or legal counsel was the patentee and/or the patent owner. For example, the "Judge Count" option 514, when selected, can request the data analysis system 220 to display a listing of judges (e.g., Judge "X", Judge "Y", and Judge "Z" for inter partes review "IPR2013-XXXXXX" in which the selected law firm or legal counsel represents or represented the "Patent Owner").

In addition to displaying a listing of judges, the "Judge Count" option 514 can also display a total count of proceedings for a particular judge that has acted as a presiding or authoring judge in a proceeding in which at least one of the parties is/was represented by the selected law firm or legal counsel. For example, the data analysis system 220 can display a count of "13" for "Judge Joni Y. Chang" followed by another count of "6" for "Judge Kevin F. Turner" to indicate that "Judge Joni Y. Chang" is a judge in "13" of the proceedings in which at least one of the parties is/was represented by the selected law firm or legal counsel, and "Judge Kevin F. Turner" is a judge in "6" of the proceedings in which at least one of the parties is/was represented by the selected law firm or legal counsel.

The "Judge Count" option 514 can also sort the listing of judges by petitioner 528 or by patent owner 530. For example, as shown in TABLE 1 below, the data analysis system 220 can display "Judge Joni Y. Chang" as a judge in "10" proceedings where the petitioner is/was represented by the selected law firm or legal counsel (e.g., Fish & Richardson P. C."), and also as a judge in "3" of the proceedings where the patent owner was represented by the selected law firm or legal counsel for a total of "13" proceedings.

TABLE 1

| Fish & Richardson P.C. | | | |
| --- | --- | --- | --- |
| Name of Judge | Petitioner | Patent Owner | Total |
| Joni Y. Chang | 10 | 3 | 13 |
| Kevin F. Turner | 12 | 5 | 17 |
| Michael R. Zecher | 11 | 1 | 12 |

Similarly, the "Petition/Patent Owner Count" option 516 allows the user to identify a listing of proceedings in which either a petitioner or a patent owner is/was represented by the selected law firm or legal counsel. For example, the "Petition/Patent Owner Count" option 516, when selected, can request the data analysis system 220 to display all proceedings involving a party represented by the selected law firm or legal counsel.

For example, the data analysis 220 can display that the law firm "Fish & Richardson P. C." has a count of "26" proceedings where either the petitioner or the patent owner is/was represented by "Fish & Richardson P. C.". As another example, the data analysis 220 can display that the legal counsel "Alex Chan" has a count of "12" proceedings where "Alex Chan" is/was acting as a legal counsel or backup counsel.

In some implementations, the count number can also be hyperlinked such that when the count number is selected, the data analysis system 220 can further display a first count indicating the number of times a petitioner is/was represented by the selected law firm or legal counsel 532, and a second count indicating the number of times a patent owner is/was represented by the selected law firm or legal counsel 534.

For example, as illustrated in TABLE 2 below, the data analysis system 220 can display that the selected law firm or legal counsel "Fish & Richardson P. C." has a count of "7" where a petitioner is/was represented by the selected law firm or legal counsel, or a count of "8" where a patent owner is/was represented by the selected law firm or legal counsel, for a total count of "15" representing both the petitioner and the patent owner

TABLE 2

| Firm Name | Petitioner | Patent Owner | Total |
| --- | --- | --- | --- |
| Fish & Richardson P.C. | 7 | 8 | 15 |
| Haynes Boone | 6 | 7 | 13 |
| Finnegan Henderson | 4 | 5 | 9 |

The "List of Associated Patents" option 518, when selected, allows the user to view a list of patents that have been the subject of a proceeding in which either a petitioner or a patent owner is/was represented by the selected law firm or legal counsel. For example, assuming Patent "X" was owned and defended by a patent owner represented by the selected law firm or legal counsel, and Patent "Y" was owned by a third party and challenged by a party represented by the selected law firm or legal counsel, the "List of Associated Patents" option 518 can display both Patent "X" and Patent "Y" to the user.

In some implementations, each patent can be hyperlinked so that information about a particular patent can be shown to the user. The information can include, but is not limited to, patent number 536, IPR number 538 (e.g., case number assigned by the Board), names of associated presiding judges 540 (e.g., Judge Kevin F. Turner, Judge Joni Y. Chang, and Judge Michael R. Zecher), and the current status 542 of the proceeding (e.g., "Pending" 544, "Settled/Terminated" 546, "Instituted/Not Instituted" 548, and "Final Decision" 550).

Figure 6:
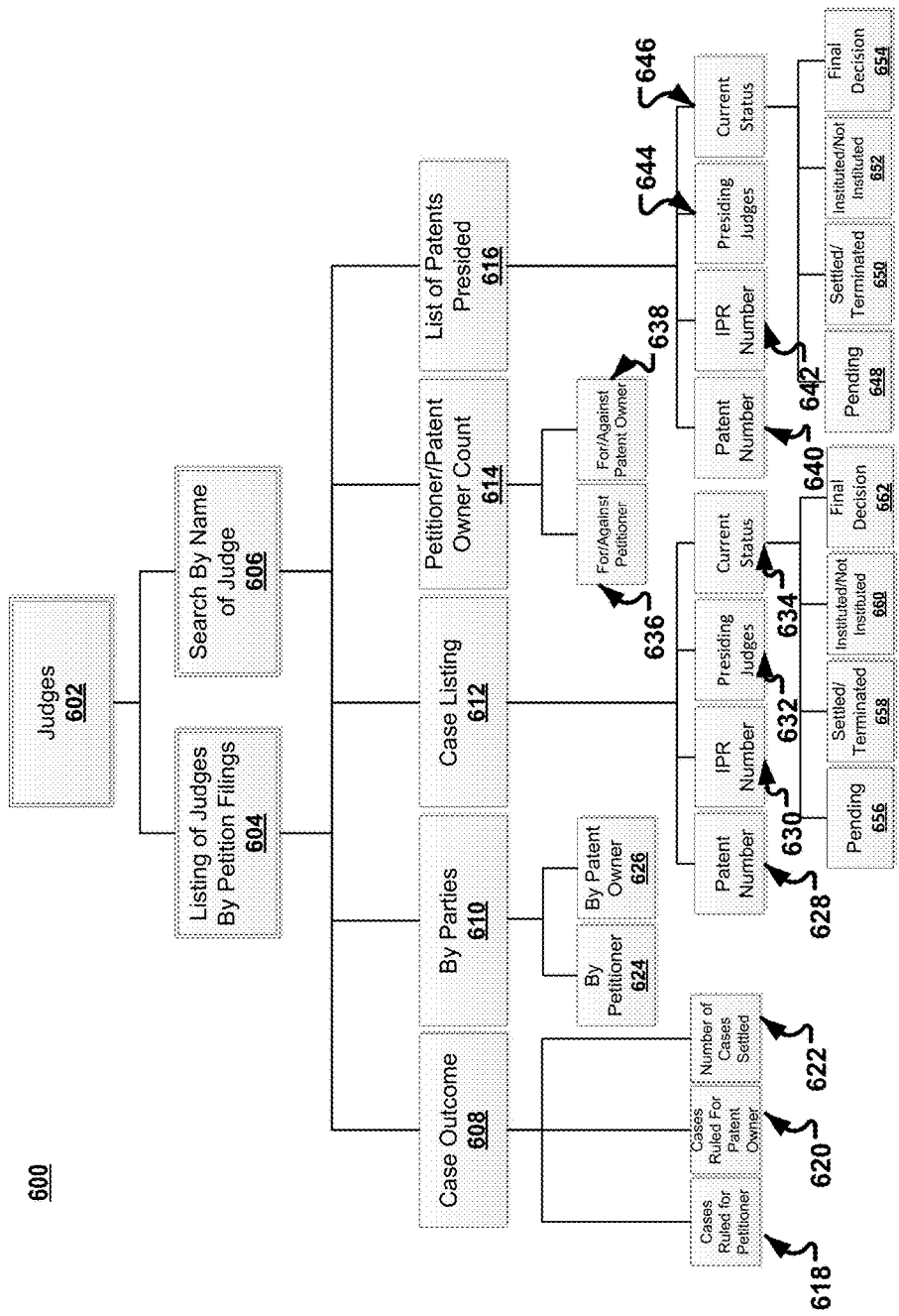
FIG. 6 show an example site map for displaying the assessment of the validity or invalidity of a patent to one or more users via a "Judges" category.

FIG. 6 show an example site map 600 for displaying the assessment of the validity or invalidity of the patent to one or more users via a "Judges" category. Referring to FIG. 6, the data analysis system 220 can display a "Judges" category 602 on a dashboard (e.g., dashboard 1000). When the "Judges" category 602 is selected, the user can be presented with one or more options such as a listing of judges by petition filings 604 (e.g., Judge Kevin F. Turner, Judge Joni Y. Chang, and Judge Michael R. Zecher, etc.), or searching by the name of an individual judge 606 (e.g., Judge Joni Y. Chang).

The listing of judges by petition filings option 604 can include a listing of the most active judges. The searching by the name of a judge option 606 can allow the user to search for and locate a particular judge (e.g., "Judge Joni Y. Chang"). When either option 604/606 is selected, indicating that the user has chosen to view further information regarding a particular judge, the user can be presented with multiple additional options for further selection such as, without limitation, "Case Outcome" 608, "By Parties" 610, "Case Listing" 612, "Petitioner/Patent Owner Count" 614, and "Listing of Patents Presided" 616.

The "Case Outcome" option 608, when selected, can request the data analysis system 220 to display a listing of case outcomes as ruled by the selected judge. For example, the data analysis system 220 can display a listing of cases in which the selected judge is one of the three judges that has affirmed at least one claim of a patent challenged by a petitioner. As another example, the data analysis system 220 can display a listing of cases in which the selected judge is one of the three judges that has canceled at least one claim of a patent challenged by a petitioner. As yet another example, the data analysis system 220 can display a listing of cases in which the selected judge is one of the three judges that has affirmed or canceled all claims challenged by a petitioner.

As yet another example, the data analysis system 220 can display the case outcomes in the form of percentages. For example, as illustrated in TABLE 3 below, the data analysis system 220 can display that 76.4% of cases in which Judge "Joni Y. Chang" presided involve a Final Decision in which at least one claim was canceled by the Board, and 23.6% of cases involve a Final Decision in which at least one claim was affirmed by the Board. As another example, the data analysis system 220 can display that 87.8% of cases in which Judge "Joni Y. Chang" presided involve a Final Decision in which at all claims were canceled by the Board, and 12.2% of cases involve a Final Decision in which all claims were affirmed by the Board.

TABLE 3

| Name of Judge | Joni Y. Chang |
| --- | --- |
| Cases with at least one claim affirmed | 23.60% |
| Cases with at least one claim canceled | 76.40% |
| Cases with all claims affirmed | 12.20% |
| Cases with all claims canceled | 87.80% |

In some implementations, the data analysis system 220 can further display, for the selected judge, a count identifying a number of proceedings ruled in favor of a petitioner 618 on at least one claim, a count identifying a number of proceedings ruled in favor of a patent owner 620 on at least one claim, and a count identifying a number of proceedings that have been settled between the parties 622.

In some implementations, where the user selected to view all of the existing judges, the judges can be sorted and displayed based on the number of wins by petitioner 618, number of wins by a patent owner 620, and number of cases settled 622. The number of wins by a petitioner 618, in some implementations, can be classified into two sub-categories; namely, at least one claim canceled by the Board, and all claims canceled by the Board. Similarly, the number of wins by a patent owner 620, in some implementations, can be classified into two sub-categories; namely, at least one claim canceled by the Board, and all claims affirmed by the Board.

For example, as illustrated in TABLE 4 below, the data analysis team 220 can display that Judge Kevin F. Turner has a count of "82" proceedings in which a petitioner has succeeded in having at least one claim canceled by the Board, a count of "23" proceedings in which a patent owner has succeeded in having at least one claim affirmed by the Board, a count of "5" proceedings in which a patent owner has succeeded in having all claims affirmed by the Board, a count of "13" proceedings in which a petitioner has succeeded in having all claims canceled by the Board, and a count of "3" proceedings in which parties have settled before final decision was reached; Judge Joni Y. Chang has a count of "45" proceedings in which a petitioner has succeeded in having at least one claim canceled by the Board, a count of "48" proceedings in which a patent owner has succeeded in having at least one claim affirmed by the Board, a count of "4" proceedings in which a patent owner has succeeded in having all claims affirmed by the Board, a count of "11" proceedings in which a petitioner has succeeded in having all claims canceled by the Board, and a count of "5" proceedings in which parties have settled before final decision was reached; and Michael R. Zecher has a count of "12" proceedings in which a petitioner has succeeded in having at least one claim canceled by the Board, a count of "91" proceedings in which a patent owner has succeeded in having at least one claim affirmed by the Board, a count of "16" proceedings in which a patent owner has succeeded in having all claims affirmed by the Board, a count of "2" proceedings in which a petitioner has succeeded in having all claims canceled by the Board, and a count of "9" proceedings in which parties have settled before final decision was reached.

TABLE 4

| Name of Judge | Kevin F. Turner | Joni Y. Chang | Michael R. Zecher |
|---|---|---|---|
| Cases with at least one claim affirmed | 23 | 48 | 91 |
| Cases with at least one claim canceled | 82 | 45 | 12 |
| Cases with all claims affirmed | 5 | 4 | 16 |
| Cases with all claims canceled | 13 | 11 | 2 |
| Cases settled | 3 | 5 | 9 |

The "By Parties" option 610, when selected, can request the data analysis system 220 to display a listing of parties involved in a proceeding presided by the selected judge (e.g., "Google, Inc.", "Apple, Inc.", "Microsoft, Inc."). If desired, the "By Parties" option 610 can also display the parties based on their role as either a petitioner 624 or a patent owner 626. For example, as illustrated in TABLE 5 below, Judge "Joni Y. Chang" has presided in "2" proceedings where the party "Google, Inc." was a petitioner and "1" proceeding where the party "Google, Inc." was a patent owner. Similarly, Judge "Joni Y. Chang" has presided in "3" proceedings where the party "Apple, Inc." was a petitioner and "2" proceeding where the party "Google, Inc." was a patent owner; has presided in "4" proceedings where the party "Microsoft, Inc." was a petitioner and "3" proceeding where the party "Microsoft, Inc." was a patent owner; and has presided in "2" proceedings where the party "Marvel Semiconductor, Inc." was a petitioner and "2" proceeding where the party "Marvel Semiconductor, Inc." was a patent owner.

TABLE 5

| Judge Joni Y. Chang | | |
|---|---|---|
| Status | Petitioner | Patent Owner |
| Google, Inc. | 2 | 1 |
| Apple, Inc. | 3 | 2 |
| Microsoft, Inc. | 4 | 3 |
| Marvel Semiconductor, Inc. | 2 | 2 |

The "Case Listing" option 612, when selected, can display a listing of cases handled by the selected judge. For example, the "Case Listing" option 612, when selected, can request the data analysis system 220 to display a listing of proceedings handled by the selected judge (e.g., IPR2013-XXXXXX, IPR2012-XXXXXX, IPR 2014-XXXXXX). The selection can also include a selection to display the listing of cases handled by the selected judge by year (e.g., all cases handled in 2013 and all cases handled in 2014), or by month (e.g., all cases handled in January of 2013, and all cases handled in December of 2014).

The listing can also include information such as, but is not limited to, patent number 628, IPR number 630 (e.g., case number assigned by the Board), names of associated presiding judges 632 (e.g., Judge Kevin F. Turner, Judge Joni Y. Chang, and Judge Michael R. Zecher), and the current status 634 of the proceeding (e.g., "Pending" 656, "Settled/Terminated" 658, "Instituted/Not Instituted" 660, and "Final Decision" 662).

The "Petition/Patent Owner Count" option 614 allows the user to identify a listing of proceedings in which either the selected judge was a presiding or authoring judge (e.g., the judge who authored either the Decision (Not) to Institute Trial or Final Decision). For example, the "Petition/Patent Owner Count" option 614, when selected, can request the data analysis system 220 to display all proceedings involving the selected judge. For example, the data analysis 220 can display that the selected judge has managed or involved in "75" review proceedings.

In some implementations, the count number can also be hyperlinked such that when the count number is selected, the data analysis system 220 can further display a first count indicating the number of times the selected judge ruled for or against a petitioner 636, and the number of times the selected judge ruled for or against a patent owner 638.

For example, as illustrated in TABLE 6 below, the data analysis system 220 can display that the selected judge "Judge Joni Y. Chang" has a count of "25" proceedings in which the selected judge has ruled for a petitioner and a count of "12" against the petitioner, and a count of "13" proceedings in which the selected judge has ruled for a patent owner and a count of "16" against the patent owner.

TABLE 6

| Judge Joni Y. Chang | | | |
|---|---|---|---|
| For Petitioner | Against Petitioner | For Patent Owner | Against Patent Owner |
| 25 | 12 | 13 | 16 |

In some implementations, the count for "For Petitioner" can be defined as a number of proceedings in which the selected judge has granted review on some or all claims challenged by the petitioner, and "Against Petitioner" can be defined as a number of proceedings in which the selected judge denied review on some or all claims challenged by the petitioner (i.e., did not institute trial on any petitioned claim).

In some implementations, the count for "For Petitioner" can be defined as a number of proceedings in which the selected judge has granted review on at least one claim challenged by the petitioner, and "Against Petitioner" can be defined as a number of proceedings in which the selected judge denied review on at least one claim challenged by the petitioner (i.e., did not institute trial on any petitioned claim).

In some implementations, the count for "For Patent Owner" can be defined as a number of proceedings in which the selected judge did not grant review on any of the claims challenged by the petitioner, and "Against Patent Owner" can be defined as a number of proceedings in which the selected judge has granted review on all claims challenged by the petitioner (i.e., did not institute trial on any petitioned claim).

In some implementations, the count for "For Patent Owner" can be defined as a number of proceedings in which the selected judge denied review on at least one claim challenged by the petitioner, and "Against Patent Owner" can be defined as a number of proceedings in which the selected judge granted review on at least one claim challenged by the petitioner (i.e., did not institute trial on any petitioned claim).

The "List of Patents Presided" option 616, when selected, allows the user to view a list of patents that have been the subject of a proceeding involving the selected judge as one of the presiding judges. For example, assuming Patents "X" and "Y" were involved in a proceeding where the selected judge was one of the three presiding judges, the "List of Associated Patents" option 616 can display both Patent "X" and Patent "Y" to the user as being presided by the selected judge.

In some implementations, each patent can be hyperlinked so that information about a particular patent can be shown to the user. The information can include, but is not limited to, patent number 640, IPR number 642 (e.g., case number assigned by the Board), names of associated presiding judges 644 (e.g., Judge Kevin F. Turner, Judge Joni Y. Chang, and Judge Michael R. Zecher), and the current status 646 of the proceeding (e.g., "Pending" 648, "Settled/Terminated" 650, "Instituted/Not Instituted" 652, and "Final Decision" 654).

Figure 7:
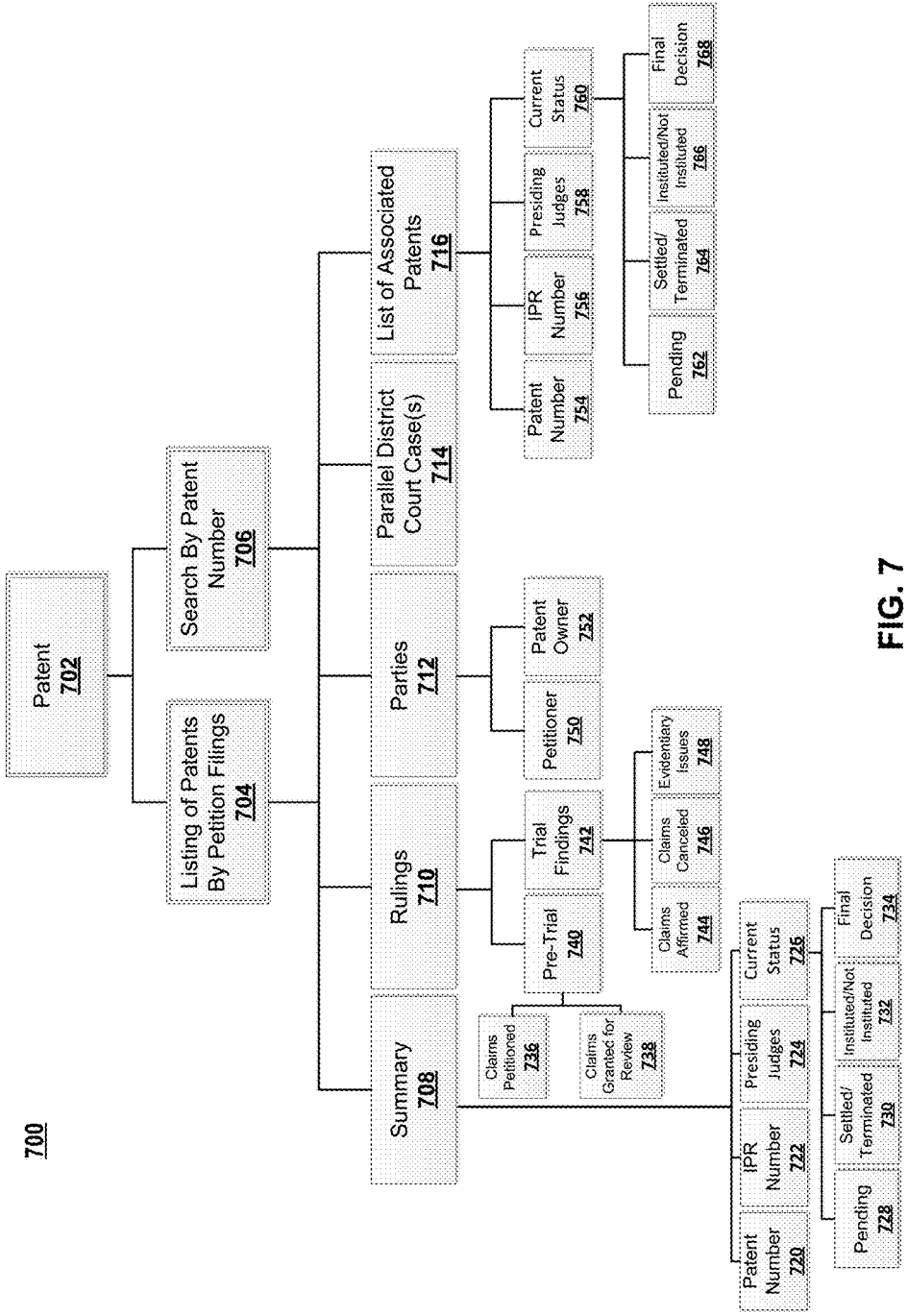
FIG. 7 show an example site map for displaying the assessment of the validity or invalidity of a patent to one or more users via a "Patent" category.

FIG. 7 show an example site map 700 for displaying the assessment of the validity or invalidity of the patent to one or more users via a "Patent" category. Referring to FIG. 7, the data analysis system 220 can display a "Patent" category 702 on a dashboard (e.g., dashboard 1000). When the "Patent" category 702 is selected, the user can be presented with one or more options such as a listing of patents by petition filings 704 (e.g., IPR2013-00206 corresponding to U.S. Pat. No. 8,251,997; IPR2013-00173 corresponding to U.S. Pat. No. 8,152,788), or searching by the patent number 706 (e.g., U.S. Pat. No. 8,251,997).

The listing of patents by petition filings option 704 can include a listing of the most active patents (e.g., based on the most recent filings associated with such patents). The searching by patent number option 706 can allow the user to search for and locate a particular patent (e.g., those involved in a review proceeding). When either option 704/706 is selected, indicating that the user has chosen to view further information regarding a particular patent, the user can be presented with multiple additional options for further selection such as, without limitation, "Summary" 708, "rulings" 710, "Parties" 712, "Parallel District Court Case(s)" 714, and "List of Related Patents" 716.

The "Summary" option 708, when selected, can request the data analysis system 220 to display a summary for the selected patent. The summary can include, but is not limited to, patent number 720, IPR number 722 (e.g., case number assigned by the Board), names of associated presiding judges 724 (e.g., Judge Kevin F. Turner, Judge Joni Y. Chang, and Judge Michael R. Zecher), and the current status 726 of the proceeding (e.g., "Pending" 728, "Settled/Terminated" 730, "Instituted/Not Instituted" 732, and "Final Decision" 734).

The "Rulings" option 710, when selected, can request the data analysis system 220 to display a listing of rulings associated with the selected patent. In some implementations, the rulings can be categorized into pre-trial rulings (e.g., via the pre-trail option 740) or trial findings (e.g., via the trial findings 742).

Under the pre-trial option 740, the data analysis system 220 can further display additional information, such as, without limitation, claims petitioned 736 (e.g., claims petitioned by the petitioner) and claims granted for review 738. Similarly, under the trial-finding option 742, the data analysis system 220 can further display additional information, such as, without limitation, number of claims affirmed 744, number of claims canceled 746, and evidentiary issues 748 including relevant legal arguments and corresponding rulings.

For example, as illustrated in TABLE 7 below, the data analysis system 220 can display the Board rulings for U.S. Pat. No. 6,669,981. As shown, the data analysis system 220 can display that there are a total of 19 claims petitioned by the Petitioner, and a total of 19 claims granted for review by the Board. In some implementations, the information under the pre-trial rulings section can also include the listing of claims petitioned (e.g., claims 1-8, 10-20) and the listing of claims granted for review (e.g., claims 1-8, 10-20), and legal arguments raised in either the Petitioner's petition, Patent Owner's preliminary response, or any evidence submitted prior to the Board issuing the Decision (Not) to Institute Trial or Decision Not to Institute Trial. As an example, such legal arguments can include "relevancy of statements made in unrelated patents or applications owned by the patent owner," "teaching away", and "no reasonable expectation of success by one skilled in the art to produce the claimed invention."

As discussed previously, the legal arguments under the pre-trial rulings can contain legal doctrines or arguments extracted by the data mining engine 208 and the argument module 224. In some implementations, these legal doctrines or arguments can include those advanced by the petitioner, by the patent owner, or both the petitioner and the patent owner.

TABLE 7

| Rulings for U.S. Pat. No. 6,669,981 | | |
|---|---|---|
| Pre-Trial Rulings | | |
| Number of Claims Petitioned | Number of Claims Granted for Review | Legal Argument Cited |
| 19 | 19 | "relevancy of statements made in unrelated patents or applications owned by the patent owner" "teaching away" |

TABLE 7-continued

Rulings for U.S. Pat. No. 6,669,981

"no reasonable expectation of
success by one skilled in the art
to produce the claimed invention"

Trial Findings

| Number of Claims Affirmed | Number of Claims Canceled | Legal Argument Addressed by Board | Ruling by Board |
| --- | --- | --- | --- |
| 0 | 19 | Teaching Away | PO Lost/P Won |
| | | Commercial Success | PO Lost/P Won |
| | | Praise | Patent Owner Lost |
| | | Long-felt Need | PO Lost/P Won |
| | | Copying by Competitor | Patent Owner Lost |

Further, as shown in TABLE 7 above, under the trial findings section, the data analysis system 220 can display that there are a total of "0" claim affirmed and "19" claims canceled by the Board. In some implementations, the information under the trial findings section can also include the listing of claims affirmed (e.g., none) and the listing of claims canceled (e.g., claims 1-19), and legal arguments addressed by the Board, for example, in the Board's Final Decision and the Board's corresponding rulings regarding those arguments.

As an example, such legal arguments can include "teaching away," "Commercial Success", "Praise", "Long-felt need", and "Copying by Competitor." In some implementations, these arguments can be extracted from the Board's Final Decision. In some implementations, these arguments also can be extracted from any Order or Decision (e.g., those associated with "Order Conduct of the Proceeding" or a party's rehearing request) issued by the Board prior to the Final Decision. In the example above, the data analysis system 220 can use its proprietary analytics (e.g., in conjunction with the argument module 232) to determine the Board's ruling for each of the legal issues raised in the legal arguments, and display the results of the rulings under the "Ruling" column.

For example, with respect to the legal argument "Teaching Away" raised by the Patent Owner but disputed by the Petitioner, the Board ruled for the Petitioner. In other words, the Board's ruling is that the patent owner has lost and petitioner has won (i.e., "PO Lost/P Won") with respect to this legal issue.

In some implementations, the data mining engine 208 and the argument module 224 can extract these rulings from the "Summary" or "Order" section of the Final Decision. In some implementations, the data mining engine 208 and the argument module 224 can extract these rulings within the main body of the Final Decision. Once extracted, these information can then be stored in the repositories 104/106 for subsequent retrieval and display.

In certain cases, an argument might have been raised by one party but not responded or addressed by the other. For example, the data mining engine 208 and the argument module 224 can determine that the issue relating to "Praise" was argued by the Patent Owner in support of the Patent Owner's evidence of secondary consideration of non-obviousness was raised in the Patent Owner's preliminary response, but not in any of the Petitioner's reply subsequent to the Patent Owner's preliminary response (e.g., by checking for the presence of the term "Praise" in all documents submitted or filed by the Petitioner). In these implementations, because the Petitioner has not addressed the issue, the data analysis system 220 can display only that the "Patent Owner Lost" with respect to the "Praise" argument, as opposed to "PO Lost/P Won" which might infer that the Petitioner has made an effort to argue against the relevancy of "Praise" in the context of secondary consideration of non-obviousness.

Other options (e.g., other than "PO Lost/P Won" and "Patent Owner Lost"), where applicable, can include "Patent Owner Won", "Petitioner Won", "Petitioner Lost", "P Lost/PO Won", "DNA" (Did Not Address by Board) and the like.

The "Parties" option 712, when selected, can request the data analysis system 220 to display a listing of the parties involved in a proceeding underlying the selected patent. the display can include a section listing the corresponding petitioner 750 (e.g., "Google, Inc.") and a section listing the corresponding patent owner 752 (e.g., "Intellectual Ventures, Inc.). In some implementations, the data analysis system 220 can also display a full listing of patents and parties involved in each of the listed patent. If desired, the listing can be sorted by any conventional means (e.g., chronologically, alphabetically, numerically, and the like).

The "Parallel District Court Case(s)" option 714, if selected, can request the data analysis system 220 to display all information associated with any existing parallel district court or ITC case in which the selected patent is also in dispute. In some implementations, these information can be extracted from documents submitted by the Petitioner (e.g., Mandatory Notice or Petition) or Patent Owner (e.g., Mandatory Notice or Preliminary Response), or documents issued by the Board (e.g., Decision (Not) to Institute Trial or Final Decision).

The "List of Associated Patents" option 716, when selected, allows the user to view a list of patents that are related to the selected patent and which are also ongoing the review proceeding (e.g., continuation, divisional, and continuation-in-part). For example, assuming Patents "X" and "Y" are/were involved in a current or past review proceeding, the "List of Associated Patents" option 716 can display both Patent "X" and Patent "Y" to the user as being related to the selected patent.

In some implementations, each related patent can be hyperlinked so that information about a particular patent can be shown to the user. The information can include, but is not limited to, patent number 754, IPR number 756 (e.g., case number assigned by the Board), names of associated presiding judges 758 (e.g., Judge Kevin F. Turner, Judge Joni Y. Chang, and Judge Michael R. Zecher), and the current status 760 of the proceeding (e.g., "Pending" 762, "Settled/Terminated" 764, "Instituted/Not Instituted" 766, and "Final Decision" 768).

While the implementations above are described with respect to certain types of data, it should be noted that data provided above with respect to FIGS. 4-7 are random in nature and illustrative only to help further understand the corresponding implementations.

Figures 11, 20:
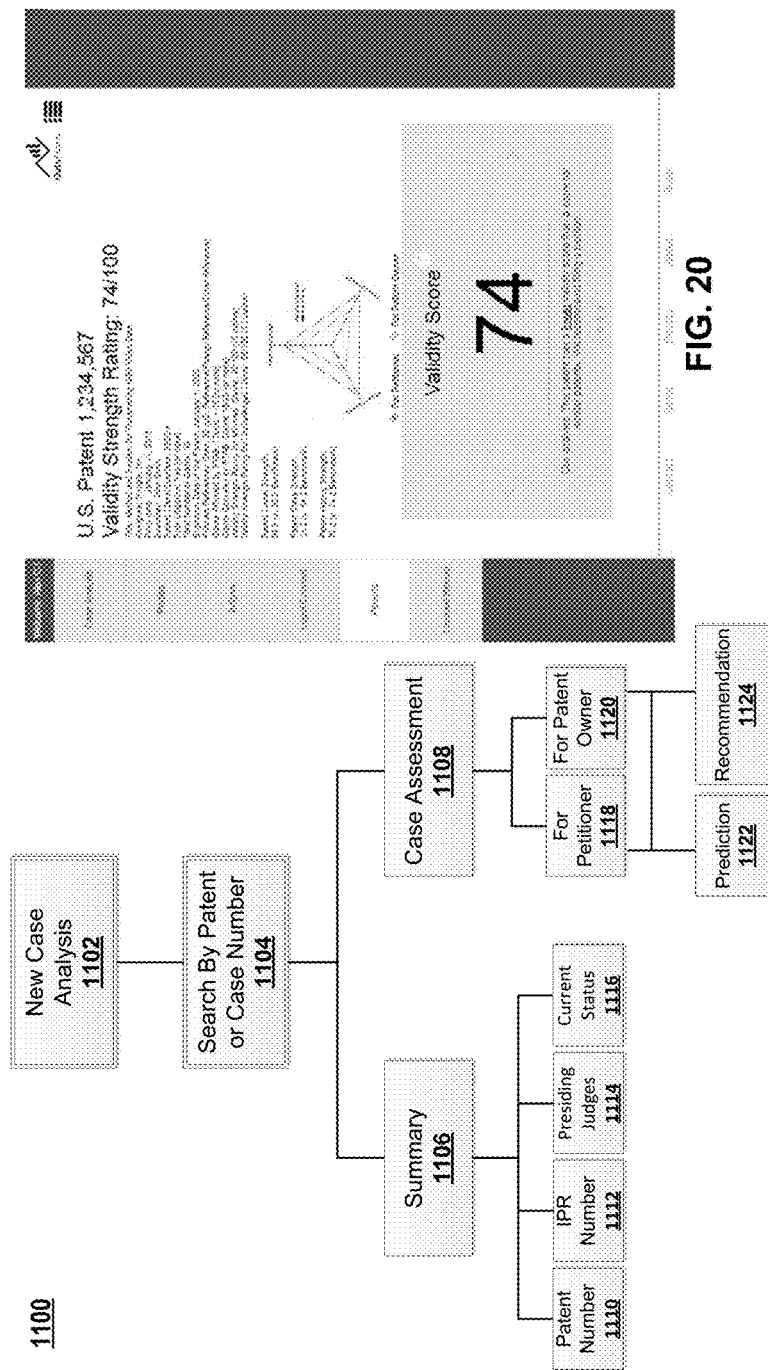
FIG. 11 show an example site map for displaying the assessment of the validity or invalidity of a patent to one or more users via a "New Case Analysis" category.
FIG. 20 is an example screenshot of the "Patent" section.

FIG. 11 show an example site map 1100 for displaying the assessment of the validity or invalidity of a patent to one or more users via a "New Case Analysis" category. Referring to FIG. 11, the data analysis system 220 can display a "New Case Analysis" category 1102 on a dashboard (e.g., dashboard 1000). When the "New Case Analysis" category 1102 is selected, the user can be presented with an option to search by patent or case number 1104 (e.g., IPR2013-00206 or U.S. Pat. No. 8,251,997). The "New Case Analysis" category 1102 allows a user to assess the validity or invalidity of a patent that is the subject of a new case (e.g., a new petition)

or an existing case (e.g., an ongoing case that has not been settled, terminated, or decided in a Final decision).

Upon receiving the patent or case number, the data analysis system 220 can display a summary of any review proceeding associated with the received patent. For example, the summary option 1106 allows the user to view a summary that includes information such as, without limitation, the patent number 1110, the corresponding IPR number 1112, the names of presiding judges 1114, and the current status 1116 of the proceeding.

When the case assessment option 1108 is selected, the user can further assess and retrieve predictions and recommendations for a petitioner 1118, or a patent owner 1120. For example, as discussed in FIG. 10D, the user can toggle the selectable input 1051 to view predictions 1112 and recommendations 1124 specific to either a petitioner or a patent owner.

As discussed above, predictions 1112 can include analytical or statistical information such as a predicted winning probability (e.g., as discussed with respect to FIGS. 10A-10D) that either at least one claim will be granted reviewed, valid, or invalid.

In operation, once the patent or case number is received and identified, the data mining system 202 can retrieve all existing documents submitted by the petitioner and patent owner in a proceeding associated with the identified patent or case (e.g., via a public source or the repositories 104/106 if those documents have previously been retrieved). The extracted data can then be analyzed based on one or more trained models, which can then be used to generate subsequent predictions and recommendations (e.g., via the prediction/recommendation engine 320).

In some implementations, where no review proceeding has taken place (e.g., where no petition has been filed yet), the data mining system 202 can, for example, retrieve and extract all information associated with the identified patent (e.g., class/subclass, assignee, number of claims, law firm prosecuting the patent, cited prior art). The extracted data can then be analyzed based on one or more trained models in the same way discussed above, and used to generate subsequent predictions and recommendations (e.g., via the prediction/recommendation engine 320).

The "New Case Analysis" category 1102 can help users formulate the most rewarding strategy by reviewing some or all past and present proceedings to assess and predict the likelihood that at least one claim of a patent that is the subject of a new proceeding will be granted review, canceled or affirmed by the Board. This predictive analysis can then be used to determine whether a patent infringement suit, ITC's § 337 enforcement, declaratory judgments, or other legal remedies should be pursued.

For example, the predictive analysis generated by the data analysis system 220 (e.g., via prediction/recommendation 322) can inform a patent owner whose patent has at least one claim being challenged by a petitioner that the at least one claim will likely be canceled by the Board. Based on this prediction, the patent owner can tailor a legal strategy with its outside counsel in a cost-cutting measure to settle the proceeding early on, and defer filing any patent infringement suit at the district court level.

As another example, the predictive analysis generated by the data analysis system 220 (e.g., via prediction/recommendation 322) can inform an accused infringer prior to filing a petition that the underlying patent has a 93.3% likelihood to be granted review and 62.2% that at least one claim will be canceled by the Board. Based on these prediction and recommendation, the accused infringer can subsequently make an informed decision to file a petition challenging the validity of one or more claims of the subject patent.

Figure 12:
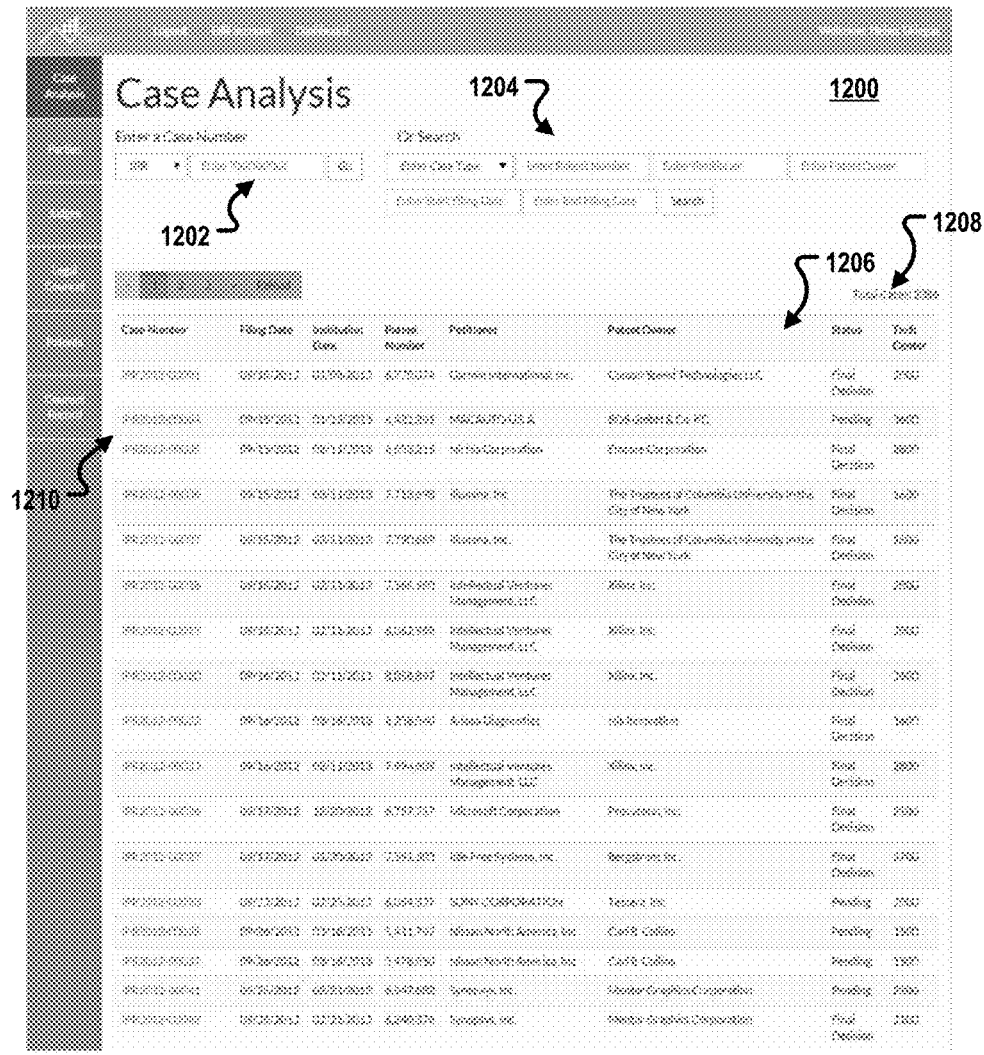
FIG. 12 is an example screenshot of the "New Case Analysis" category.

FIG. 12 is an example screenshot of the "New Case Analysis" category. As shown in FIG. 12, the "Case Analysis" section 1200 can include a user input field for case number 1202 through which a user can locate a specific proceeding involving that case number. The "Case Analysis" section 1200 can also include other user input fields 1204 such as the case type (e.g., to search all IPR or CBM or district court cases), patent number, petitioner, patent owner, or a specific time period that includes a start filing date and an end filing date. The "Case Analysis" section 1200 can further include a list of pending or expired proceedings (e.g., proceedings with statuses such as "Final Decision," "Pending" "Settled," "Instituted", and "Not Instituted") through which the user can select to view additional information. The "Case Analysis" section 1200 can further provide a counter 1208 to indicate the number of inter parte or post grant proceedings that are before the Board (and/or the District Court cases in a particular district or all districts).

Miscellaneous Intelligence

In some implementations, the data mining/analysis system 102 can regularly track and continuously update a variety of statistics and models on an hourly, per day, per week, per month, or annual basis. In some implementations, such statistics can include, without limitations, the total number of cases pending in post-grant or inter partes proceedings, total number of cases with at least one claim canceled, total number of cases with at least one claim affirmed, with at least no claims canceled, total number of cases with no claims affirmed, total number of cases that have gone to the Board at Decision to Institute phase ("DTI phase"), total number of cases that have gone to the Board at Final Decision phase ("FD phase"), total number of cases that did not go to the Board at Final Decision phase, total number of cases with all challenged claims canceled, total number of cases with all patent claims canceled, total number of cases with all challenged claims affirmed, total number of cases with all patent claims affirmed, total number of cases with at least one claim granted, total number of cases with no claim granted, total number of cases with preliminary response filed, and total number of cases without a preliminary response filed. In general, the data mining/analysis system 102 can track and update any statistic associated with any particular type of legal document filed or submitted to the Board (e.g., any motion or brief, request for hearing, oral hearing, etc.).

Validity Rating for Each Patent

Figure 13:
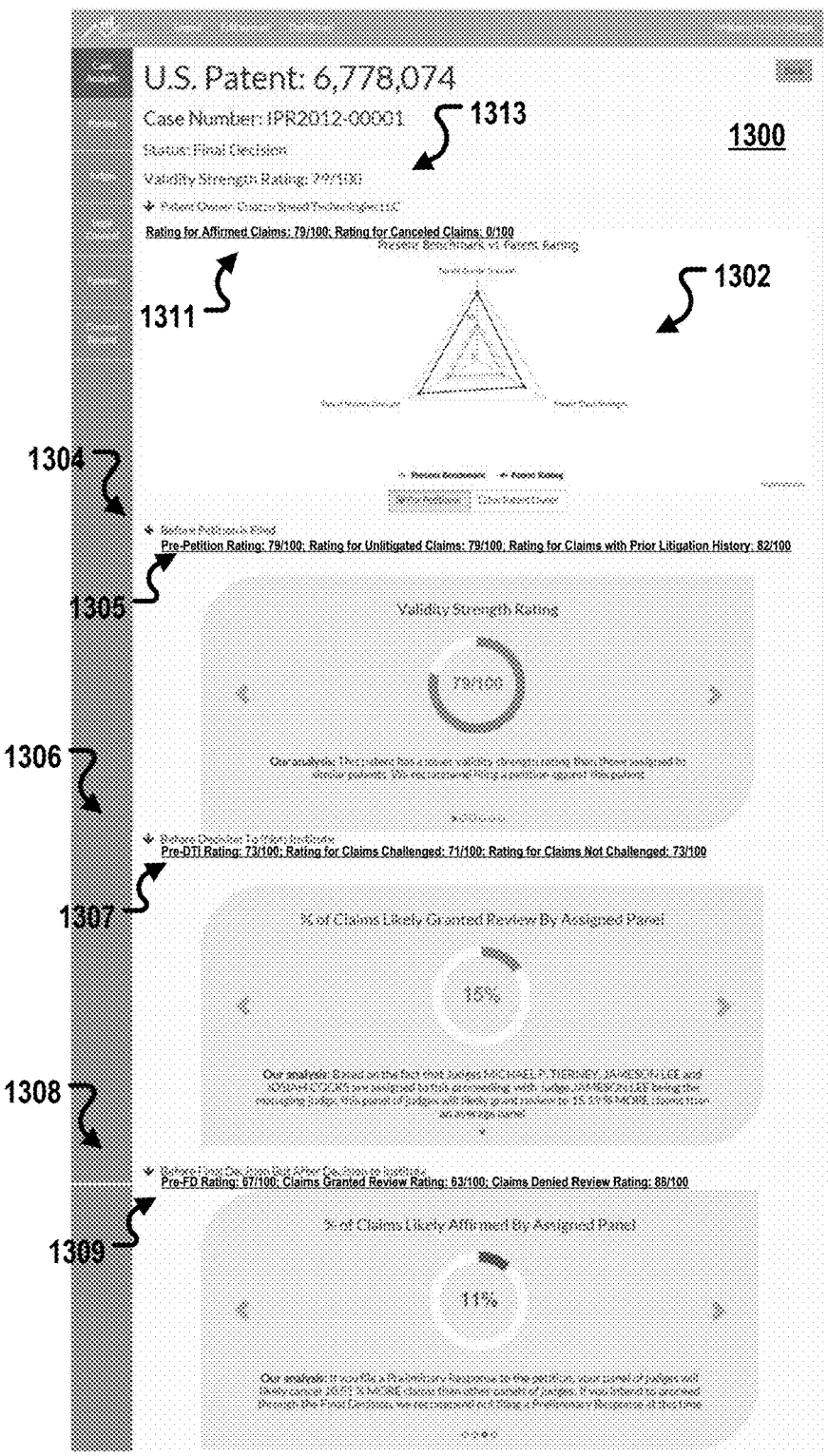
FIG. 13 is an example screenshot of an analysis page.

As discussed previously, the "Case Analysis" page 1200 can display a plurality of inter parte proceedings and/or district court cases to a user. The user can select a particular proceeding to be taken to an analysis page that provides a detailed analysis regarding a particular patent. FIG. 13 is an example screenshot of an analysis page 1300. Referring to FIG. 13, the analysis page 1300 can include four analysis sections each of which provides detailed predictive analysis and intelligence regarding a particular patent. As shown, the analysis page 1300 includes a validity strength rating section 1301, a comparison section 1302, a "Before Petition is Filed" section 1304, a "Before Decision to (Not) Institute" section 1306, and a "Before Final But After Decision to Institute" section 1308.

In some implementations, the data analysis system 220 can determine a validity strength rating 1313 for each individual patent (e.g., via the correlation module 222, the statistics module 226, and/or the model development module 228) for display in the validity strength rating section 1301. In some implementations, the validity strength rating can be expressed as a number between 0 to 100. In these implementations, the higher the rating (e.g., a rating closer to 100) for a patent, the harder it is for a petitioner to challenge and easier it is for a patent owner to defend the patent. Similarly, the lower the rating (e.g., a rating closer to 0), the easier it is for a petitioner to challenge the patent and harder it is for a patent owner to defend the patent.

In some implementations, the validity strength rating can be a single-value metric that gives users an understanding on the difficulty of defeating a patent. Like the slugging percentage in baseball, which combines various hitting results to generate the slugging percentage, the validity strength rating can also combine a host of factors about the patent, such as its litigation history and information about the underlying technology, and reputation of the patent owner, to generate its value.

In some implementations, the validity strength rating can be determined based on one or more of three different variables; namely, the total patent strength rating based on a particular patent ("totalPSByPI"), the total patent strength rating based on a particular patent owner ("totalPSByPO"), and the total patent strength rating based on a particular patent class ("totalPSByPC").

The totalPSByPI can indicate the total patent strength rating determined based on an individual patent strength (e.g., PIStrength). Similarly, the totalPSByPO can indicate the total patent strength rating determined based on patents with the same patent owner (e.g., POStrength), and the totalPSByPC can indicate the total patent strength rating determined based on patents with the same patent class (e.g., PC Strength).

In some implementations, the PIStrength of a patent can be determined by identifying cases involving the same patent. For these cases, the total number of canceled claims can be summed up to arrive at an overall cancel claim rate with respect to the total number of claims in this patent. The totalPSByPI can then be determined by calculating the ratio of the cancel claim rate and the total number of claims to arrive at the total number of claims affirmed by the Board (e.g., by subtracting the ratio from 1, or $1-CN/TC$ where CN is the cancel claim rate and TC is the number of total claims for that patent).

In some implementations, where there's no prior litigation history involving a patent, the patent's PIStrength can be replaced with the total patent strength by all patents (totalPSByAllPIs). In some implementations, the totalPSByAllPIs can be determined by finding an average of the patent strength across all patents.

In some implementations, the POStrength of a patent can be determined by identifying all patents associated with a particular patent owner. For these patents, the total claims for each patent can be summed to arrive at an overall total claim rate involving this patent owner. Similarly, the total number of canceled claims for these patents involving the same patent owner can be summed to arrive at an overall cancel claim rate. The totalPSByPO can then be determined by calculating the ratio of the cancel claim rate and the total claim rate to arrive at the total number of claims affirmed by the Board (e.g., by subtracting the ratio from 1, or $1-CN/TC$ where CN is the cancel claim rate for all patents associated with a particular patent owner and TC is the number of total claims for all patents associated with this particular patent owner).

In some implementations, where there's no prior litigation history involving a patent, the patent's POStrength can be replaced with the total patent strength by all patents associated with a particular owner (totalPSByAllPOs). In some implementations, the totalPSByAllPOs can be determined by finding an average of the patent strength across all patents associated with this patent owner.

In some implementations, the PCStrength of a patent can be determined by identifying all patents associated with a particular class (and subclass). For these patents, the total claims for each patent can be summed to arrive at an overall total claim rate involving this patent class (and subclass). Similarly, the total number of canceled claims for these patents involving the same class (and subclass) can be summed to arrive at an overall cancel claim rate. The totalPSByPC can then be determined by calculating the ratio of the cancel claim rate and the total claim rate to arrive at the total number of claims affirmed by the Board (e.g., by subtracting the ratio from 1, or $1-CN/TC$ where CN is the cancel claim rate for all patents associated with a particular patent class (and subclass) and TC is the number of total claims for all patents associated with this particular patent class (and subclass)).

In some implementations, where there's no prior litigation history involving a patent, the patent's PCStrength can be replaced with the total patent strength by all patents associated with a particular class (and subclass) (totalPSByAllPCs). In some implementations, the totalPSByAllPCs can be determined by finding an average of the patent strength of all patents associated with a particular class (and subclass).

In some implementations, the validity strength rating can be determined by averaging the totalPSByPI, totalPSByPO, and totalPSByPC. In some implementations, the validity strength rating can be determined by applying different weights to the totalPSByPI, totalPSByPO, and totalPSByPC. For example, more weights can be given to totalPSByPI (e.g., where totalPSByPI can be given with twice as much weight) as compared to totalPSByPO and totalPSByPC. As another example, a differential weight can be assigned to each of totalPSByPI (e.g., 0.2×), totalPSByPO (e.g., 1.5×), and totalPSByPC (e.g., 4×) in order to determine the validity strength rating.

In some implementations, each of the differential weights can be determined using a variety of analytical or statistical models. In some implementations, an analytical or statistical model can be created to determine the impact of a particular attribute to the validity of a patent. For example, an analytical or statistical model can be created to determine the impact of a patent owner on the validity of the patent (e.g., a model indicative that patents associated with patent owner "ABC Corp" are more likely to be invalidated by the Board or district Court). As another example, an analytical or statistical model can be created to determine the impact of a patent class on the validity of the patent (e.g., a model indicative that patents associated with "DRAM semiconductor memory" in PC computing" are more likely to be invalidated by the Board or district Court). The analytical or statistical models also can consider litigation data associated with any prior litigation history involving the patent (e.g., any prior district court litigation, ITC investigations, reexamination, post-grant or inter partes proceedings, and the like).

In some implementations, the validity strength rating also can be determined (in addition or in place of the attributes discussed above) based on extrinsic and intrinsic data. In some implementations, the intrinsic data can include data associated with the filing date, assignee or patent owner, number of cited prior art, number of patent claims, the filing date, and the priority date. In some implementations, the external data can include the litigation data discussed above (e.g., litigation data associated with any prior litigation history involving the patent such as prior district court litigation, ITC investigations, reexamination, post-grant or inter partes proceedings, and the like).

In some implementations, the validity strength rating can be determined for patents that are the subject of any challenge or litigation (e.g., past or present litigation). In some implementations, the validity strength rating can also be determined for a particular patent that has not been the subject to any litigation (e.g., no related district court litigation, International Trade Commission proceeding, or inter-parte/post-grant proceeding). In implementations where a patent has no prior litigation history, the validity strength rating can be determined based on totalPSByPO and/or totalPSByPC. In other words, the validity strength rating for the subject patent can depend on the value determined based on totalPSByPO and/or totalPSByPC. In these implementations, neither totalPSByPO nor totalPSByPC consider the subject patent at issue (e.g., the cancel claim rate and the total claim rate for the subject patent need not be included in determining totalPSByPO and/or totalPSByPC). In these implementations, the same validity strength rating can be assigned to patents with the same patent owner, patents with the same patent class, or a different validity strength rating can be assigned to patents with the same patent owner or patents with the same patent class by applying different weights to totalPSByPO and/or totalPSByPC (e.g., using intrinsic data unique to each patent).

In some implementations, the validity strength rating of a patent with no prior litigation history can also utilize a global factor to replace totalPSByPI. This global factor can be used in conjunction with totalPSByPO and/or totalPSByPC in determining the validity strength rating. This global factor can be a global average of totalPSByPI determined by averaging all patent strength across all or a specific set of patents, as will be discussed below with respect to the "Spider Graph" section.

In some implementations, the validity strength rating can also be generated at different phases of the inter partes/post-grant proceeding, or district court proceeding. The validity strength rating for each phase can be displayed to a user in each of the corresponding sections 1304, 1306, and 1308. Providing different validity strength ratings at different phases allows both the patent owner and the petitioner (or plaintiff and defendant in a district court case) as the parties can determine the phases where the patent is strongest and weakest. This allows either party to decide whether to bulk up or save expenses during each phase.

More specifically, determining a validity strength rating for each phase of litigation allows both parties involved in a patent dispute to settle or to continue battling in the litigation. From a business perspective, if a particular patent is strong, the validity strength rating can be used to provide additional leverage in negotiating a reasonable settlement and settlement amount. Similarly, for an accused infringer, the validity strength rating can be used to help stop or reduce unnecessary expenses such that the accused infringer need not spend an exorbitant amount of legal fees getting the proceeding to trial only to lose again resulting in huge pay-outs, lost opportunity costs, and steep legal bills.

In some implementations, the validity strength rating for a patent can be determined for four separate phases in an inter partes/post-grant proceeding; namely, before any petition is filed against the patent ("Pre-Petition Stage"), after the petition is filed but before the Board has issued its Decision to (Not) Institute ("Decision Stage"), after the Decision Stage but before the Board has issued its Final Decision ("Final Stage"), and after Final Decision has rendered ("Post-Final Stage). As will be discussed above, the validity strength rating 1313 shown in the validity strength rating section 1301 can be associated with a Post-Final Decision Stage that indicates the validity strength rating of the affirmed and/or canceled claims as decided by the Board.

In some implementations, the validity strength rating for the Pre-Petition Stage can be displayed as rating 1305 under the "Before Petition is Filed" section 1304; the validity strength rating for the Decision Stage can be displayed as rating 1307 under the "Before Decision to (Not) Institute" section 1306; and the validity strength rating for the Final Stage can be displayed as rating 1309 under the "Before Final Decision But After Decision to Institute" section 1308.

In some implementations, the validity strength rating for the Pre-Petition Stage can be represented by PPPatentStrength; the validity strength rating for the Decision Stage can be represented by DTIPatentStrength; the validity strength rating for the Final Stage can be represented by FDPatentStrength; and the validity strength rating for the Post-Final Stage can be represented by OverallPatentStrength.

As discussed above, the PPPatentStrength indicates how strong a particular patent is or how likely this particular patent is valid at the Pre-Petition stage (e.g., before any petition against this patent is filed). In some implementations, the PPPatentStrength can be determined based on a related technology area (e.g., via class(es) and subclass(es) under which the subject patent is classified), the name of the patent owner, the name of the inventor(s), the number of prior art cited in a patent, the number of claims (independent and/or dependent claims) in the patent, the priority date, the effective filing date, the examiner handling the examination of the patent, and the law firm and/or legal counsel handling the prosecution of the patent.

In some implementations, a global validity strength rating can also be determined based on all cases before the Board or all existing patents. For example, the global validity strength rating ("acPPPatentStrength") for the Pre-Petition Stage can be determined by summing and averaging all PPPatentStrengths across all cases or all existing patents. For example, where there are two patents each with an individual PPPatentStrength (e.g., PPPatentStrength1 and PPPatentStrength2), the acPPPatentStrength can be determined by calculating the average of PPPatentStrength1 and PPPatentStrength2.

Similarly, the DTIPatentStrength indicates how strong a particular patent is or how likely this particular is valid at the Decision Stage (e.g., before any Decision to Institute is rendered). In some implementations, the DTIPatentStrength can be determined based on a variety of factors such as those shown in TABLE A above including, for example, the total number of claims in a patent and the total number of claims of the patent that are being challenged, or any factors that are available prior or up to the Decision Stage.

For example, other factors used to determine the DTIPatentStrength may include those shown in TABLE A and/or TABLE B above, such as whether a preliminary response has been filed, the name of the petitioner and/or patent owner, the name of counsel and/or law firm representing the petitioner and/or patent owner, the name of any expert witness whose declaration is being relied upon in the preliminary response and/or petition, the identification and/or number of prior art cited in the petition, identification of terms being disputed by the patent owner and/or petitioner, any related matter (e.g., parallel district court, ITC, IPR (inter partes) or CBM (covered business method) case(s)), any legal authority or case law cited by the patent owner in the preliminary response or the petitioner in the petitioner, and any legal arguments advanced by the patent owner in the preliminary response or the petitioner in the petitioner.

In some implementations, a global validity strength rating can also be determined for the Decision Stage. For example, the global validity strength rating ("acDTIPatentStrength") for the Decision Stage can be determined by summing and averaging all DTIPatentStrengths across all cases before the Board at the Decision Stage or all existing patents. For example, where there are two patents each with an individual DTIPatentStrength (e.g., DTIPatentStrength1 and DTIPatentStrength2), the acDTIPatentStrength can be determined by calculating the average of DTIPatentStrength1 and DTIPatentStrength2.

Similarly, the FDPatentStrength indicates how strong a particular patent is or how likely this particular is valid at the Final Stage (e.g., before any Final Decision is rendered). In some implementations, the FDPatentStrength can be determined based on a variety of factors such as, without limitation, the total number of claims of the patent that are being challenged and the total number of claims that have been granted review by the Board, or any factors that are available prior or up to the Final Stage.

For example, other factors used to determine the FDPatentStrength may include data extracted from the Decision stage such as those shown in TABLE A, TABLE B, TABLE C and/or TABLE E above including, for example, the names of the presiding judges, the name of the authoring judge, the date of the Decision to Institute Trial, the total number of claims denied review by the Board and listing of such claims, the total number of 102/103 grounds granted by the Board in instituting trials, the identification of claims granted and denied under 102 and/or 103 grounds, the number of prior art references used in 103 grounds granted by the Board, the date of the initial conference call between the presiding judges and the parties, claim terms and their respective claim constructions rendered by the Board, identification of claim term(s) constructed by the petitioner and adopted by the Board, identification of claim term(s) constructed by the patent owner and adopted by the Board, identification of claim terms construed by the Board on its own, identification of claim terms given plain meaning by the Board, identification of claim terms involving 35 U.S.C. § 112, $6^{th}$ paragraph, any related matter (e.g., parallel district court, ITC, IPR (inter partes) or CBM (covered business method) proceeding(s)), any legal arguments addressed by the Board in granting (or denying part of) the petition, any legal authority or case law cited by the Board in granting (or denying part of) the petition, as well as correlations between various analytical or statistical models associated with granting or denying review.

In some implementations, a global validity strength rating can also be determined for the Final Stage. For example, the global validity strength rating ("acFDPatentStrength") for the Final Stage can be determined by summing and averaging all FDPatentStrengths across all cases before the Board at the Final Stage or all existing patents. For example, where there are two patents each with an individual FDPatentStrength (e.g., FDPatentStrength1 and FDPatentStrength2), the acFDPatentStrength can be determined by calculating the average of FDPatentStrength1 and FDPatentStrength2.

In some implementations, each of the PPPatentStrength, DTIPatentStrength, and FDPatentStrength can be updated after their respective stage. For example, the data analysis system 220 can update the PPPatentStrength once a petition has been filed (e.g., by updating the analytical or statistical models to reflect data and attributes associated with the petition). As another example, the data analysis system 220 can update the DTIPatentStrength once the Decision to (Not) Institute has been issued by the Board (e.g., by updating the analytical or statistical models to reflect data and attributes associated with the Decision to (Not) Institute). As yet another example, the data analysis system 220 can update the FDPatentStrength once the Final Decision has been rendered by the Board (e.g., by updating the analytical or statistical models to reflect data and attributes associated with the Final Decision). In this example, when the FDPatentStrength is updated, it can effectively become the overall validity strength rating OverallPatentStrength.

In some implementations, the data analysis system 220 can generate an overall validity strength rating ("OverallPatentStrength) based on all final legal outcomes associated with the litigation at the Post-Final Decision Stage. In some implementations, the OverallPatentStrength can be determined using factors as discussed in TABLE A, TABLE B, TABLE C, TABLE D, TABLE F, and/or TABLE G above, and can be shown as the validity strength rating 1313 in the validity strength rating section 1301 in FIG. 13.

Where factors associated with a related matter are considered, the OverallPatentStrength can be determined by including factors such as the names of the presiding judges for the DTI or FD, the name of the judge authoring the DTI or FD, the date of the written Final Decision, identification of prior art relied upon by the petitioner and the Board, claim terms and their respective claim constructions by the Board and/or either party, identification of claim term(s) constructed by the petitioner and adopted by the Board, identification of claim term(s) constructed by the patent owner and adopted by the Board, identification of claim terms construed by the Board on its own, identification of claim terms given plain meaning by the Board, identification of claim terms involving 35 U.S.C. § 112, $6^{th}$ paragraph, any legal arguments addressed by the Board in affirming or canceling one or more claims, any legal authority or case law cited by the Board in affirming or canceling one or more claims as well as correlations between various analytical or statistical models associated with affirming or canceling claims.

In some implementations, where the Board has issued a Final Decision to cancel all claims, the data analysis system 220 can issue an automatic validity strength rating of zero to the patent in dispute, because all of the claims are no longer valid after they are canceled by the Board.

In some implementations, a global validity strength rating can also be determined for the Post-Final Decision Stage. For example, the global validity strength rating ("acOPatentStrength") for the Final Stage can be determined by summing and averaging all OverallPatentStrength across all cases before the Board at the Post-Final Decision Stage or all existing patents. For example, where there are two patents each with an individual OverallPatentStrength (e.g., OverallPatentStrength1 and OverallPatentStrength2), the acOPatentStrength can be determined by calculating the average of OverallPatentStrength1 and OverallPatentStrength2.

FIG. 15 shows an example screenshot of a rating chart 1500. The rating chart 1500 can be displayed together with a spider graph (to be discussed below) under the comparison section 1302. Alternatively, each rating in the rating chart 1500 can be shown in its respective section 1304-1306, and 1308.

As shown in FIG. 15, the rating chart 1500 can include ratings for each of the phases; namely, the Pre-Petition Stage 1502, the Decision Stage 1504, the Final Stage 1506, and the Post-Final Decision Stage 1508. The rating 1514 associated with the Pre-Petition Stage 1502 can be the validity strength rating determined by the data analysis system 220 for a particular patent at the Pre-Petition Stage 1502 (e.g., PPPatentStrength). The rating 1518 associated with the Decision Stage 1504 can be the validity strength rating determined by the data analysis system 220 for the particular patent at the Decision Stage 1504 (e.g., DTIPatentStrength). The rating 1522 associated with the Final Stage 1506 can be the validity strength rating determined by the data analysis system 220 for the particular patent at the Final Stage 1506 (e.g., FDPatentStrength). The rating 1526 associated with the Post-Final Stage 1508 can be the validity strength rating determined by the data analysis system 220 for the particular patent at the Post-Final Stage 1508 (e.g., OverallPatentStrength).

Similarly, the rating chart 1500 can include global ratings for each phase. As shown, the rating 1512 of the Pre-Petition Stage 1502 can be the global validity strength rating determined by the data analysis system 220 for all cases before the Board or all existing patents at the Pre-Petition Stage 1502 (e.g., acPPPatentStrength). The rating 1516 associated with the Decision Stage 1504 can be the global validity strength rating determined by the data analysis system 220 for all cases before the Board at the Decision Stage (e.g., acDTIPatentStrength). The rating 1522 associated with the Final Stage 1506 can be the global validity strength rating determined by the data analysis system 220 for all cases before the Board at the Final Stage 1506 (e.g., acFDPatentStrength). The rating 1526 associated with the Post-Final Stage 1508 can be the global validity strength rating determined by the data analysis system 220 for all cases before the Board at the Post-Final Stage 1508 (e.g., acOPatentStrength).

While the foregoing implementations are described with respect to inter partes/post-grant reviewing proceedings, these implementations are equally applicable to district court litigation. For example, a validity strength rating can be generated for different phases of the district court litigation such as, without limitation, prior to any infringement complaint is filed ("Pre-Complaint Stage"), after the infringement complaint is filed but before any infringement contentions and/or invalidity contentions is due ("Pre-Contentions Stage"), after any such contentions are due but before any claim construction/Markman hearing ("Pre-Markman Stage"), after claim construction/Markman hearing but before summary motions are due ("Pre-Summary Stage"), after summary motions are due but before trial ("Pre-Trial Stage"), and after a jury verdict (in a jury trial) or bench verdict (bench trial) has been rendered ("Post-Trial Stage").

As an example, a validity strength rating for the Pre-Complaint Stage can be determined using a process similar to that discussed above with respect to the Pre-Petition Stage.

As another example, a validity strength rating for the Pre-Contentions Stage can be determined using attributes associated with the complaint including, without limitation, the name of the plaintiff and/or defendant, the jurisdiction and venue in which the suit is brought, the number of counts, the basis of such counts (e.g., direct infringement, infringement by inducement, or contributory infringement), the types of relief sought (e.g., injunction or monetary damages), type of trial requested (e.g., bench or jury trial), and if answer has been filed, the types of affirmative defenses asserted in the answer (e.g., laches, inequitable conduct, lack of standing, failure to state a claim, and the like), the counsel and/or law firm representing the plaintiff and/or defendant, and the number of patents asserted by the plaintiff.

As another example, a validity strength rating for the Pre-Markman Stage can be determined using attributes associated with, for example, infringement contentions including information relating to the relevant accused products and invalidity contentions including the number of prior art cited, the types of prior art (e.g., patents, non-patent literature, foreign publications, etc.), reputable strength of the prior art (e.g., based on the number of forward or backward references) the grounds upon which the claims are alleged to be invalid (e.g., anticipatory, obviousness, lack of written description, indefiniteness, patent-ineligible), and other types of affirmative defenses (e.g., laches, inequitable conduct, equitable estoppel).

As another example, a validity strength rating for the Pre-Summary Stage can be determined using attributes associated with, for example, the number of motions filed (e.g., motion to compel, motion to strike), the number of experts and/or consultants involved, the identity of such experts and/or consultants, the number of claim terms construed by a court in the Markman hearing, and data associated with the presiding judge ruling on similar types of motions and treatment of similar experts' opinion.

As another example, a validity strength rating for the Pre-Trial Stage can be determined using attributes associated with, for example, the number of motions in limine to be filed, the number of trial exhibits, the jurisdiction and venue for which jury instruction is to be prepared, the number of triable issues, and any data cited in trial briefs.

As yet another example, a validity strength rating for the Post-Trial Stage can be determined using attributes associated with, for example, the type and number of claims infringed, not-infringed, determined to be valid, determined to be invalid, determined to be enforceable, or determined to be unenforceable as determined by either the jury or the judge as well as any underlying reasons behind such a ruling.

Like data and attributes associated with inter partes proceedings, data and attributes associated with district court litigation can be collected in the same manner by the Data Mining/Analysis System 102. For example, the Data Mining/Analysis System 102 can extract these data and attributes from various court documents available via private and/or public sources. Then, relevant data can be extracted based on hundreds of attributes from such documents. Data analysis of the extracted data can be performed to create building-block functions that can use the extracted data as inputs. These functions can then be assembled in the manner discussed above to create one or more predictive models that generate predictive outputs. These functions, the extracted data and data attributes, and predictive models can be stored along with data 204 and/or data 206 in their respective database(s).

Further, like data and attributes associated with the inter-parte/post-grant review proceedings, the data analysis system 300 can train and develop one or more analytical or statistical models using the model engine 302 that can be used to perform recommendation/prediction, clustering, association rule generation, and the like. The inputs to the model engine 302 can include training parameters 304, training data 306, and untrained models 308, all of which can be gathered using the information and data extracted by the data mining system 202 to provide predictive analysis associated with district court litigation. In sum, the Data Mining/Analysis System 102 can process litigation data associated with different venues (e.g., inter partes proceeding, post-grant review proceeding, declaratory action, district court litigation, or litigation before the International Trade Commission) in the same manner.

As discussed above, the data analysis system 220 can determine a validity strength rating for a patent involving different phases of litigation. In some implementations, the data analysis system 220 can determine a validity strength rating for claims at different phases or with different statuses. For example, where Patent "X" has 20 claims of which claims 13-20 have no prior litigation history and claims 1-12 have prior litigation history (e.g., litigated in another inter parte proceeding but no Final Decision was rendered due to settlement before such Decision), the petitioner challenges 12 claims (e.g., claims 1-12) of which 8 (e.g., claims 1-8) are granted review but only 4 (e.g., claims 1-4) are canceled by the Board, Patent "X" would have 16 claims remaining of which four have been affirmed (e.g., claims 5-8).

In these implementations, the data analysis system 220 can determine a first validity strength rating for claims that have not been litigated or challenged previously (e.g., claims 13-20), a second validity strength rating for claims that have been challenged in other litigation or claims with prior litigation history (e.g., claims 1-12), a third validity strength rating for claims that have been challenged (e.g., claims 1-12), a fourth validity strength rating for claims that have not been challenged (e.g., claims 13-20), a fifth validity strength rating for claims that have been challenged but denied review (e.g., claims 9-12), a sixth validity strength rating for claims that have been challenged and granted review (e.g., claims 1-8), a seventh validity strength rating for claims that have been granted review but affirmed (e.g., claims 5-8), and an eight validity strength rating for claims that have been granted review and canceled by the Board (claims 1-4).

For example, the data analysis system 220 can first check the status of a proceeding and determine the current stage of a proceeding (e.g., by looking at the most recent document filed by the litigant based on date such as a preliminary response or the Board such as the Decision to Institute Trial). Based on the status of the proceeding, the data analysis system 220 can determine which set(s) of claims have different statuses, and what validity strength rating to determine for each of such set.

In some implementations, the first, second, third, fourth, fifth, sixth, seventh, and eighth validity strength ratings can be associated with a different weight factor to differentiate the strength of claims that have a different status (e.g., claims not challenged, claims challenged, claims granted review, claims denied review, claims affirmed, and claims canceled). The weight factor allows a deeper analysis to be performed to determine the relative strength of different claims that have gone through different phases of litigation.

In some implementations, the weight factor for each of the first, second, third, fourth, fifth, sixth, seventh, and eighth validity strength ratings can be determined based on data unique to a respective stage. For example, the weight factor associated with the first validity strength rating can be determined (e.g., claims that have not been litigated or challenged previously) based on data and attributes available at the Pre-Petition Stage (e.g., data specific to the patent including class/subclass information, name of assignee, filing date, number of prior art cited on record, number of claims, and the like that are available before any petition is filed); the weight factor associated with the second validity strength rating can be determined (e.g., for claims that have been challenged in other litigation or claims with prior litigation history) based on data and attributes associated with those prior histories (e.g., any of TABLES A-G associated with the prior proceeding); the weight factor associated with the third validity strength rating can be determined (e.g., for claims that have been challenged) based on data and attributes available at the Petition stage (e.g., those shown in TABLE A and/or TABLE B); the weight factor associated with the fourth validity strength rating can be determined (e.g., for claims that have not been challenged) based on data and attributes available at the Petition stage that can put extra emphasis on the claim types and the number of unchallenged claims (e.g., system, device, method, beauregard, computer method, or computer medium); the weight factor associated with the fifth and sixth validity strength ratings can be determined (e.g., for claims granted or denied review) available at the Decision Stage (e.g., those shown in TABLE A, TABLE B, TABLE C, and TABLE E); the weight factor associated with the seventh and eighth validity strength ratings can be determined (e.g., for affirmed or canceled claims) based on data and attributes available at the Final Stage (e.g., those in TABLE A, TABLE B, TABLE C, TABLE D, TABLE E, TABLE F, and TABLE G).

In some implementations, the foundation of the weight factor for the third validity strength rating can be determined based on the ratio between total number of claims and the number of claims challenged; the fifth validity strength rating can be determined based on the ratio between the number of claims challenged and the number of claims denied review; the sixth validity strength rating can be determined based on the ratio between the number of claims challenged and the number of claims granted review; the seventh validity strength rating can be determined based on the ratio between the number of claims granted review and the number of affirmed claims; and the eighth validity strength rating can be determined based on the ratio between the number of claims granted review and the number of canceled claims.

For example, the fifth validity strength rating can be determined by calculating the ratio between the number of claims challenged (e.g., 12 claims) and the number of claims denied review (e.g., 4 claims), or 33.3%. In some implementations, this ratio can be applied as a weight factor to the first validity strength rating. For example, assuming the first validity strength rating as determined by the data analysis system 220 is 33 (e.g., as determined based on totalPSByPI, totalPSByPO, and totalPSByPC), the fifth validity strength rating can be determined by applying the ratio (33.3%) as an addition to the first validity strength rating (e.g., 33+(33*33%), or 44).

Similarly, where the ratio between the number of claims granted review (e.g., 8 claims) and the number of claims affirmed (e.g., 4 claims) is 50%, the seventh validity strength rating can be determined by applying the ratio (50%) as an addition to the fifth strength rating (e.g., 44+(44*50%), or 66). In some instances the weight factor can bring a validity strength rating over the original rating scale (e.g., over 100). Accordingly, in some implementations, normalization can also be used between the first through eighth validity strength ratings so as to maintain the new ratings on proper scale (e.g., 0-100).

The foregoing implementations have been described with respect to the determination of a validity strength rating for each set of claims associated with different status at a particular stage such that the data analysis system 220 can ascertain the validity strength rating of a particular set of claims as of that stage. For example, after a petition has been filed, the data analysis system 220 can immediately assess and determine the validity strength rating for the challenged claims as well as the unlitigated claims. As another example, after the Board has issued a Decision to Institute Trial, the data analysis system 220 can immediately assess and determine the validity strength rating for those claims that have been granted review as well as those denied review. As yet another example, after the Board has issued a Final Decision, the data analysis system 220 can immediately assess and determine the validity strength rating for those claims that have been affirmed as well as canceled by the Board.

As shown in FIG. 13, the rating 1305 can include a rating for unlitigated claims (e.g., the first validity strength rating) and a rating for claims with prior litigation history (e.g., a second validity strength rating). Similarly, the rating 1307 can include a rating for claims that have been challenged (e.g., the third validity strength rating) and a rating for claims that have not been challenged (e.g., the fourth validity strength rating) by the petitioner; the rating 1309 can include a rating for claims that have been granted review (e.g., the sixth validity strength rating) and a rating for claims that have been denied review (e.g., the fifth validity strength rating); and the rating 1311 can include a rating for claims that have been affirmed (e.g., the seventh validity strength rating) and a rating for claims that have been canceled (e.g., the eighth validity strength rating).

In some implementations, the rating 1305 can include a rating associated with the Pre-Petition Stage As discussed previously, not all claims in a patent are litigated or challenged. For example, the petitioner might challenge only claims 1-5 but not claims 6-20 in a patent. Similarly, a accused infringer might challenge the validity of claims 1-9 when the Patent Owner has only asserted those claims against the accused infringer.

In some implementations, the data analysis system 220 can determine a validity strength rating for the unlitigated claims (e.g., claims 6-20 in the above example). The validity strength rating for the unlitigated claims can be determined, in some implementations, based on the total number of claims and the number of claims having granted review (e.g., UL=TC−CG where UL=the number of unlitigated claims; TC=the total number of claims in a patent; and CG=the number of claims granted review by the Board).

As an example, where a patent contains 20 claims in which claims 1-9 were challenged but only claims 1-6 were granted review with claims 1-4 canceled and claims 5-6 affirmed, the number of unlitigated claims UL is then equal to 14 (e.g., 20−6). In these implementations, the data analysis system 220 can determine the same validity strength rating to these unlitigated claims as those assigned in the Pre-Petition Stage (e.g., using PPPatentStrength).

As discussed above, the data analysis system 220 can also determine the validity strength rating of the claims remaining after Final Decision (e.g., Post-Final Decision or Post-Trial Stage). Using the example above, the data analysis system 220 can determine the validity strength rating for claims 5-20. In some implementations, the validity strength rating of the claims remaining RC can be determined based on TC and CN or UL and CA (e.g., RC=TC−CN=UL+CA where RC=the number of remaining unlitigated and affirmed claims, TC=the total number of claims in a patent; CN=the number of canceled claims; and CA=the number of affirmed claims). Using the example above, the number of remaining unlitigated and affirmed claims RC is 16 (e.g., 20−4 or 14+2).

In some implementations, if RC is zero, which indicates that all claims in a patent have been canceled, the data analysis system 220 can determine the validity strength rating of this patent to be zero (e.g., all claims have been ruled as invalid by the Board).

In some implementations, where RC is not zero, the data analysis system 220 can determine the validity strength rating based on the ratio of CA and RC. If CA/RC is greater or equal to a predetermined threshold (e.g., 0.99 or 99%), the data analysis system 220 can determine that most, if not all, of the remaining claims have been affirmed, in which case the data analysis system 220 can determine the validity strength rating for these unlitigated or affirmed claims to be in the top 99% percentile.

If CA/RC is less than 0.99, the data analysis system 220 can determine the validity strength rating for this patent based on totalPSByPI (e.g., using CA/RC), totalPSByPO, and totalPSByPC in the manner discussed above.

In some instances, there are more than one proceeding that involve a same patent. For example, there might be two inter partes proceedings filed by different petitioners challenge claims of the same patent. When a patent is involved in more than one proceeding, there are three possible event types that may occur.

The first type is that different litigation may involve different sets of claims (e.g., a first case has petitioner A challenging the validity of claims 1, 2, and 3; and a second case has petitioner B (who could be the same real party of interest) challenging the validity of claims 4, 5, and 6.

The second type is that different litigation may involve overlapping sets of claims (e.g., a first case challenges the validity of claims 1, 2, and 3; and a second case challenges the validity of claims 2, 3, and 4).

The third type is that different litigation may involve the exact same set of claims (both a first case and a second case challenge the validity of claims 1, 2, and 3).

Because proceedings with overlapping claims could affect the integrity and reliability of the validity strength rating, in some implementations, the data analysis system 220 can implement a de-overlap procedure in removing duplicate data so that data involving the same patent in multiple cases are not counted twice that may otherwise skew the true value of the validity strength rating.

For example, the data analysis system 220 can check whether a particular patent is involved in more than one IPR or CBM case. If so, this can indicate that there may be overlapping claims (e.g., the second type) or completely identical claims (e.g., the third type). If there are overlapping but not completely identical claims, the data analysis system 220 can check whether CA+CN=CG (where CA=sum of all claims affirmed from that patent's litigation history; CN=sum of all claims canceled from that patent's litigation history; and CG=sum total of all claims granted review from that patent's litigation history). If the sum of CA and CN is not equal to CG, this can indicate that there are overlapping claims that need to be resolved. In some implementations, the data analysis system 220

To identify related cases or proceedings, the data mining system 202 can mine the various content and documents shown in TABLES A-F to locate data identifying related cases (e.g., from petition, preliminary response, mandatory notice, Decision to (Not) Institute, and Final Decision). The data mining system 202 then can discount one of the two duplicates in determining the validity strength rating (e.g., under the third type discussed above). For example, from all non-duplicate cases given a particular patent number, the data mining system 202 can sum up all the canceled claims for these cases. If the number of all canceled claims is the same as the total number claims of the patent, which indicates that the patent is completely invalidated by the Board, the data mining system 202 can update that patent's validity strength rating to zero.

However, unlike the third type, the first type involves different number of claims for the same patent. In these implementations, the data mining system 202 can account both proceedings in generating the validity strength rating. By determining whether a patent has been involved in more than one proceeding, the data mining system 202 can fine tune the validity strength rating by not double counting the same statistics associated with the same patent twice in its analytical or statistical models.

As discussed previously, the data mining system 202 can determine a validity strength rating for claims of a patent prior to the filing of a petition (e.g., Pre-Petition Stage). For example, the data mining system 202 can determine the validity strength rating by utilizing one or more analytical or statistical models created based on data and attributes associated with the patent number, patent owner, patent class, patent sub-class, patent examiner (primary or supervisory or junior), the age of the patent, the number of prior art references cited, the identity of the inventors, the law firm or counsel prosecuting the patent, and the number of claims in a patent.

Other data or attributes can also be used. For example, the data mining system 202 can first select one or more variables, perform regression analysis to determine the relationship between these selected variables and possible outcomes such as one or more claims likely to be granted or denied review, canceled, or affirmed. If the regression analysis indicates a theoretical relationship (e.g., above a particular predetermined threshold), the data mining system 202 then can include the one or more selected variables in creating one or more analytical or statistical models that can be used to determine the validity strength rating.

For example, based on regression analysis, the data mining system 202 can determine that number of claims in a patent has a direct impact on the validity or invalidity of a patent. This determination can be based on the fact that the greater the number of claims, the greater number of claims that can be challenged by a petitioner. The greater number of claims exposed to litigation can increase the chance for the accused infringer or the petitioner to get at least one of those claims canceled, which in turn would lower the rating of the patent. In some implementations, the data mining system 202 can look at the average total claims among all patents (or among all patents in a class/subclass or all patents for a patent owner). If a given patent has more claims than that of an "average" patent, then this factor can be used by the data mining system 202 in determining whether to lower the validity strength rating of the patent. Similarly, if the given patent has fewer claims than an "average" patent, then the data mining system 202 can increase its validity strength rating accordingly.

Spider Graph

In some implementations, the data analysis system 220 can generate and display a spider graph in the comparison section 1302 to indicate two sets of data that graphically show the validity strength of a patent compared to the validity strength of an "average" patent. In some implementations, these two sets of data can include patent data and global data. In some implementations, the data analysis system 220 can determine the validity strength rating based on a global patent standard rating (globalPatentStandard( )), a global patent owner standard rating (globalPatentOwnerStandard( )), a global class standard rating (globalClassStandard( )), a patent validity factor (patentValidityFactor( )), a patent owner validity factor (patentOwnerValidityFactor( )), and a class validity factor (classValidityFactor( )), each of which will be discussed in greater detail below.

In some implementations, the globalPatentStandard( ) can represent a value that is averaged over all patentIDs (avg(patentValidityFactor(patentID))); the globalPatentOwnerStandard( ) can represent a value that is averaged over all patent owners (avg(patentOwnerValidityFactor(patentOwner))); and the globalClassStandard( ) can represent a value that is averaged over all classes (avg(classValidityFactor(classID))).

In some implementations, for the patent data, the PIStrength can be used as the patentValidityFactor ( ) with a patent identifier (i.e., patent number) as an input; the POStrength can be used as the patentOwnerValidityFactor ( ) with the name of a patent owner as an input; and the PCStrength can be used as the classValidityFactor ( ) with a class (or subclass) as an input.

In some implementations, the PIStrength can be determined by determining the cancel ratio of the number of claimed canceled by the Board ("CN") and total number of claims in the patent ("TC"). For example, assuming that Patent "X" contains twenty claims all of which were granted review by the Board but only five were canceled at the Final Decision stage, the cancel ratio would be 0.25 (e.g., 5/20). The PIStrength would then be calculated by determining 1−CN/TC.

For the global data, in some implementations, the strength of a patent that has gone to the Final Decision stage (called "acPIStrength") can be used as the globalPatentStandard( ); the strength associated with a patent owner for a patent that has gone to the Final Decision stage (called "acPOStrength") can be used as the globalPatentOwnerStandard( ); and the strength associated with a patent class for a patent that has gone to the Final Decision stage (or class and subclass) (called "acPC Strength") can be used as the globalClassStandard( ).

In some implementations, the acPIStrength can be determined based on an affirmance ratio (e.g., 1−CN/TC where CN=the number of claims in a patent canceled by the Board and TC=the total number of claims in the patent) and an acPIStrength multiplier. The acPIStrength multiplier, in some implementations, can be calculated by determining the number of cases involving the same patent. For example, where Patent "X" has been involved in two post-grant or inter-parte proceedings that have gone through Final Decision stage, the acPIStrength multiplier can be equal to two.

Similarly, in some implementations, the acPOStrength can be determined based on the affirmance ratio and an acPOStrength multiplier. The acPOStrength multiplier, in some implementations, can be calculated by determining the number of cases involving the same patent owner. For example, where patent owner "Y" has been involved in four post-grant or inter-parte proceedings that have gone through Final Decision stage, the acPIStrength multiplier can be equal to four.

Similarly, in some implementations, the acPCStrength can be determined based on the affirmance ratio and an acPC Strength multiplier. The acPC Strength multiplier, in some implementations, can be calculated by determining the number of cases involving the same patent class. For example, where patent class "Z" has been involved in ten post-grant or inter-parte proceedings that have gone through Final Decision stage (e.g., ten patents classified under patent class "Z" have been involved in post-grant or inter partes proceedings), the acPC Strength multiplier can be equal to ten.

TABLE 8

| Variable | Factor |
| --- | --- |
| patentValidityFactor | PIStrength |
| classValidityFactor | PCStrength |
| patentOwnerValidityFactor | POStrength |
| globalPatentStandard | acPIStrength/totalPSAllPIs |
| globalPatentOwnerStandard | acPOStrength/totalPSAllPOs |
| globalClassStandard | acPCStrength/totalPSAllPCs |

In these implementations, by looking at the "average" of all patent strengths over all cases that went through final decision, a basis can be formed to compare a specific patent strength. For example, if the strength of Patent "X" is greater than the acPIStrength for an average patent, then this means that Patent "X" is stronger or likely to be more valid than an average patent. In some implementations, if Patent "X" has no prior history, meaning that the PIStrength is zero, the acPIStrength can be used to replace the PIStrength. Similarly, if there's no data for POStrength and/or PCStrength, these parameters can be replaced by the acPOStrength and acPCStrength, respectively.

As an example, assuming Patent "X" corresponds to Patent Owner "Y" and Class "Z". The patent data would then be equal to PIStrength(X), POStrength(Y), and PCStrength(Z). Based on these patent data, the data analysis system 220 can determine that the validity strength rating for Patent "X" is (PIStrength(5624695)+POStrength(Nike)+PCStrength(36))/3=0. In other words, the claims of this patent are likely to be invalid, and very likely to be canceled. The data analysis system 220 can display a spider graph representative of this validity strength rating as follows: PIStrength(X)=0 on the Patent ID axis; POStrength(Y)=0 on the Patent Owner axis; andPCStrength(Z)=0 on the Patent Class axis.

For the global data, the data analysis system 220 can display acPIStrength (or totalPSAllPIs) on the Patent ID axis; acPOStrength (or totalPSAllPOs) on the Patent Owner axis; and acPCStrength (or totalPSAllPCs) on the Patent Class axis.

Figure 14:
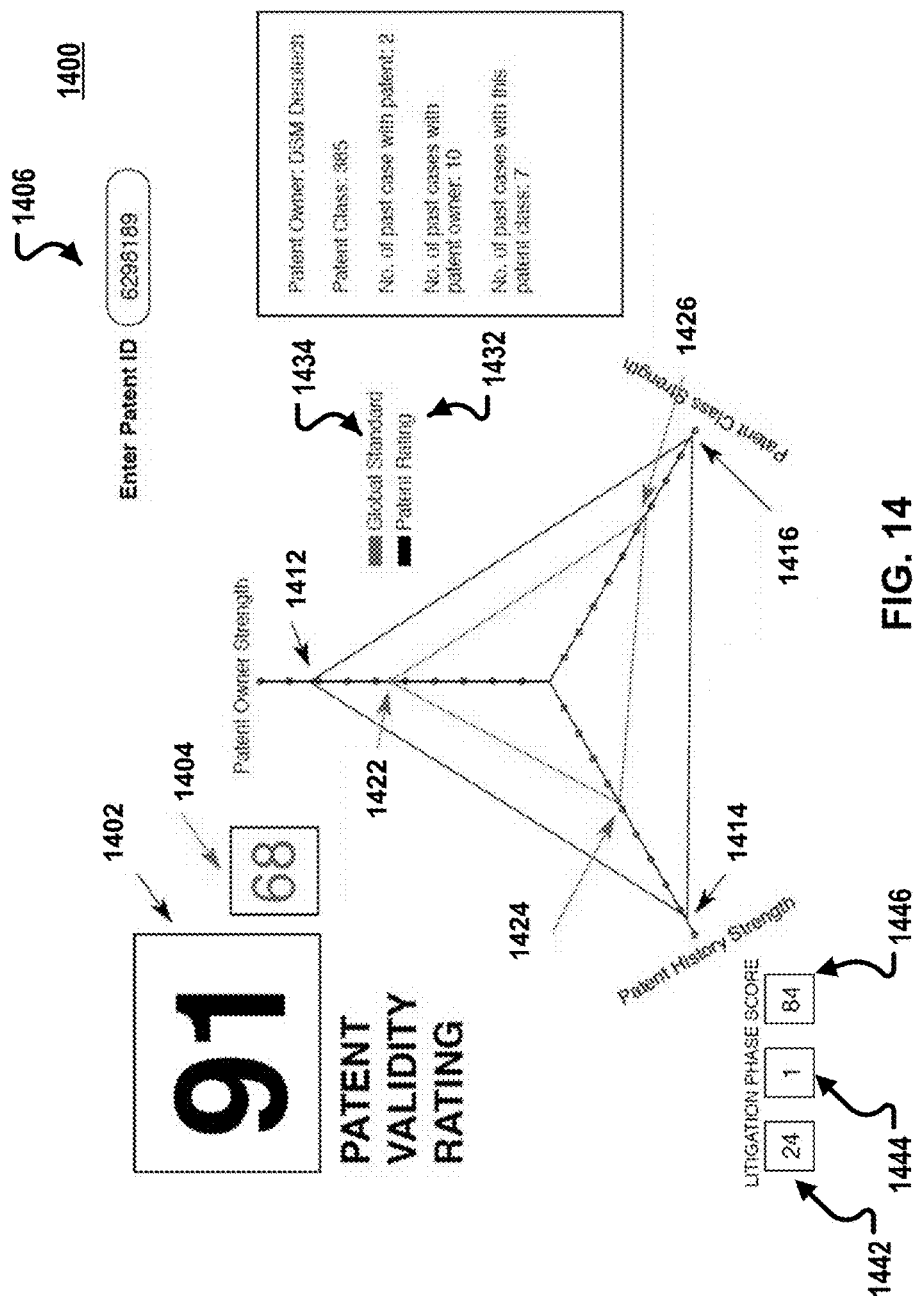
FIG. 14 is an example screenshot of a spider graph generated based on patent data and global data.

FIG. 14 is an example screenshot of a spider graph generated based on patent data and global data. Referring to FIG. 14, the spider graph 1400 can be shown in a comparison section (e.g., comparison section 1302) of the analysis page 1300. The spider graph 1400 shows a first validity strength rating 1402 and a second validity strength rating 1404 associated with a particular patent identifier 1406. In some implementations, the first validity strength rating 1402 can be that shown as rating 1313 in FIG. 13 (which also can be validity strength rating as determined at the Post-Final Decision Stage or Post-Trial Stage).

The second validity rating 1404 can be associated with a global validity strength rating taking into account of all existing cases in litigation, or all existing patents. The second validity strength rating 1404 can be determined in the same manner used to determine the first validity strength raring 1402 but using all of the existing cases in litigation or existing patents as the bases (e.g., avg(globalPatentStandard( )+globalPatentOwnerStandard( )+giobalClassStandard( ))).

As shown, the spider graph can include three datapoints associated with the patent data representative of the patent rating associated with the patent identifier 1406: namely, patent owner strength patent datapoint 1412 (e.g., POStrength), patent history strength patent datapoint 1414 (e.g., PIStrength), and patent class strength patent datapoint 1416 (e.g., PCStrength).

Similarly, the spider graph can include three datapoints associated with the global data representative of the global standard associated with the patent identifier 1406: namely, patent owner strength global datapoint 1422 (e.g., acPOStrength), patent history strength global datapoint 1424 (e.g., acPIStrength), and patent class strength global datapoint 1426 (e.g., acPCStrength).

FIG. 16 is a matrix of an example listing of validity strength ratings that can be determined by the data analysis system 220. For example, as discussed above, the data analysis system 220 can create analytical or statistical models associated with different validity strength ratings at different litigation phases, including for example, Pre-Petition Stage, Decision Stage, Final Stage, and Post-Final Stage. For example, under the Pre-Petition Stage, totalPSAllPXs (where X denotes" either "I", "C" or "O", for example) can be determined based on all cases or proceedings associated with the respective "PX" (e.g., totalPSAllPC is determined based on all cases associated with a particular class).

As an example, cases can be sorted based on patent class. For all cases associated with a particular class, the total number of claims for each patent associated with that particular class can be extracted and summed. Similarly, the total number of claims that have been canceled (e.g., in cases that fall under this particular class) can also be extracted and summed. The number of cases associated with that class can also be determined. Then, the preliminary patent strength for this class can be determined based on the number of cases and the total number of affirmed claims (e.g., as determined based on the total number of claims and the total number of canceled claims). Then, the preliminary patent strength for each and every class can be summed to arrive at the totalPSAllPC.

Similarly, totalPSByPX (where X denotes" either "I", "C" or "O", for example) can be determined based on cases or proceedings associated with a particular "PX" (e.g., totalPSByPC is determined based on only those cases associated with a particular class). Using the example above, the totalPSByPX can be determined as the preliminary validity strength based on the exemplary process discussed above for totalPSAllPC (e.g., without last step wherein each and every class are summed).

Regarding the PPPatentStrengthAllPXs and PPPatentStrengthByPXs (where X denotes" either "I", "C" or "O", for example), a process similar to that for totalPSAllPC can be used. However, in this process, attributes such as the total number of claims challenged can be used in place of the number of canceled claims.

Regarding the DTIPatentStrengthAllPXs and DTIPatentStrengthByPXs (where X denotes" either "I", "C" or "O", for example), a process similar to that for totalPSAllPC can be used. However, in this process, attributes such as the total number of claims granted review and the total number of claims challenged can be used in place of the number of canceled claims and the total number of claims in a patent.

Regarding the FDPatentStrengthAllPXs and FDPatentStrengthByPXs (where X denotes" either "I", "C" or "O", for example), a process similar to that for totalPSAllPC can be used. However, in this process, attributes such as the total number of claims granted review can be used in place of the total number of claims in a patent.

Regarding the acStrength, the data analysis system 220 can determine the acStrength by determining an average of the totalPSByPX. Similarly, the data analysis system 220 can determine the acPSduringPP, acPSduring DTI, and acPSduring FD by determining an average of the PPPatentStrengthAllPXs, DTIPatentStrengthAllPXs, and FDPatentStrengthAllPXs, respectively.

Regarding the patentvaliditystrength(PI), this parameter can be determined by determining an average of totalPSByPX with PO and PC associated with the given PI.

Regarding the PSduringPP(PI), this parameter can be determined by determining an average of PPPatentStrengthByPX with PO and PC associated with the given PI. In some implementations, the PSduringPP parameter can be displayed as 1442 shown in FIG. 14.

Regarding the PSduringDTI(PI), this parameter can be determined by determining an average of DTIPatentStrengthByPX with PO and PC associated with the given PI. In some implementations, the PSduringDTI parameter can be displayed as 1444 shown in FIG. 14.

Regarding the PSduringFD(PI), this parameter can be determined by determining an average of FDPatentStrengthByPX with PO and PC associated with the given PI. In some implementations, the PSduringFD parameter can be displayed as 1446 shown in FIG. 14.

In general, the validity strength ratings associated with the Pre-Petition Stage allows a user to understand how likely the claims of a patent will be canceled. The more claims canceled, the weaker the patent is. This information can then be used to compare the patent among its peers within an attribute: compare a patent ID among all other patent IDs, compare a patent owner to among all, etc.

Similarly, the validity strength ratings associated with the Decision Stage allows a user to understand how well a patent will perform during the pre-DTI phase, or post initial petition phase. A strong patent will prevent a petitioner from challenging too many of its claims. It will limit damage by forcing the petitioner to challenge only a small fraction of the claims.

Similarly, the validity strength ratings associated with the Final Stage allows a user to understand how well a patent will perform during DTI. The result, pre-FD, is the number of challenged claims that are granted review. A strong patent (ID/Owner/Class) will somehow minimize the number of claims granted review.

Finally, the validity strength ratings associated with the Post-Final Stage allows a user to understand how well a patent will perform during FD. The results, post-FD, is the number of claims canceled. A strong patent (ID/Owner/Class) will minimize the number of claims canceled from among the number of claims granted review. More important to a Patent Owner is the number of claims affirmed (CA=CG−CN). Affirmed claims make the patent stronger. A patent that loses many claims by cancellation, but retains a few by affirmation is quite strong.

While the foregoing implementations describe validity strength ratings that are based on patent owner, patent identifier, and patent class, it should be noted that the attributes are not restricted to only patent owner, patent identifier, and patent class. Patent owner, patent identifier, and patent class are merely used as examples to illustrate the various validity strength ratings offered by the data analysis system 220, and to demonstrate how these ratings offer various analytics benefits to the users. The data analysis system can also use other attributes such as those described in TABLES A, B, C, and D as inputs to determine validity strength ratings associated with those attributes.

In some implementations, the data analysis system 220 can also consider the number of prior art references cited in a patent (e.g., forward citations) as part of the validity strength rating analysis. For example, where a particular patent has 50 prior art references cited therein, then this factor can be used as an attribute to compare similar patents in similar class to determine an appropriate "forward" impact on the validity strength rating. This impact can be expressed through an analytical or statistical model created by the data analysis system 220. The outcome of the model can then be used as a factor in determining any of the validity strength rating discussed above. In this example, where 50 prior art references have been cited, it is indicative of the strength of the patent to overcome various prior art, which may result in a stronger patent (and therefore with a higher validity strength rating than another patent with only two prior art references cited therein). In some implementations, this "forward" technique can also be adopted in generating the topology analytics shown in FIG. 22.

In some implementations, the data analysis system 220 can also consider the number of patents and/or publications citing a particular patent (e.g., reverse citations) to measure the strength of that patent. For example, where 36 patents cite to a particular patent as a reference, or as a prior art, the data analysis system 220 can use this information to develop analytical or statistical models that would determine the impact of this "reverse" reference on the strength of this patent. Similar to forward citations, this impact can be expressed through an analytical or statistical model created by the data analysis system 220. The outcome of the model can then be used as a factor in determining any of the validity strength rating discussed above. In some implementations, this "reverse" technique can also be adopted in generating the topology analytics shown in FIG. 22.

In some implementations, based on the forward and/or reverse citation(s), the data analysis system 220 can also generate a usage score indicative of how strong a prior art reference is for use as a prior art to invalidate a patent or patent publication. As indicative above, the forward citation and reverse citations can be used to indicate the potential impact of a patent. This impact can be used as a factor in determining the usage score. All factors that can be used for determining the usage score can include those shown in TABLE A (but not those factors associated with inter parte or post grant proceedings if that patent has not been the subject of such a proceeding).

In some implementations, the data analysis system 220 can determine a the validity strength rating (at or prior to different phases, for claims with the same or different statuses) based on an unweighted approach.

In some implementations, the unweighted approach can consider the aforementioned factors, data, and attributes for all patents and/or all classes and/or all patent owners. For example, the data analysis system 220 can determine the patentValidityFactor for all patents by averaging the PIStrength for all cases associated with that patent. As another example, the data analysis system 220 can determine the classValidityFactor for all classes by averaging the PCStrength for all cases associated with that patent. In these implementations, the unweighted approach allows some patents or some classes to appear more often than others, but at the same time, discounts these duplicates by not weighing the factors for each class when averaging.

In some implementations, the data analysis system 220 can determine a the validity strength rating (at or prior to different phases, for claims with the same or different statuses) based on a weighted approach. For example, if a patent has been a subject in multiple proceedings but involves different claims, these multiple proceedings will be counted (as opposed to discounted) in determining the validity strength rating.

Counsel Record

In some implementations, the data analysis system 220 can also provide information associated with a particular counsel. In some implementations, a user can access the "winning" and "losing" record associated with this counsel. For example, as discussed above, the data mining system 202 can apply a particular pattern recognition (e.g., "registration no.", "reg. no.", "registration number", "reg. number", and the like) to the legal documents to extract information associated with a legal counsel's registration or bar number. Based on this information, the data analysis system 220 can analysis each and every proceeding and litigation in which this counsel is named (e.g., by checking the presence of legal counsel's registration number). Then, an analytical or statistical model can be built to determine a variety of attributes associated with the cases or proceedings involving this particular counsel.

As an example, if the attribute of interest is the counsel's registration or bar number, the user can first enter this registration or bar number, and the data analysis system 220 can then analysis each and every proceeding and litigation in which this counsel's registration or bar number appears. An analytical or analytical or statistical model associated with this registration or bar number can then be built, including, for example, an analytical or statistical model associated with the number of cases this attorney is a named counsel for a petitioner that was terminated before reaching Final Decision due to parties' settlement, the number of cases this attorney is a named counsel for a petitioner that resulted in at least one claim granted review by the Board, the number of cases this attorney is a named counsel for a petitioner that resulted in at least one claim canceled by the Board, the number of cases this attorney is a named counsel for a petitioner that resulted in all claims canceled by the Board, and a cancel-to-affirm ratio for cases in which this attorney is a named counsel for a Petitioner.

As another example, an analytical or statistical model associated with this registration or bar number can then be built, including, for example, an analytical or statistical model associated with the number of cases this attorney is a named counsel for a patent owner that was terminated before reaching Final Decision due to parties' settlement, the number of cases this attorney is a named counsel for a patent owner that resulted in at least one claim denied review by the Board, the number of cases this attorney is a named counsel for a patent owner that resulted in at least one claim affirmed by the Board, the number of cases this attorney is a named counsel for a patent owner that resulted in all claims affirmed by the Board, and a cancel-to-affirm ratio for cases in which this attorney is a named counsel for a patent owner.

Although the foregoing implementations have been described with respect to a counsel's registration or bar number, other information can also be used and models created from which meaningful outcomes can be displayed to the user. These information can include, for example, those shown in TABLEs A-D to create models E-G. As an example, the data mining system 202 can extract the number of motions to amend, motions to exclude, and requests rehearing associated with a particular counsel, and the data analysis system 220 can then analyze these extracted documents to create models indicative of the counsel's winning and losing records associated with these motions and requests.

Figure 17A:
FIG. 17A is a screenshot displaying the counsel record associated with a petitioner.

FIG. 17A is a screenshot displaying the counsel record associated with a petitioner. As shown in FIG. 17A, a number of analytical or statistical models can be developed to provide various counsel-related records associated with a petitioner (e.g., petitioner's counsel), including the number of cases an attorney is a named counsel for a petitioner that was terminated before reaching Final Decision due to parties' settlement, the number of cases this attorney is a named counsel for a petitioner that resulted in at least one claim granted review by the Board, the number of cases this attorney is a named counsel for a petitioner that resulted in at least one claim canceled by the Board, the number of cases this attorney is a named counsel for a petitioner that resulted in all claims canceled by the Board, and a cancel-to-affirm ratio for cases in which this attorney is a named counsel for a Petitioner (e.g., a ratio of 59:0 means this named counsel has canceled a total of 59 claims in all cases compared to 0 claim affirmed by the opposing counsel in those cases).

Figure 17B:
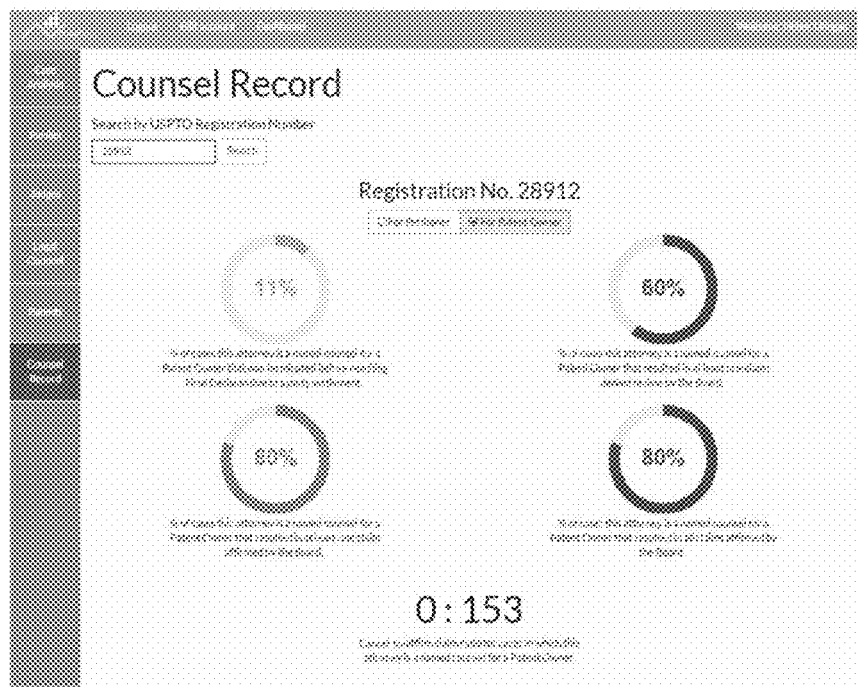
FIG. 17B is a screenshot displaying the counsel record associated with a patent owner.

FIG. 17B is a screenshot displaying the counsel record associated with a patent owner. As shown in FIG. 17B, a number of analytical or statistical models can be developed to provide various counsel-related records associated with a patent owner (e.g., patent owner's counsel), including the number of cases an attorney is a named counsel for a patent owner that was terminated before reaching Final Decision due to parties' settlement, the number of cases this attorney is a named counsel for a patent owner that resulted in at least one claim denied review by the Board, the number of cases this attorney is a named counsel for a patent owner that resulted in at least one claim affirmed by the Board, the number of cases this attorney is a named counsel for a patent owner that resulted in all claims affirmed by the Board, and a cancel-to-affirm ratio for cases in which this attorney is a named counsel for a patent owner (e.g., a ratio of 0:153 means this named counsel has affirmed a total of 153 claims in all cases compared to 0 claim canceled by the opposing counsel in those cases).

Additional Analytics

Figure 18A:
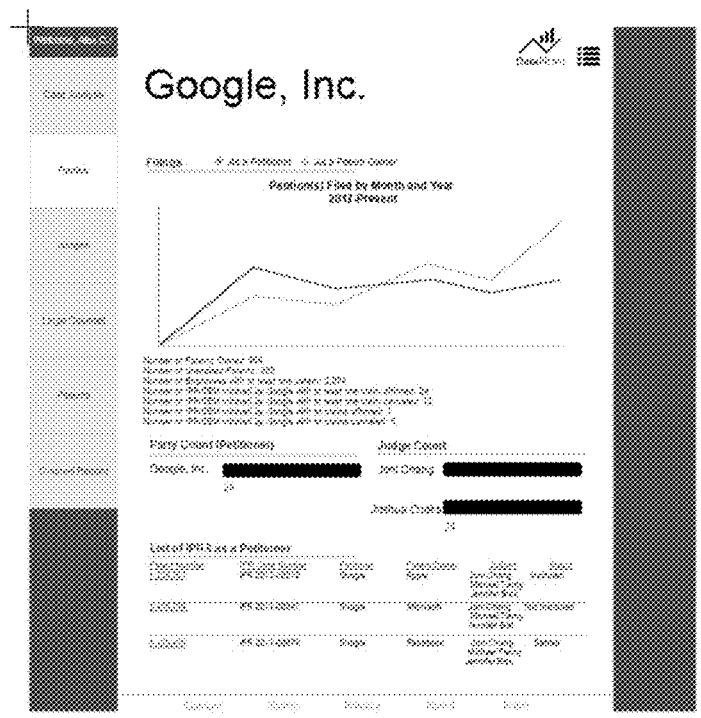
FIG. 18A is an example screenshot of "Parties" section viewed as a Petitioner.
Figure 18B:
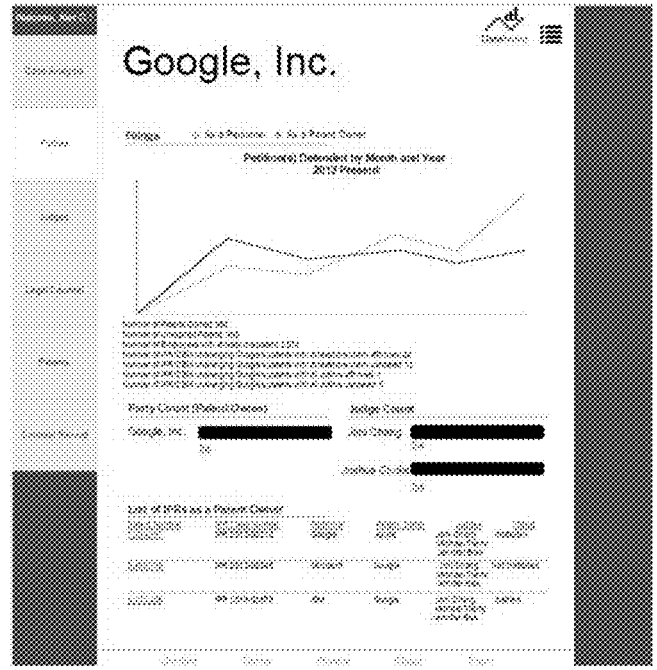
FIG. 18B is an example screenshot of "Parties" section viewed as a Patent Owner.
Figure 19A:
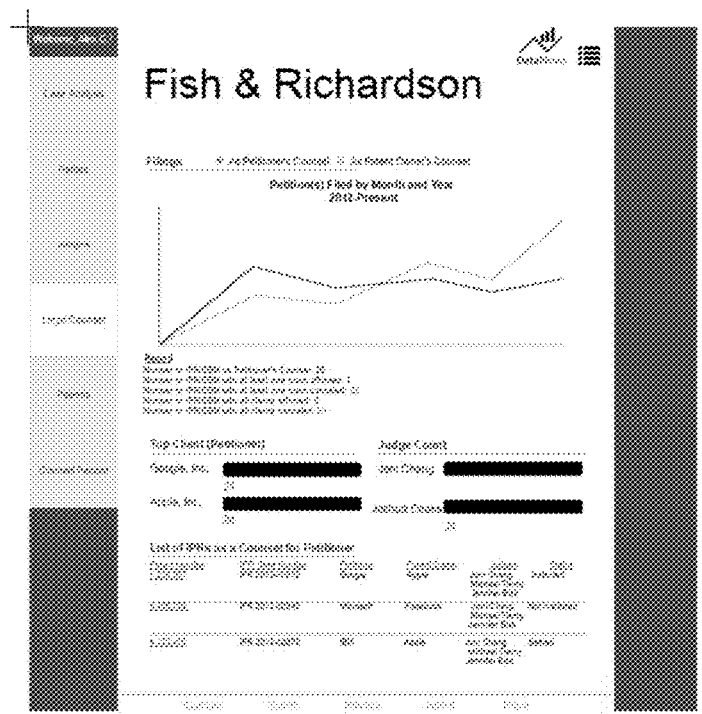
FIG. 19A is an example screenshot of "Legal Counsel" section viewed as a Petitioner.
Figure 19B:
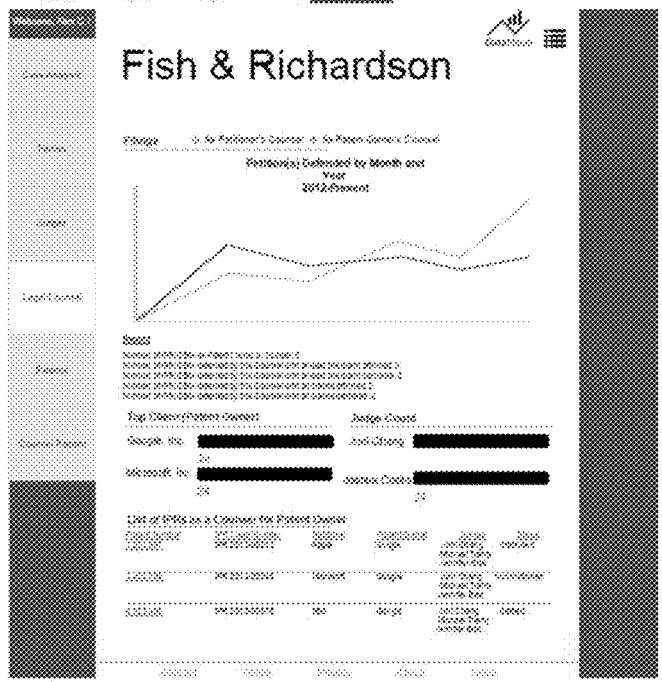
FIG. 19B is an example screenshot of "Legal Counsel" section viewed as a Patent Owner.

FIG. 18A is an example screenshot of "Parties" section viewed as a Petitioner. FIG. 18B is an example screenshot of "Parties" section viewed as a Patent Owner. Similar to the features shown in FIG. 17, the data mining/analysis system 102 can develop a number of analytical or statistical models to provide various parties-related analytics associated with a petitioner and a patent owner. For example, as shown in FIG. 18A, the data mining/analysis system 102 can develop analytical or statistical models to identify the number of unexpired patents, number of employees with at least one patent, number of litigation initiated by the selected petitioner with at least one claim affirmed, at least one claim canceled, all claims affirmed, or all claims canceled associated with a petitioner. As another example, as shown in FIG. 18B, the data mining/analysis system 102 can develop analytical or statistical models to identify the number of unexpired patents, number of employees with at least one patent, number of litigation challenging a patent owner's patent with at least one claim affirmed, at least one claim canceled, all claims affirmed, and all claims canceled. FIG. 19A is an example screenshot of "Legal Counsel" section viewed as a Petitioner. FIG. 19B is an example screenshot of "Legal Counsel" section viewed as a Patent Owner. Similar to the features shown in FIG. 17, the data mining/analysis system 102 can develop a number of analytical or statistical models to provide various counsel or law firm specific analytics associated with counsel representing a petitioner (FIG. 19A) or a patent owner (FIG. 19B). The analytics can include the numbers and identities of all clients represented (e.g., "Google, Inc," "Apple, Inc.") or all judges presiding over one or more cases in which the counsel was the counsel of record.

FIG. 20 is an example screenshot of the "Patent" section. As discussed previously, the data mining/analysis system 102 can develop one or more analytical or statistical models based on attributes and/or variables such as those shown in TABLES A-G. As illustrated in FIG. 20, the "Patent" section can display analytics such as, for a selected patent, whether there's prior litigation associated with the selected patent, the expiration date with the selected patent, the number of claims affirmed or canceled by PTAB with the selected patent as well as the validity strength rating for affirmed claims, the validity strength rating for unchallenged claims, the patent owner strength, the patent class strength, and the patent history strength.

Prior Art Analytics

In some implementations, the data mining system 202 can mine all the prior art references cited in each case or proceeding, and the data analysis system 220 can associate these references with one or more attributes or analytical or statistical models to determine the impact of a particular prior art on a particular patent. For example, the data analysis system 220 can associate a particular prior art with a particular owner or class (or another attributes). The number of the prior art references associated with a particular owner and class can then be used as part of the analytical or statistical development process by the data analysis system 220 to determine their correlation, if any. The data mining system 202 can also mine all incoming documents fed into the data mining/analysis system 102 to identify additional prior art that may be relevant to a particular patent.

Figure 21A:
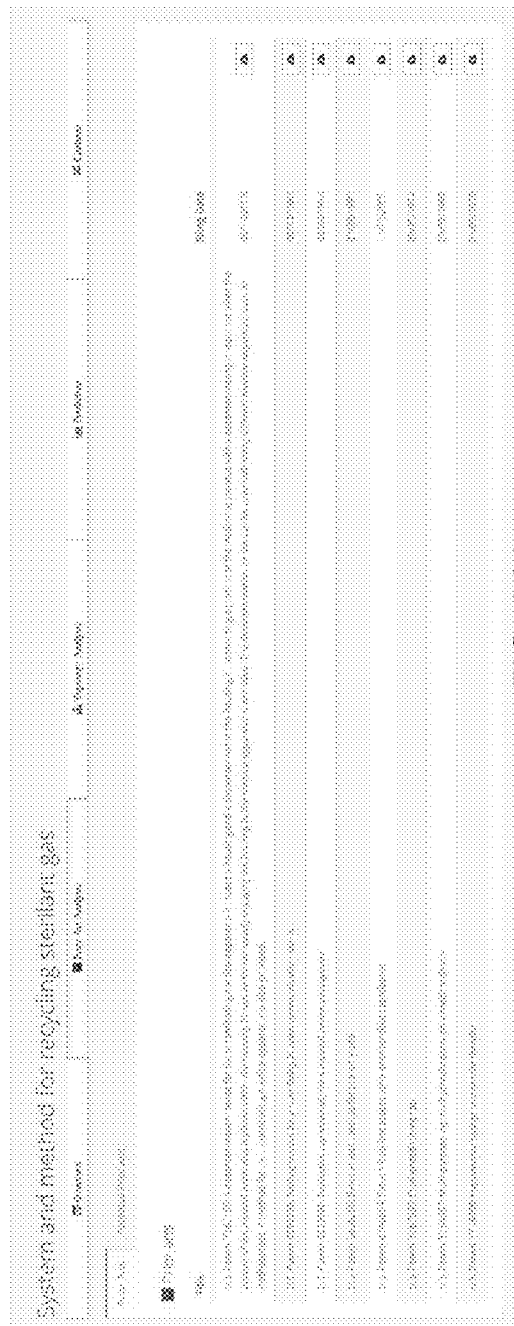
FIG. 21A is an example screenshot of a listing of prior art references.
Figure 21B:
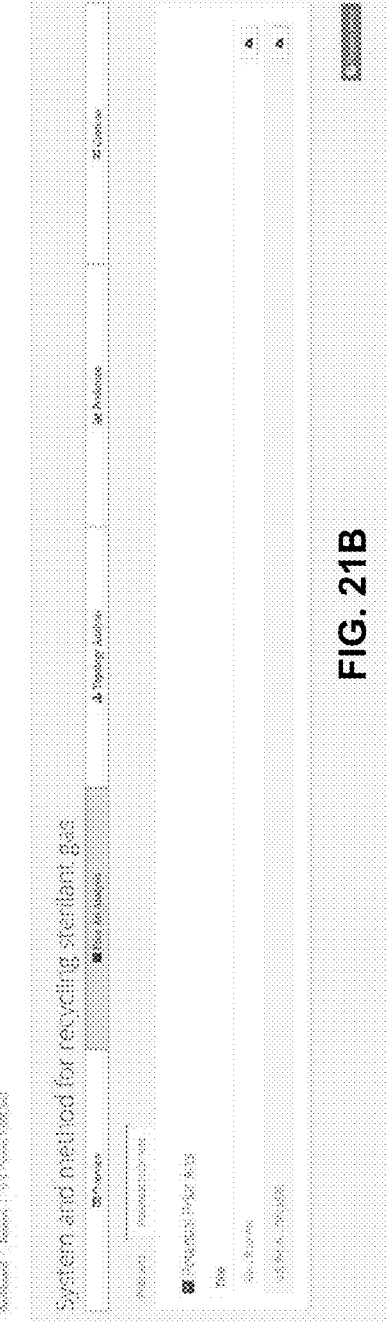
FIG. 21B is an example screenshot of a listing of potential prior art references.
Figure 21C:
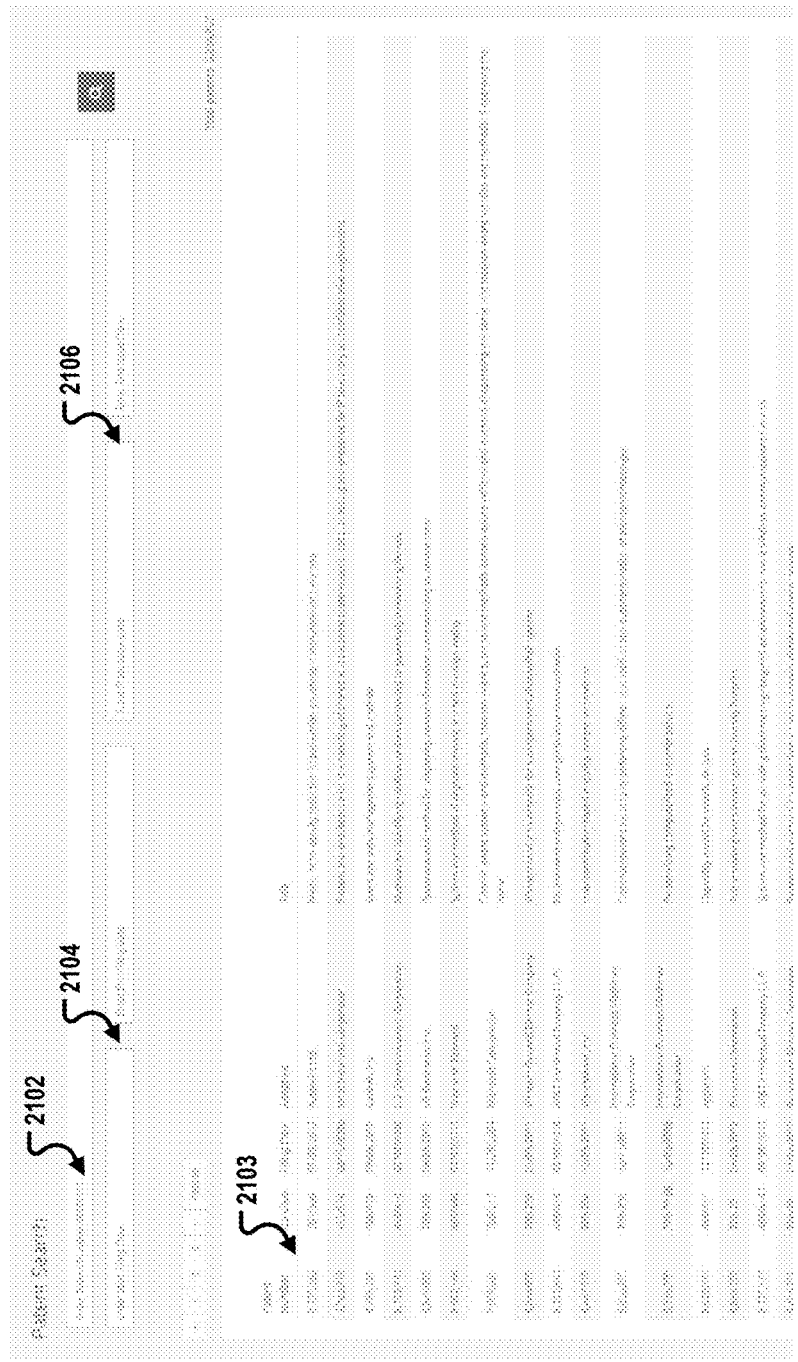
FIG. 21C is an example screenshot of an interface to receive user input.

FIG. 21A is an example screenshot of a listing of prior art references and potential prior art references that may be relevant to a selected patent (e.g., U.S. Pat. No. 7,666,369). As shown, the data mining/analysis system 102 displays eight prior art references, each of which is deemed to be prior art based on attributes mined from these references and analyzed in relation to the attributes associated with the selected patent. For prior art references where one or more attributes cannot be determined such that it is unclear whether a particular reference is a prior art, those references may be listed under the "Potential Prior Arts" listing, as shown in FIG. 21B. In some implementations, the listing of prior art references and potential prior art references as shown in FIGS. 21A and 21B can be displayed as part of the "Patent" section shown in FIG. 20. FIG. 21C is an example screenshot of an interface 2102 to receive user input specifying, for example, the selected patent (e.g., U.S. Pat. No. 7,666,369). The interface 2102 also includes options such as start and end filing dates 2104 and start and end issue dates 2106 to help the user 212 locate the selected patent quickly.

In some implementations, the data mining system 202 and the data analysis system 220 can employ analytical or statistical models to create the example listings shown in FIGS. 21A and 21B based on the relationship between the extracted prior art and, for example, patent owner, patent class, prior litigation history, other attributes discussed in TABLEs, A, B, C, and D, and any of the validity strength ratings discussed above. The listings can indicate and rank each prior art reference based on this relationship to identify, for example, the most relevant prior art for a particular case or proceeding. As one example, in FIG. 21, U.S. Pat. No. 7,282,186 is listed above U.S. Pat. No. 4,597,785 to indicate that U.S. Pat. No. 7,282,186 is likely a stronger prior art than U.S. Pat. No. 4,597,785. As another example, the listings can indicate, based on the foregoing relationship, that there are 256 prior art references associated with class "438" (semiconductor device manufacturing process) under which a particular patent is classified. Each of these references can then be ranked based on, for example, their respective strength. In some implementations, the strength of each prior art reference can be determined based on the validity strength rating of the selected patent in which the prior art reference is listed. In some implementations, the strength of each prior art reference can also be determined based on the number of claims challenged, the number of claims granted review, the number of claims denied review, the number of claims affirmed, and the number of claimed canceled in cases involving that particular patent.

For example, the data analysis system 220 can consider a prior art reference "X" as particular strong where the prior art reference "X" was cited in a proceeding "Y" involving patent "Z" in which all claims of patent "Z" were canceled or ruled invalid because of the prior art reference "X."

As another example, the data analysis system 220 can consider a prior art reference "A" as particular weak where the prior art reference "A" was cited in a proceeding "B" involving patent "C" in which all claims of patent "C" were affirmed or ruled valid.

These implementations, however, can use any of the attributes described in TABLEs, A, B, C, and D to determine the relevant strength (and ranking) of each prior art reference. For example, the data analysis system 220 can also use the identification of the assignee or inventor(s) associated with the prior art reference as a factor in determining the strength of a particular reference (e.g., inventors such as "Alexander Graham Bell" or "Albert Einstein" or companies such as "Towle Silversmiths" would generally command a greater strength than other entities).

In some implementations, the ranking can also be based on a particular time period. For example, HDMI (High-definition multimedia interface) was first designed in December, 2012. Any prior art reference (patent or publication that has a filing or publication date that pre-dates December 2012) can be given a higher ranking than those that have a later date. This is because prior art references that are close to the date of design, discovery, or idea conception are more likely be "original" such that it is less likely that those references pertain to improvements or new discoveries that are just an obvious version over the original one.

From a user perspective, prior art analytics are simple and intuitive. With a selected patent, the data mining/analysis system 102 can process the selected patent to generate relevant prior art search results that include U.S. patents and publications, foreign patents and publications, and non-patent literature. Based on the incoming documents, the data mining/analysis system 102 can also mine and identify certified and non-certified translation, when available, to help its users understand and review prior art references written in foreign languages. As the data mining/analysis system 102 receives and processes new data weekly, the data mining/analysis system 102 can update its underlying analytics to allow for refined search results. This can allow only the most relevant search results known to the data mining/analysis system 102 to be listed and displayed to the users.

Topology Analytics

Patents are financial intangible assets. IP stakeholders invest in patents because of their potential economic and growth impact on businesses. Patent investment enables IP stakeholders to support businesses to not only create new revenue streams and maximize return values through exclusive and non-exclusive licensing, it also protects and improves market position that helps businesses sustain long-term growth. Sustainable investment requires a holistic approach with ongoing evaluation to identify rare opportunities and unknown threats. Yet, there's no concrete methodology to identify the "influencers," or those patents that have great potential investment values. With six million active patents, this is akin to finding a hair-strand in a haystack. Their strengths and weaknesses are generally unknown, leaving one to guess whether the patent of interest is a hair-strand or hay-straw.

In some implementations, the data mining/analysis system 102 can provide discovery functions and research analyses that enable users to discover and invest in under-appreciated or underutilized patents, or to conduct due diligence on patents for deals where IP is the driving catalyst. The data mining/analysis system 102 can integrate quantitative and qualitative methods to help our clients visualize under-appreciated or underutilized patents quickly and efficiently.

Figure 22:
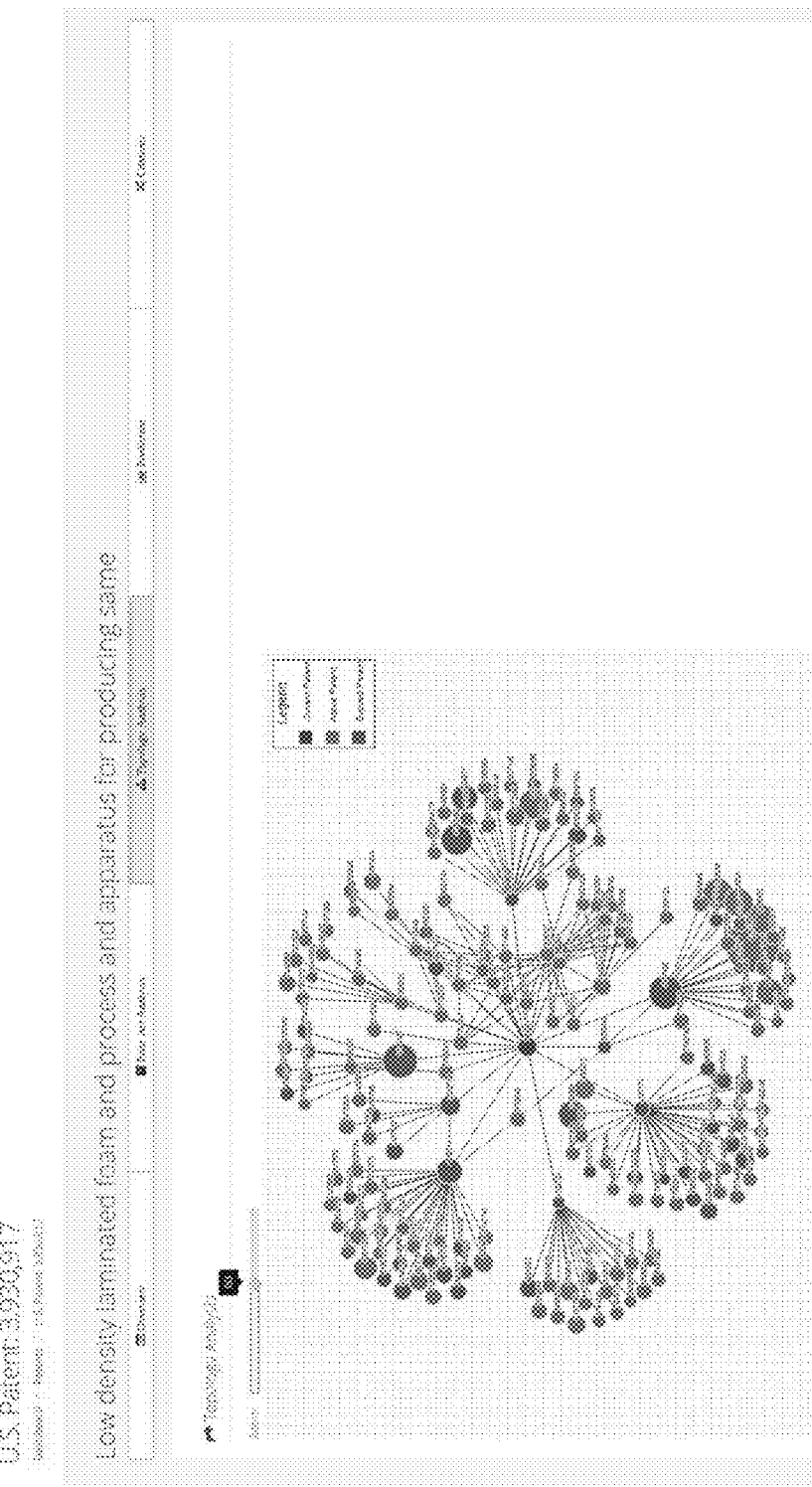
FIG. 22 is an example of a screenshot of topology analytics.

FIG. 22 is an example of a screenshot of discovery functions and research analyses in the form of topology analytics. In some implementations, the data mining/analysis system 102 can provide topology analytics that offer data visualization and interactive graphics that allow U.S. patents that have potential impact in their respective technology sectors to be visually identified quickly and efficiently. The data mining/analysis system 102 displays the selected patent's proprietary analytics, and compares the analytics against other related patents to give the users a full scope of the potential value of the selected patent in the identified technology sector. As shown in FIG. 22, each circle represents a particular patent, and the "link" identifies the relationships between the connected patents. A size of the circle can also be used to represent the impact, value, or strength of a particular patent. For example, users can use the topology analytics and the size of the circles to identify the territorial impact of a particular patent (in connection with those patents that are connected to this patent), or to evaluate competitors' patent portfolio on product launches.

In some implementations, to generate the topology analytics, any of the variables and attributes (or combinations thereof) described in TABLES A-G can be used. Similarly, forward citations, backward citations, validity strength ratings, or a combination thereof can be used to generate the topology analytics. For example, in some implementations, a selected patent's relationship with other patents can be identified and displayed to the users based on associated technology, patent owner, or relevant keywords used in those patents. In some implementations, the relationship can be enhanced by ranking each of the patents in each subset (e.g., using any of the ranking techniques discussed herein) to identify patents that are likely to be "stronger" or "weaker" in comparison to other patents (which, as discussed above, can be illustrated based on a size of the circle). For example, a bigger circle can be used to represent a patent that is stronger, more valuable, or has a larger impact than patents with smaller circles.

In some implementations, where an investment value for a particular type of patent is particularly known (e.g., based on incoming documents identifying known damages recovered from litigation or from business transactions identifying the purchase values of patents in a similar class or category), this investment value can be fed to the data mining/analysis system 102 to identify patents that are more "valuable" for investment purposes. This "subset" of patents can also be linked to other subsets of patents to generate a comprehensive mapping that identifies the "stronger," "weaker," "more valuable," and/or "less valuable" patents in a particular set of patents or patents related to a particular industry or sector.

Whether users are interested in offensive-based portfolio to protect a business' core technology and drive profits, or defensive-focus strategy to capture unclaimed territory surrounding core technology that blocks alternative designs and ensures freedom to operate, the topology analytics shown in FIG. 22 can allow users to become acquainted with the current patent landscape, understand the economic impact of granted patents on old and new, small to large businesses, and identify rapid technological trends that closely align with their investment interests.

With topology analytics, users can quickly identify which technology is and remains the most active, how patent filing patterns have changed over time, and where important technology battles and business stakes are taking place. Also, With topology analytics, a visual representation of information can be provided in a way that is easy to understand, allowing for stakeholders and contributors to quickly capture information they need for their own due diligence research.

FIG. 23 shows an example of a process 2300 for generating a validity strength rating indicative of a likelihood that at least one claim associated with a patent remains valid. As shown in FIG. 23, at 2302, a processor receives a plurality of legal documents associated with a plurality of legal cases, where at least one of the plurality of legal cases is associated with a legal proceeding, the legal proceeding associated with a determination of a validity or invalidity of a patent, the patent containing at least one claim. At 2304, the plurality of legal documents are stored in one or more databases. At 2306, the processor applies one or more predetermined patterns to the plurality of legal documents to identify reference data. At 2308, the reference data is analyzed to develop one or more analytical models, each statistical model pertaining to a different analytics parameter associated with a different attribute of the plurality of the legal documents. At 2310, the validity or invalidity of the patent is assessed based on the one or more analytical models. At 2312, a validity strength rating is generated based on the assessment, the validity strength rating indicative of a likelihood that at least one claim associated with the patent remains valid after subsequent litigation.

Valid Claim Tracker

As discussed above, the data analysis 220 can determine a validity strength rating for the remaining claims (e.g., affirmed and/or unchallenged claims). In some implementations, the data analysis system 220 can track the claims remaining after litigation. For example, if Patent "X" has 20 original claims and 15 claims (e.g., claims 1-15) have been canceled, then the data analysis system 220 can record the remaining claims (e.g., claims 16-20) in the database 204 (or data 206). This information can be displayed under the "Patent" section (e.g., FIG. 20).

It should be noted that while the foregoing implementations have been described with respect to review proceedings, these implementations are equally applicable to patent undergoing patent examination (e.g., during patent prosecution phase). For example, the data management system 100 can include an interface that interfaces with the Patent Office's Patent Application Information Retrieval (PAIR) to retrieve all documents submitted in a patent application during the patent examination phase. The mining system 202 can be used to extract data in these documents including the number of claims, name of the supervising patent examiner and assistant patent examiner (if any), identification of assignee, all relevant legal arguments, all prior art cited, amendment (if any) made to the application including specification and the claims, and the like. These data can then be used to develop and train a model by the model engine 302, and scored by the scoring engine 312. The resulting data can then be used by the data analysis system 220 to generate predictive analytics (e.g., how likely a subject patent application will issue as a patent, how the given examiner will treat on a particular legal issue, whether an examiner interview affects the overall predicted probability that the subject patent application will issue as a patent, and the like).

Similarly, the subject matter described herein is not limited to inter partes and post-grant review proceedings, and is also applicable to patent appeals filed with and proceedings initiated and presided by the PTAB.

In sum, the data management system 100 can offer a company or practitioner actionable intelligence before commencing a proceeding as well as throughout the proceeding's lifecycle which helps to streamline petition preparation, reduce outside attorney and expert costs, and facilitate settlement among the parties long before commencement of trial.

Companies and practitioners can employ the data management system's 100 legal analytics and business intelligence to help them become acquainted with the current patent landscape, understand the economic impact of granted patents on old and new, small to large businesses, and identify rapid technological trends.

Product Assessment Analytics

In some implementations, the data management system 100 can also be configured to receive user input identifying a particular product or products. Based on the user input, the data management system 100 can "predict" or identify existing prior art, or prior inventions relevant to the product or products.

Figure 24A:
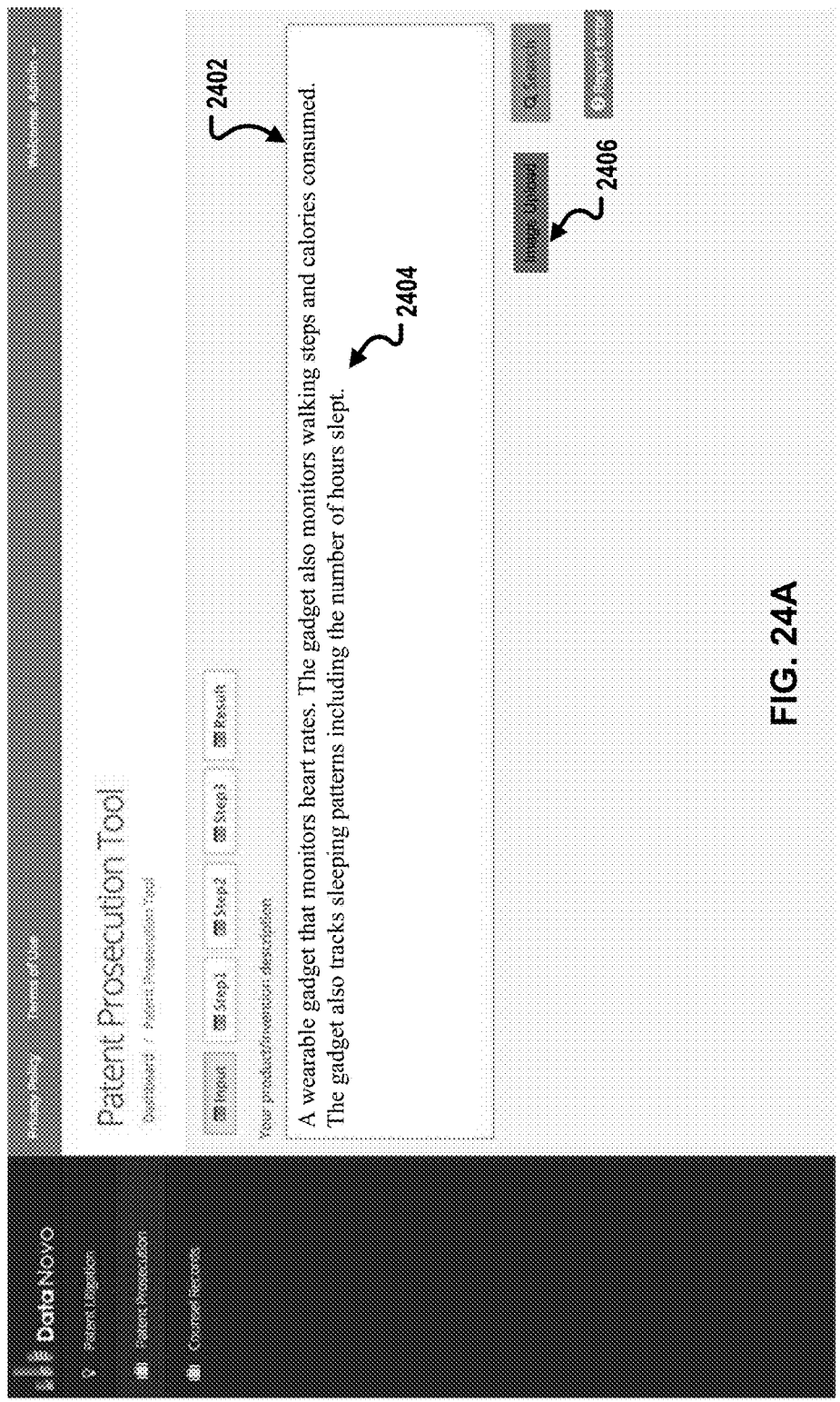
FIG. 24A is an example screenshot of an interface to receive user input.

As an example, as shown in FIG. 24A, the database management system 100 can provide an interface 2402 via the interface module 209. The interface module 209 can be configured to receive user input 2404. The user input 2404 can be in the form of a product description or a product image. For example, a product description can include phrases such as "A wearable gadget that monitors heart rates." A product description can also include multiple paragraphs. For example, a product description can include the following description: "A wearable gadget that monitors heart rates. The gadget also monitors walking steps and calories consumed. The gadget also tracks sleeping patterns including the number of hours slept."

In some implementations, in addition to or in place of product description, the user can upload a product image that identifies the relevant product. For example, the interface 2402 can include an upload button 2406 that allows users 212 to upload an image of a commercial wearable device such as Jawbone® Up4 or Fitbit® Alta.

In some implementations, to facilitate image selection and identification, a dropdown menu (not shown) can be displayed through which a user 212 can select to identify the relevant product(s). For example, the dropdown menu can include a list of general category of options including, for example, "A: human necessities," "B: performing operations," "C: chemistry/metallurgy," "D: textiles/paper," "E: fixed constructions," "F: mechanical/lighting," "G: physics," and "H: electricity." In some implementations, the list of options can be preconfigured or preloaded into the database management system 100, and can be updated on a regular or selected basis.

The list of options can be generic in nature at the top level. Once an option is selected, the database management system 100 can provide additional options to accurately identify the relevant product. For example, if the user 212 selects "A: human necessities," the interface module 209 can provide additional "sub-options" such as "A-1: agriculture," "A-2: baking," "A-3: butchering," "A-4: foods," "A-5: tobacco," "A-6: wearing apparel," "A-7: headwear," "A-8: footwear," "A-9: haberdashery/jewelry," "A-10: hand or traveling articles," "A-11: brushware," "A-12: furniture," "A-13: medical or veterinary," "A-14: life-saving," "A-15: sports," and "A-16: others."

In some implementations, a second set of sub-options can be provided to help the user 212 further identify a range of products falling under the sub-option selected by the user 212. For example, if the user 212 selects "A-6: wearing apparel," the interface module 209 can provide a second set of "sub-options" associated with "A-6: wearing apparel" such as "A-6-1: medical/veterinary," "A-6-2: diagnosis/surgery," "A-6-3: dentistry," "A-6-4: veterinary instruments," "A-6-5: filters implantable," "A-6-6: transport/personal conveyance," "A-6-7: physical therapy apparatus," "A-6-8: containers adapted for medical," and "A-6-9: preparations for medical."

In some implementations, the options and sub-options can be identified in advance by the machine learning module 230. In some implementations, the machine learning module 230 can perform machine learning on the prior art stored in repositories 104/106 (which can be local to or remote from the data mining/analysis system 102). For example, the machine learning module 230 can perform machine learning using supervised learning (e.g., using logistic regression and back propagation neural network to address issues involving classification and regression), unsupervised learning (e.g., using aprior algorithm and k-means to address issues involving clustering, dimensionality, reduction, and association rule learning), and semi-supervised learning (e.g., using extensions to other flexible methods that make assumptions about how to model unlabeled data to address problems with classification and regression).

In some implementations, the machine learning module 230 can generate machine learning results, such as a classification, a confidence metric, an inferred function, a regression function, an answer, a prediction, a recognized pattern, a rule, a recommendation, or other results. In some implementations, the machine learning module 230 can perform machine learning via a computer executable program code, logic hardware, and/or other entities configured to learn from or train on input data, and to apply the learning or training to provide results or analysis for subsequent data.

In some implementations, the machine learning module 230 can include a machine learning simulator or pre-cache configured to pre-determine, pre-compute, and/or cache machine learning results in a results data structure, so that different permutations of the machine learning results can be provided in response to the product description entered by the user 212.

In some instances, the machine learning module 230 can use a cognitive, visual model to provide meaning to machine learning inputs, results, and/or other parameters. The machine learning module 230 can allow dynamic manipulation of one or more machine learning inputs, results, and/or other parameters and can dynamically update the data analysis system 220 of other related machine learning inputs, results, and/or other parameters in at or near real-time, so that the machine learning inputs, results, and/or other parameters are interactive.

For example, the machine learning module 230 can present machine learning inputs, results, and/or other parameters for a business to the user 212 to predict business actions or outcomes (e.g., prior art reference X is likely prior art to patent Y), provide business recommendations (e.g., file declaratory judgment action or inter partes review petition to challenge the validity of patent Y), or the like. The machine learning module 230 can present the machine learning inputs, results, and/or other parameters in a dynamic, experiential manner, using an interactive data visualization or the like. Also, the machine learning module 230 can facilitate understanding of the meaning of the presented data, without burdening the user 212 with the minutia and complexity of the literal underlying data. The machine learning module 230 can present machine learning inputs, results, predictions, and/or other parameters in a manner that communicates business or practical meaning to the user 212, allowing the user 212 to navigate and recognize patterns in enterprise data, thereby determining optimal actions for the business (e.g., based on the patent number input by the user 212).

The data analysis system 220 can analyze the user input 2404 or selection to identify the underlying technology. For example, the pattern module 207 can analyze and associate the user input 2404 (e.g., using one or more predetermined patterns previously discussed) with one or more prior art stored in repositories 104/106. In some implementations, the machine learning module 230 can apply one or more "machine-learned" patterns to the user input 2404. The "machine-learned" patterns can be used to identify, for example, certain words that have known association with particular attributes such as product type (e.g., "wearable gadget"), class information (e.g., "wearable gadget" falls under class "human necessities"), subclass information (e.g., "wearable gadget that monitors heart rates" falls under subclass "wearing apparel-medical"), relevant patent owners (e.g., patent owners with relevant patents such as Jawbone® and Fitbit®). Based on this information, the machine learning module 230 and the pattern module 207 can identify one or more prior art references that cover products with similar product description.

As an example, the machine learning module 230 can determine that prior art references relevant to "wearable gadget" generally contain conceptual or contextual information such as "sweat," "calories," "removable," "walking steps," "exercise," "running," "sleeping," "step count," etc. The machine learning module 230 can apply this information to the user description to determine how likely the user description pertains to "wearable gadget." Such a determination can include the number of matching terms, or can be done via weights assigned to different terms.

In some implementations, once the user 212 has submitted the product description or production image, or selected a general option or sub-option from the dropdown menu, the machine learning module 230 can generate one or more choices to help further identify the prior art relevant to the product. For example, the machine learning module 230 can display one or more choices, allow the user 212 to select among the choices, and see the predicted outcome or resulting prior art references related to the product description, product image, or selected option(s).

Figure 24B:
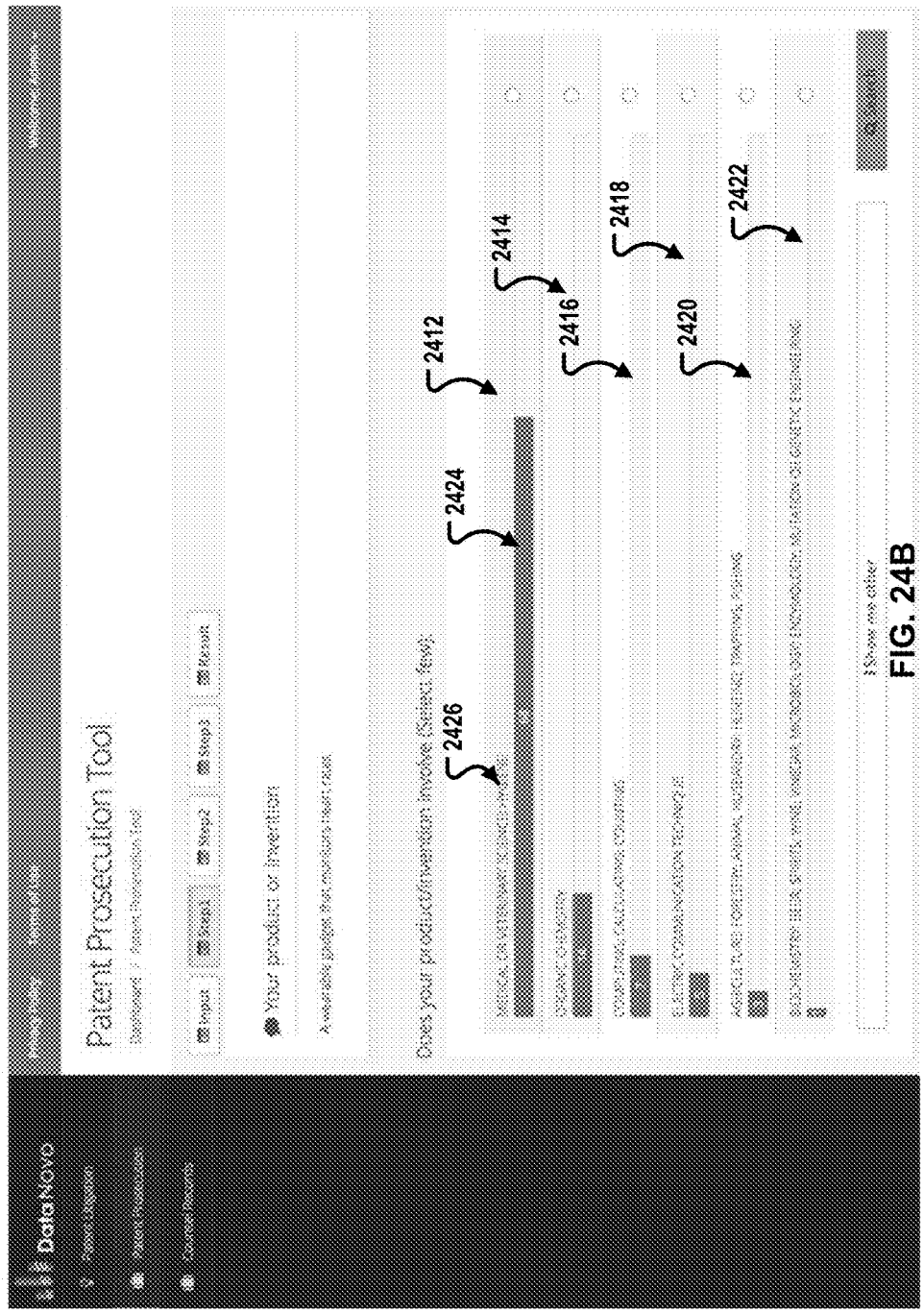
FIG. 24B is an example screenshot of a first set of choices for user selection.

For example, where the user has entered the phrase "A wearable gadget that monitors heart rates," the machine learning module 230 can prompt, as shown in FIG. 24B, choices such as "medical or veterinary science; hygiene" 2412, "organic chemistry" 2414, "computing; calculating; counting" 2416, "electric communication technique" 2418, "agriculture; forestry; animal husbandry; hunting; trapping; fishing" 2420, and "biochemistry; beer spirits; wine; vinegar; microbiology; enzymology; mutation or genetic engineering" 2422.

In some implementations, the machine learning module 230 determines that the user input 2404 is sufficient enough to identify the likely product category, the machine learning module 230 can prompt choices such as "product is worn around a wrist" and "product is worn around a chest."

Once the user 212 has selected a choice (e.g., by hovering a mouse over 2412-2422 and clicking on the choice), the machine learning module 230 can either display all prior art relevant to the selected choice, or prompt additional choices to reduce the number of "hits."

Figure 24C:
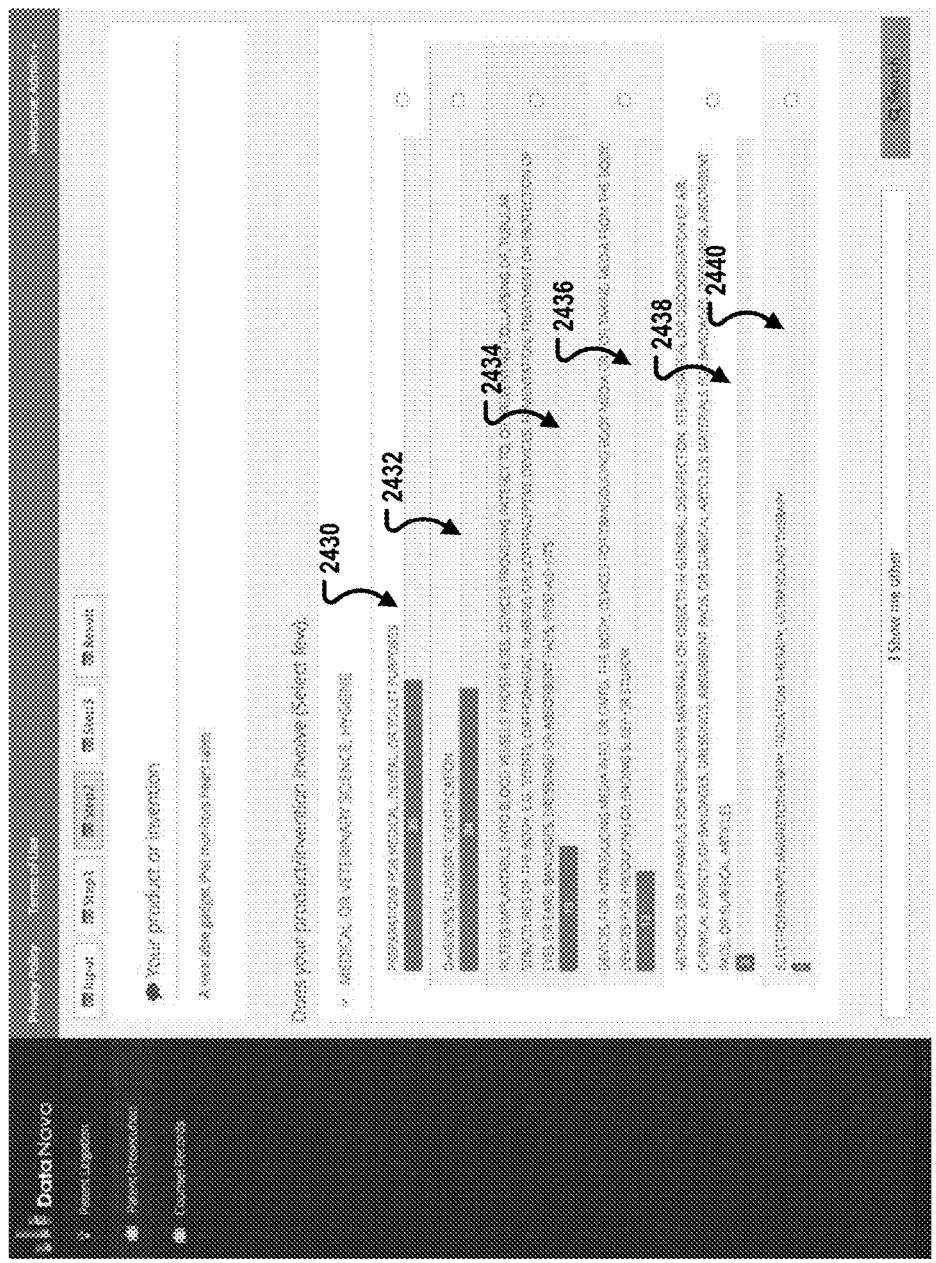
FIG. 24C is an example screenshot of a second set of choices for user selection.

For example, as shown in FIG. 24C, if the user selects "medical or veterinary science; hygiene" 2412, the machine learning module 230 can further display a second set of choices such as "preparations for medical, dental, or toilet purposes" 2430, "diagnosis; surgery identification" 2432, "filters implantable into blood vessels . . . " 2434, "devices for introducing media, or onto, the body . . . " 2436, "methods or apparatus for sterilizing materials or objects in general" 2438, and "electrotherapy" 2440.

As another example, if the user selects "product is worn around a wrist," the machine learning module 230 can either display all prior art covering products that are worn around a user's wrist, or prompt additional choices such as "product is battery-powered," "product is solar-powered," and "product requires a power outlet for charging."

Figure 24D:
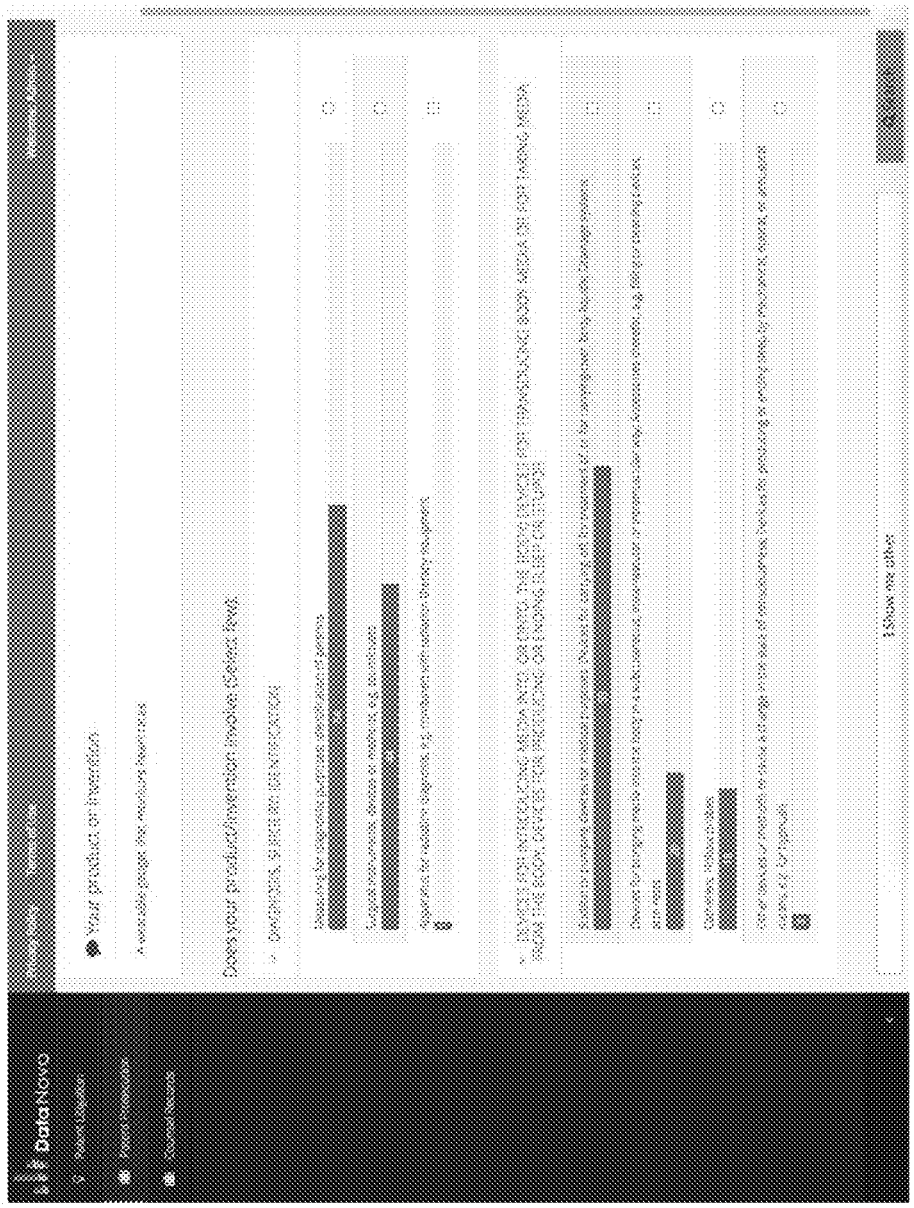
FIG. 24D is an example screenshot of a third set of choices for user selection.

Depending on the sufficiency of the user input 2404, the machine learning module 230 can further display a third set of choices such as those shown in FIG. 24D.

Figure 24E:
FIG. 24E is an example screenshot of a result page.

FIG. 24E is a result page showing a list 2450 of documents that are most relevant to the product specified in the user input 2404. For example, the list 2450 includes a number of U.S. patents covering products similar to that specified in the user input 2404. A second list 2452 can also be displayed. The second list 2452 can include potential prior art references covering products similar to that specified in the user input 2404. In some implementations, the difference between the list 2450 and the second list 2452 is that the second list 2452 includes prior art references that bear no date to ascertain whether it is prior art to the product. However, such references describe products with structures or functions similar to that described by user input 2404.

In some implementations, each prior art reference has a corresponding relevancy score 2454. This relevancy score 2454 can indicate how relevant the associated prior art is to the user input 2404. For example, a relevancy score of "2.5"

(e.g., out of 3) means that the associated prior art has a 83% chance covering the product specified by the user input 2404.

In some implementations, to help user 212 navigate through the choices, the machine learning module 230 can include a probability counter 2424 (as shown in FIG. 24B). The probability counter 2424 can be used to show how likely the choice is the relevant choice based on the user input 2404. As an example, based on the phrase "A wearable gadget that monitors heart rates," the machine learning module 230 can display a counter of "68" under "medical or veterinary science; hygiene" to indicate that the product as specified by the user input 2424 has a 68% chance to fall under this category. In so doing, if the user 212 cannot readily determine the correct choice based on the choice description 2426, the user 212 can use the counter 2424 as an aid to proceed to the next set of choices (e.g., FIG. 24C) or directly to the results (e.g., FIG. 24E).

In some implementations, after the user has selected the appropriate choice(s), the data analysis system 220 can display a number of prior art references relevant to the user input 2404 and selection. In some implementations, the user 212 can specify that only the top 20 prior art references with the highest relevancy scores are displayed.

In some implementations, the user 212 can specify a confidence metric or the like and the machine learning module 230 can present one or more prior art references that have a highest correlation to or impact on the confidence metric, based on the pre-computed or pre-cached machine learning results. In these implementations, the interface module 209 can provide an interface to receive the user-specified confidence metric.

In some implementations, the user 212 can see how the number of relevant prior art references might be affected by revisiting the user's selected choice(s) and re-selecting other choice(s). The machine learning module 230 can present such controls graphically or in another manner.

As discussed previously, predicting prior art relevant to a product (e.g., identifying prior art that is likely highly relevant to or covering the product) is one form of predictive analytics performed by the data mining/analysis system 102. Predictive analytics is the study of past performance, or patterns, found in historical and transactional data to identify behavior and trends in future events, using machine learning or the like. This may be accomplished using a variety of statistical techniques including modeling, machine learning, data mining, or the like.

One term for large, complex, historical data sets is big data. Examples of big data include web logs, social networks, blogs, system log files, call logs, customer data, user feedback, or the like. In implementations discussed above, big data also includes existing domestic and foreign prior arts such as patents, articles, journals, and books describing, for example, prior technologies or instrumentalities. These data sets can often be so large and complex that they are challenging and technically difficult to work with using traditional tools or manual labor. With technological advances in computing resources, including memory, storage, and computational power, along with frameworks and programming models for data-intensive distributed applications, the data mining/analysis system 102 has the ability to collect, analyze and mine these huge repositories of structured, unstructured, and/or semi-structured data (e.g., prior art) to provide meaningful results for users based on user specified inputs.

In some implementations, based on the user-specified product description, product image, or option selection (and/or subsequent selected choices), the data mining/analysis system 102 can apply predictive techniques such as regression and classification to identify the highly relevant prior art. Regression models attempt to fit a mathematical equation to approximate the relationship between the variables being analyzed. These models may include "Discrete Choice" models such as Logistic Regression, Multinomial Logistic Regression, Probit Regression, or the like. When factoring in time, Time Series models may be used, such as Auto Regression—AR, Moving Average—MA, ARMA, AR Conditional ARCH, Generalized ARCH—GARCH and Vector AR—VAR). Other models include Survival or Duration analysis, Classification and Regression Trees (CART), Multivariate Adaptive Regression Splines (MARS), and the like.

Classification is a form of artificial intelligence that uses computational power to execute complex algorithms in an effort to emulate human cognition. One underlying problem, however, remains: determining the set of all possible behaviors given all possible inputs is much too large to be included in a set of observed examples. Classification methods can include Neural Networks, Radial Basis Functions, Support Vector Machines, Naïve Bayes, k-Nearest Neighbors, Geospatial Predictive modeling, and the like.

Each of these forms of modeling can make assumptions about the data set and model the given data. In some cases, some models are more accurate than others such that there's no one single ideal model. Historically, using predictive analytics or other machine learning tools was a cumbersome and difficult process, often involving manual labor. A user typically must determine the optimal class of learning machines that would be the most applicable for a given data set, and rigorously test the selected hypothesis by first fine-tuning the learning machine parameters and second by evaluating results fed by trained data. The data mining/analysis system 102, however, does not require a user to input anything else beyond a product description or submit a product image (or selecting among options provided by the machine learning module 230).

The machine learning module 230 can use machine learning to generate a plurality of predictive outcomes or other machine learning results (e.g., in the form of relevant prior art) from a data set (e.g., from among the existing data and prior art references stored in the repositories 104/106). By using historical data sets to understand and map the connections between the various prior art references and/or between prior art references and their underlying technologies, the machine learning module 230 can achieve a high level of confidence in using the historical data to generate highly relevant prior art references to predict how likely a product is patentable, or whether prior inventions exist that require licensing or design-around before product launch. For example, the machine learning module 230, in conjunction with the pattern module 207, can identify a plurality of relevant prior art references that include reference X, where reference X is relevant to wearable product Y because reference X covers products related to "wearable gadget." This, in turn, helps the user 212 make informed business decisions to avoid potential allegations of patent infringement.

In sum, the machine learning module 230 can apply the same, similar, or different techniques used in prior art analytics to product assessment analytics. Instead of a user input specifying a selected patent, the user input can be a product description, product image, or user selection of a category-specific option. And this is all it takes for the data mining/analysis system 102 to understand the specified product and generate patents covering similar products (e.g., products with similar structures and functions). If the results show that the product is covered by one or more relevant prior art references, the user 212 can decide to take a license, or re-design the product to work around those patents.

FIG. 25 is an example of a process 2500 of identifying prior inventions based on user input. As shown in FIG. 25, at 2502, a processor can receive a plurality of documents including prior art documents. At 2504, the plurality of documents and the prior art documents can be stored in one or more databases. At 2506, the processor can apply one or more predetermined patterns to the plurality of documents and prior art documents to generate reference data. Next, at 2508, user data associated with a product can be received. At 2510, the user data can be evaluated based on the reference data to identifying one or more of the plurality of documents including prior art documents relevant to the product, where the one or more identified documents provide descriptions of prior products or inventions that are similar to but predates the product.

Generic Computer System

Figure 9:
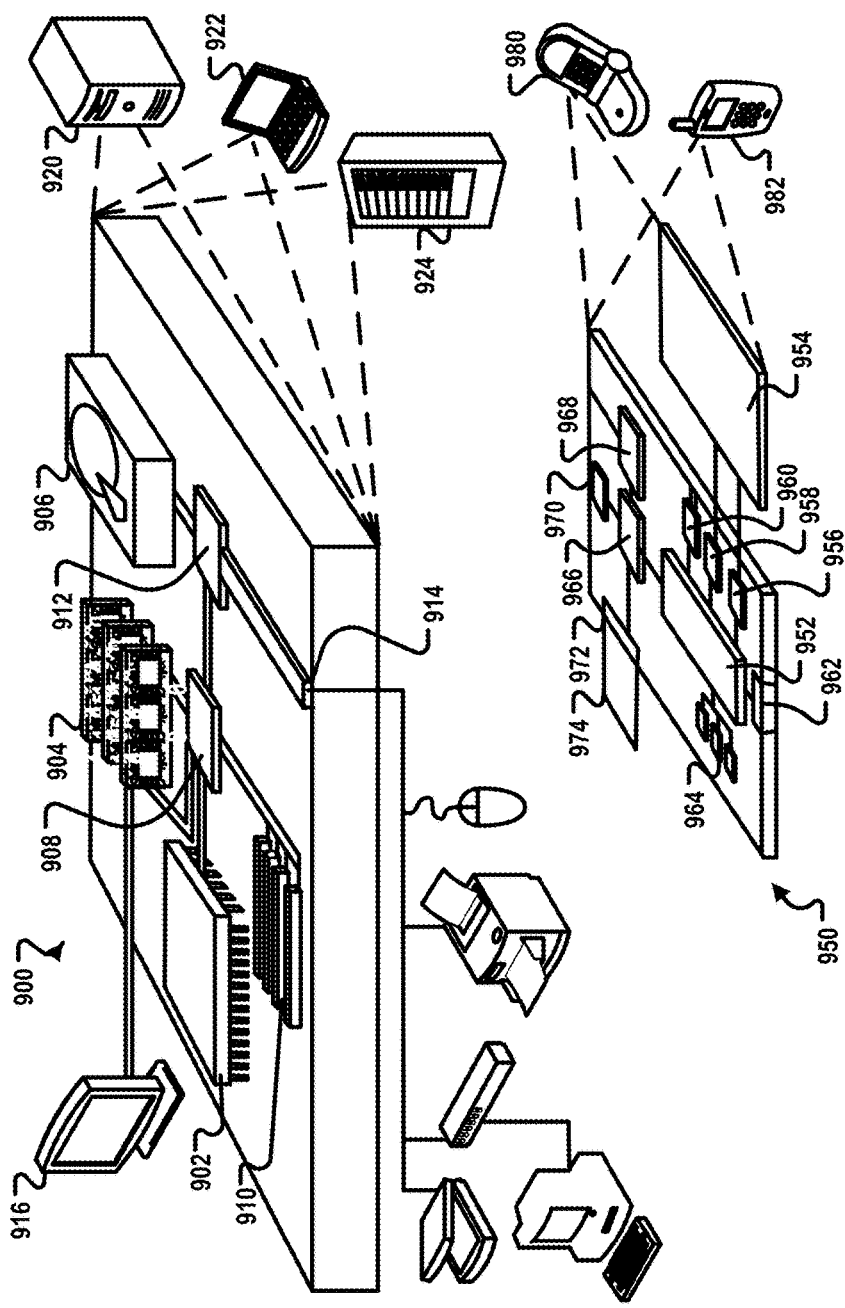
FIG. 9 shows an example of a computing device and a mobile computing device that can be used to implement the subject matter described herein.

FIG. 9 shows an example of a computing device 900 and a mobile computing device 950 that can be used to implement the subject matter described here. The computing device 900 is intended to represent various forms of digital computers, such as laptops, desktops, workstations, personal digital assistants, servers, blade servers, mainframes, and other appropriate computers. The mobile computing device 950 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 900 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. Each of the processor 902, the memory 904, the storage device 906, the high-speed interface 908, the high-speed expansion ports 910, and the low-speed interface 912, are interconnected using various busses, and can be mounted on a common motherboard or in other manners as appropriate. The processor 902 can process instructions for execution within the computing device 900, including instructions stored in the memory 904 or on the storage device 906 to display graphical information for a GUI on an external input/output device, such as a display 916 coupled to the high-speed interface 908. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 904 stores information within the computing device 900. In some implementations, the memory 904 is a volatile memory unit or units. In some implementations, the memory 904 is a non-volatile memory unit or units. The memory 904 can also be another form of computer-readable medium, such as a magnetic or optical disk.

The storage device 906 is capable of providing mass storage for the computing device 900. In some implementations, the storage device 906 can be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 902), perform one or more methods, such as those described above. The instructions can also be stored by one or more storage devices such as computer- or machine-readable mediums (for example, the memory 904, the storage device 906, or memory on the processor 902).

The high-speed interface 908 manages bandwidth-intensive operations for the computing device 900, while the low-speed interface 912 manages lower bandwidth-intensive operations. Such allocation of functions is an example only. In some implementations, the high-speed interface 908 is coupled to the memory 904, the display 916 (e.g., through a graphics processor or accelerator), and to the high-speed expansion ports 910, which can accept various expansion cards (not shown). In the implementation, the low-speed interface 912 is coupled to the storage device 906 and the low-speed expansion port 914. The low-speed expansion port 914, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 900 can be implemented in a number of different forms, as shown in the figure. For example, it can be implemented as a standard server 920, or multiple times in a group of such servers. In addition, it can be implemented in a personal computer such as a laptop computer 922. It can also be implemented as part of a rack server system 924. Alternatively, components from the computing device 900 can be combined with other components in a mobile device (not shown), such as a mobile computing device 950. Each of such devices can contain one or more of the computing device 900 and the mobile computing device 950, and an entire system can be made up of multiple computing devices communicating with each other.

The mobile computing device 950 includes a processor 952, a memory 964, an input/output device such as a display 954, a communication interface 966, and a transceiver 968, among other components. The mobile computing device 950 can also be provided with a storage device, such as a micro-drive or other device, to provide additional storage. Each of the processor 952, the memory 964, the display 954, the communication interface 966, and the transceiver 968, are interconnected using various buses, and several of the components can be mounted on a common motherboard or in other manners as appropriate.

The processor 952 can execute instructions within the mobile computing device 950, including instructions stored in the memory 964. The processor 952 can be implemented as a chipset of chips that include separate and multiple analog and digital processors. The processor 952 can provide, for example, for coordination of the other components of the mobile computing device 950, such as control of user interfaces, applications run by the mobile computing device 950, and wireless communication by the mobile computing device 950.

The processor 952 can communicate with a user through a control interface 958 and a display interface 956 coupled to the display 954. The display 954 can be, for example, a TFT (Thin-Film-Transistor Liquid Crystal Display) display or an OLED (Organic Light Emitting Diode) display, or other appropriate display technology. The display interface 956 can comprise appropriate circuitry for driving the display 954 to present graphical and other information to a user. The control interface 958 can receive commands from a user and convert them for submission to the processor 952. In addition, an external interface 962 can provide communication with the processor 952, so as to enable near area communication of the mobile computing device 950 with other devices. The external interface 962 can provide, for example, for wired communication in some implementations, or for wireless communication in other implementations, and multiple interfaces can also be used.

The memory 964 stores information within the mobile computing device 950. The memory 964 can be implemented as one or more of a computer-readable medium or media, a volatile memory unit or units, or a non-volatile memory unit or units. An expansion memory 974 can also be provided and connected to the mobile computing device 950 through an expansion interface 972, which can include, for example, a SIMM (Single In Line Memory Module) card interface. The expansion memory 974 can provide extra storage space for the mobile computing device 950, or can also store applications or other information for the mobile computing device 950. Specifically, the expansion memory 974 can include instructions to carry out or supplement the processes described above, and can include secure information also. Thus, for example, the expansion memory 974 can be provide as a security module for the mobile computing device 950, and can be programmed with instructions that permit secure use of the mobile computing device 950. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, instructions are stored in an information carrier. that the instructions, when executed by one or more processing devices (for example, processor 952), perform one or more methods, such as those described above. The instructions can also be stored by one or more storage devices, such as one or more computer- or machine-readable mediums (for example, the memory 964, the expansion memory 974, or memory on the processor 952) (e.g., which can be non-transitory). In some implementations, the instructions can be received, for example, over the transceiver 968 or the external interface 962.

The mobile computing device 950 can communicate wirelessly through the communication interface 966, which can include digital signal processing circuitry where necessary. The communication interface 966 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 968 using a radio-frequency. In addition, short-range communication can occur, such as using a Bluetooth, WiFi, or other such transceiver (not shown). In addition, a GPS (Global Positioning System) receiver module 970 can provide additional navigation- and location-related wireless data to the mobile computing device 950, which can be used as appropriate by applications running on the mobile computing device 950.

The mobile computing device 950 can also communicate audibly using an audio codec 960, which can receive spoken information from a user and convert it to usable digital information. The audio codec 960 can likewise generate audible sound for a user, such as through a speaker, e.g., in a handset of the mobile computing device 950. Such sound can include sound from voice telephone calls, can include recorded sound (e.g., voice messages, music files, etc.) and can also include sound generated by applications operating on the mobile computing device 950.

The mobile computing device 950 can be implemented in a number of different forms, as shown in the figure. For example, it can be implemented as a cellular telephone 980. It can also be implemented as part of a smart-phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input. The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of such networks include a local area network (LAN), a wide area network (WAN), and the Internet.

What is claimed is:

1. A document management system comprising:
    one or more computer processors;
    a database storing a plurality of documents, the plurality of documents including patent related documents;
    a data mining module, executable upon the one or more computer processors, to receive the plurality of documents and to perform data mining on the plurality of documents to identify structured, unstructured, or semi-structured data in the plurality of documents;
    a data analysis module, executable upon the one or more computer processors, to receive the identified structured, unstructured, or semi-structured data from the data mining module and to develop a predictive analytics model based on the data mining, wherein the data analysis module is configured to perform predictive analytics, based on the predictive analytic model, on the identified structured, unstructured, or semi-structured data to determine correlations between attributes associated with the plurality of documents; and
    an interface module, executable upon the one or more computer processors, to receive a user input over a network, the user input specifying one or more criteria through a first dashboard user graphical interface on a first web page and to display an output generated based on the predictive analytics model provided by the data analysis module over the network, wherein the output includes one or more search results for display in a second dashboard user graphical interface on a second web page, the one or more search results identifying one or more patent-related documents that satisfy the one or more criteria based on the predictive analytics model.

2. The system of claim 1, wherein the data analysis module is configured to associate the identified structured, unstructured, or semi-structured data with the one or more criteria based on the predictive analytics model, and to identify one or more patent related documents that is most relevant to the one or more criteria for display in the second dashboard user graphical interface.

3. The system of claim 1, wherein:
    the data analysis module is configured to analyze the user input specifying the one or more criteria and to generate one or more categories of information relevant to the user input, wherein the one or more categories of information are generated based on the predictive analytics model; and
    the interface module is configured to display the one or more categories of information for user selection in a third dashboard user graphical interface on a third web page.

4. The system of claim 3, wherein
    the data analysis module is configured to determine a relevancy between the one or more criteria and the one or more categories of information generated based on the predictive analytics model; and
    the interface module is configured to display a relevancy score for each category of information based on the relevancy via the third dashboard user graphical interface on the third web page.

5. The system of claim 3, wherein:
    the interface module is configured to receive a selection of the one or more categories of information via the third dashboard user graphical interface on the third web page; and
    the data analysis module is configured to analyze the selection to generate the one or more search results identifying the one or more patents that satisfy the one or more criteria based on the predictive analytics model.

6. The system of claim 1, wherein:
    the data analysis module is configured to determine a relevancy score for each of the search results based on the predictive analytics model, the relevancy score being displayed in the second dashboard user graphical interface; and
    the search results are arranged based on the relevancy score.

7. The system of claim 1, wherein:
    the data analysis module is configured to perform predictive analytics, based on the predictive analytic model, on the identified structured, unstructured, or semi-structured data to determine correlations between attributes associated with the plurality of documents, the attributes including one or more of a name of a patent owner, a patent identifier, a patent class, a name of an inventor, one or more words in a claim, and one or more words in a specification.

8. The system of claim 1, wherein:
    the interface module is configured to receive a user input specifying a patent identifier as the one or more criteria through the first dashboard user graphical interface on the first web page, the first identifier being associated with one of the plurality of documents stored in the database;
    the data analysis module is configured to determine one or more documents of the plurality of documents associated with the one of the plurality of documents, the one or more documents determined to contain structured, unstructured, or semi-structured data corresponding to that of the one of the plurality of documents based on the determined correlations and the predictive analytics model; and
    the interface module is configured to display the one or more associated documents as the one or more search results in the second dashboard user graphical interface on the second web page.

9. The system of claim 8, wherein the plurality of documents includes patent related documents and non-patent related documents.

10. The system of claim 1, wherein the one or more criteria includes a description associated with a product or service.

11. A document management system comprising:
one or more computer processors;
a database storing a plurality of documents, the plurality of documents including patent documents and non-patent documents;
a data mining module, executable upon the one or more computer processors, to receive the plurality of documents and to perform data mining on the plurality of documents to identify structured, unstructured, or semi-structured data in the plurality of documents;
a data analysis module, executable upon the one or more computer processors, to receive the identified structured, unstructured, or semi-structured data from the data mining module and to develop a predictive analytics model based on the data mining, wherein the data analysis module is configured to perform predictive analytics, based on the predictive analytic model, on the identified structured, unstructured, or semi-structured data to determine correlations between attributes associated with the plurality of documents; and
an interface module, executable upon the one or more computer processors, to receive a user input over a network, the user input specifying a patent identifier through a first dashboard user graphical interface on a first web page and to display an output generated based on the predictive analytics model provided by the data analysis module over the network, wherein the output includes one or more search results for display in a second dashboard user graphical interface on a second web page, the one or more search results identifying one or more of the patent and non-patent documents that satisfy the one or more criteria based on the predictive analytics model.

12. The system of claim 11, wherein:
the data analysis module is configured to identify a patent document associated with the patent identifier, the patent document containing structured, unstructured, or semi-structured data and to associate the structured, unstructured, or semi-structured data with that of one or more patent or non-patent documents based on the predictive analytic model; and
the interface module is configured to display the one or more patent or non-patent documents as the one or more search results in the second dashboard user graphical interface on the second web page.

13. The system of claim 12, wherein the data analysis module is configured to associate the structured, unstructured, or semi-structured data with that of the one or more patent or non-patent documents based on the predictive analytic model in real time.

14. The system of claim 11, wherein:
the data analysis module is configured to identify a patent document associated with the patent identifier, the patent document being one of the plurality of documents and containing structured, unstructured, or semi-structured data, the data analysis module further configured to retrieve one or more related patent or non-patent documents based on the determined correlations, the determined correlations being performed in advance of receiving the user input; and the interface module is configured to display the one or more related patent or non-patent documents as the one or more search results in the second dashboard user graphical interface on the second web page.

15. A method comprising:
storing a plurality of documents, the plurality of documents including patent documents and non-patent documents;
performing data mining on the plurality of documents to identify structured, unstructured, or semi-structured data in the plurality of documents;
developing a predictive analytics model based on the data mining including performing predictive analytics, based on the predictive analytic model, on the identified structured, unstructured, or semi-structured data to determine correlations between attributes associated with the plurality of documents;
receiving a user input over a network, the user input specifying one or more criteria through a first dashboard user graphical interface on a first web page; and
displaying an output generated based on the predictive analytics model over the network, the output including one or more search results for display in a second dashboard user graphical interface on a second web page, the one or more search results identifying one or more of the patent, non-patent, or patent and non-patent documents that satisfy the one or more criteria based on the predictive analytics model.

16. The method of claim 15, further comprising:
associating the identified structured, unstructured, or semi-structured data with the one or more criteria based on the predictive analytics model; and
identifying one or more patent, non-patent, or patent and non-patent documents responsive to the one or more criteria as the one or more search results for display in the second user graphical interface.

17. The method of claim 15, wherein receiving the user input includes receiving a patent identifier, the method further comprising:
identifying a patent document associated with the patent identifier, the patent document containing structured, unstructured, or semi-structured data; and
associating the structured, unstructured, or semi-structured data with that of one or more patent, non-patent, or patent and non-patent documents based on the predictive analytic model, wherein displaying the output includes displaying the one or more patent, non-patent, or patent and non-patent documents as the one or more search results in the second dashboard user graphical interface on the second web page.

18. The method of claim 17, wherein associating the structured, unstructured, or semi-structured data includes associating the structured, unstructured, or semi-structured data with that of the one or more patent, non-patent, or patent and non-patent documents based on the predictive analytic model in real time.

19. The method of claim 15, further comprising:
identifying a patent document associated with the patent identifier, the patent document being one of the plurality of documents and containing structured, unstructured, or semi-structured data;
retrieving one or more related patent or non-patent documents based on the determined correlations, the determined correlations being performed in advance of receiving the user input; and displaying the one or more related patent or non-patent documents as the one or more search results in the second dashboard user graphical interface on the second web page.

* * * * *

UNITED STATES PATENT AND TRADEMARK OFFICE
CERTIFICATE OF CORRECTION

PATENT NO. : 10,157,352 B1
APPLICATION NO. : 15/041029
DATED : December 18, 2018
INVENTOR(S) : Chan et al.

Page 1 of 1

It is certified that error appears in the above-identified patent and that said Letters Patent is hereby corrected as shown below:

In the Claims

In Column 93, Line 44, in Claim 1, delete "analytic" and insert -- analytics --, therefor.

In Column 94, Line 28, in Claim 5, delete "patents" and insert -- patent-related documents --, therefor.

In Column 94, Line 41, in Claim 7, delete "analytic" and insert -- analytics --, therefor.

In Column 94, Line 53, in Claim 8, delete "first identifier" and insert -- patent identifier --, therefor.

In Column 95, Line 24, in Claim 11, delete "analytic" and insert -- analytics --, therefor.

In Column 95, Line 39, in Claim 11, delete "one or more criteria" and insert -- patent identifier --, therefor.

In Column 95, Line 48, in Claim 12, delete "analytic" and insert -- analytics --, therefor.

In Column 95, Line 57, in Claim 13, delete "analytic" and insert -- analytics --, therefor.

In Column 96, Line 14, in Claim 15, delete "analytic" and insert -- analytics --, therefor.

In Column 96, Line 37, in Claim 16, delete "second" and insert -- second dashboard --, therefor.

In Column 96, Line 48, in Claim 17, delete "analytic" and insert -- analytics --, therefor.

In Column 96, Line 58, in Claim 18, delete "analytic" and insert -- analytics --, therefor.

In Column 96, Line 19, in Claim 19, delete "the" and insert -- a --, therefor.

Signed and Sealed this
Second Day of July, 2019

Andrei Iancu
*Director of the United States Patent and Trademark Office*